US007092509B1

(12) United States Patent
Mears et al.

(10) Patent No.: US 7,092,509 B1
(45) Date of Patent: Aug. 15, 2006

(54) CONTACT CENTER SYSTEM CAPABLE OF HANDLING MULTIPLE MEDIA TYPES OF CONTACTS AND METHOD FOR USING THE SAME

(75) Inventors: John C. Mears, Gaithersburg, MD (US); Gary E. Korzeniowski, New Market, MD (US); William R. Lewis, Jr., Ellicott City, MD (US); Ly K. Peang-Meth, Gaithersburg, MD (US)

(73) Assignee: Microlog Corporation, Germantown, MD (US)

(*) Notice: Subject to any disclaimer, the term of this patent is extended or adjusted under 35 U.S.C. 154(b) by 0 days.

(21) Appl. No.: 09/400,320

(22) Filed: Sep. 21, 1999

(51) Int. Cl.
  *H04M 3/00* (2006.01)
  *H04M 5/00* (2006.01)
(52) U.S. Cl. .............................. 379/266.01; 379/265.02
(58) Field of Classification Search ................ 379/265.02–265.09, 266.01, 309, 219, 220.01, 379/221.15; 370/352; 709/224
See application file for complete search history.

(56) References Cited

U.S. PATENT DOCUMENTS

| | | |
|---|---|---|
| 4,752,889 A | 6/1988 | Rappaport et al. |
| 4,788,682 A | 11/1988 | Vij et al. |
| 4,789,962 A | 12/1988 | Berry et al. |
| 4,809,272 A | 2/1989 | Torgrim et al. |
| 4,837,798 A | 6/1989 | Cohen et al. |
| 4,881,261 A | 11/1989 | Oliphant et al. |
| 4,969,185 A | 11/1990 | Dorst et al. |
| 5,008,930 A | 4/1991 | Gawrys et al. |
| 5,029,200 A | 7/1991 | Haas et al. |
| 5,164,981 A | 11/1992 | Mitchell et al. |
| 5,181,236 A | 1/1993 | LaVallee et al. |
| 5,185,782 A | 2/1993 | Srinivasan |
| 5,206,903 A | 4/1993 | Kohler et al. |

(Continued)

FOREIGN PATENT DOCUMENTS

CA  2178705  3/1997

(Continued)

OTHER PUBLICATIONS

Carl R. Strathmeyer, "Call Control in a Digital Multimedia Network", Computer-Telephone Division Dialogic Corporation, pp. 1-5, 1996.

(Continued)

*Primary Examiner*—Benny Quoc Tieu
(74) *Attorney, Agent, or Firm*—Roylance, Abrams, Berdo & Goodman, L.L.P.

(57) ABSTRACT

A contact center system and method employing a plurality of agent workstations, and which includes a queuing component, capable of receiving contacts of different media-types, such as telephone calls, e-mails, facsimiles, web chat, voice over internet protocol, and so on, and maintaining the different media types contacts in a common queue while awaiting routing to the agent workstations. The system further comprises a routing component which routes the queued contacts to the agents based on criteria of the contacts, criteria of the agents, or both. A media changing component of the system is capable of changing a media-type of any of the media-type contacts to generate a changed media-type contact, while the queuing component is capable of entering the changed media-type contact in the common queue, and the routing component is capable of routting the queued changed media-type contact to at least one of the workstations. A contact handling component initiates an event at any of the workstations in response to the contact being routed to the workstation, so that an agent at the workstation can handle the contact as appropriate.

21 Claims, 69 Drawing Sheets

U.S. PATENT DOCUMENTS

| | | |
|---|---|---|
| 5,247,569 A | 9/1993 | Cave |
| D344,521 S | 2/1994 | Dezonno et al. |
| 5,309,513 A | 5/1994 | Rose |
| 5,327,490 A | 7/1994 | Cave |
| 5,333,266 A | 7/1994 | Boaz et al. |
| 5,384,771 A | 1/1995 | Isidoro et al. |
| 5,384,841 A | 1/1995 | Adams et al. |
| 5,392,329 A | 2/1995 | Adams et al. |
| 5,400,327 A | 3/1995 | Dezonno |
| 5,428,608 A | 6/1995 | Freeman et al. |
| 5,444,774 A | 8/1995 | Friedes |
| 5,448,626 A | 9/1995 | Kajiya et al. |
| 5,479,487 A | 12/1995 | Hammond |
| 5,495,523 A | 2/1996 | Stent et al. |
| 5,500,891 A | 3/1996 | Harrington et al. |
| 5,511,117 A | 4/1996 | Zazzera |
| 5,526,417 A | 6/1996 | Dezonno |
| 5,535,270 A | 7/1996 | Doremus et al. |
| 5,535,323 A | 7/1996 | Miller et al. |
| 5,544,232 A | 8/1996 | Baker et al. |
| 5,546,452 A | 8/1996 | Andrews et al. |
| 5,546,455 A | 8/1996 | Joyce et al. |
| 5,546,456 A | 8/1996 | Vilsoet et al. |
| 5,548,636 A | 8/1996 | Bannister et al. |
| 5,550,905 A | 8/1996 | Silverman |
| 5,555,297 A | 9/1996 | Ochy P. et al. |
| 5,557,668 A | 9/1996 | Brady |
| 5,563,805 A | 10/1996 | Arbuckle et al. |
| 5,570,419 A | 10/1996 | Cave et al. |
| 5,572,581 A | 11/1996 | Sattar et al. |
| 5,577,112 A | 11/1996 | Cambray et al. |
| 5,581,664 A | 12/1996 | Allen et al. |
| 5,586,178 A | 12/1996 | Koenig et al. |
| 5,586,179 A | 12/1996 | Stent et al. |
| 5,586,218 A | 12/1996 | Allen |
| 5,592,543 A | 1/1997 | Smith et al. |
| 5,594,790 A | 1/1997 | Curreri et al. |
| 5,619,508 A | 4/1997 | Davis et al. |
| 5,619,557 A | 4/1997 | Van Berkum |
| 5,633,923 A | 5/1997 | Kovarik |
| 5,633,924 A | 5/1997 | Kaish et al. |
| 5,640,577 A | 6/1997 | Scharmer |
| 5,652,791 A | 7/1997 | Sunderman et al. |
| 5,657,383 A | 8/1997 | Gerber et al. |
| 5,668,862 A | 9/1997 | Bannister et al. |
| 5,678,002 A | 10/1997 | Fawcett et al. |
| 5,699,431 A | 12/1997 | Van Oorschot et al. |
| 5,701,399 A | 12/1997 | Lee et al. |
| 5,703,943 A | 12/1997 | Otto |
| 5,712,902 A | 1/1998 | Florence et al. |
| 5,715,450 A | 2/1998 | Ambrose et al. |
| 5,724,406 A | 3/1998 | Juster |
| 5,724,419 A | 3/1998 | Harbuziuk et al. |
| 5,724,420 A | 3/1998 | Torgrim |
| 5,740,240 A | 4/1998 | Jolissaint |
| 5,742,675 A | 4/1998 | Kilander et al. |
| 5,790,650 A | 8/1998 | Dunn et al. |
| 5,796,791 A | 8/1998 | Polcyn |
| 5,802,163 A | 9/1998 | Miloslavsky |
| 5,802,526 A | 9/1998 | Fawcett et al. |
| 5,812,781 A | 9/1998 | Fahlman et al. |
| 5,825,869 A | 10/1998 | Brooks et al. |
| 5,826,250 A | 10/1998 | Trefler |
| 5,831,665 A | 11/1998 | Dezonno |
| 5,832,070 A | 11/1998 | Bloom et al. |
| 5,844,982 A | 12/1998 | Knitl |
| 5,848,143 A | 12/1998 | Andrews et al. |
| 5,870,464 A | 2/1999 | Brewster et al. |
| 5,884,032 A | 3/1999 | Bateman et al. |
| 5,907,547 A | 5/1999 | Foladare et al. |
| 5,923,885 A | 7/1999 | Johnson et al. |
| 5,963,635 A | 10/1999 | Szlam et al. |
| 5,991,394 A | 11/1999 | Dezonno et al. |
| 6,044,146 A * | 3/2000 | Gisby et al. ........... 379/266.02 |
| 6,078,325 A | 6/2000 | Jolissaint et al. |
| 6,094,673 A | 7/2000 | Dilip et al. |
| 6,263,066 B1 * | 7/2001 | Shtivelman et al. ... 379/210.01 |
| 6,332,154 B1 * | 12/2001 | Beck et al. ................ 370/352 |
| 6,356,633 B1 * | 3/2002 | Armstrong ............ 379/265.04 |
| 6,449,356 B1 * | 9/2002 | Dezonno ............... 379/265.01 |
| 6,449,646 B1 * | 9/2002 | Sikora et al. ............... 709/224 |
| 6,453,038 B1 * | 9/2002 | McFarlane et al. .... 379/265.05 |

FOREIGN PATENT DOCUMENTS

WO            9712448        4/1997

OTHER PUBLICATIONS

Al Baker, "Looking Ahead: Media Blending", Siemens Business Communication System, Inc. 3 pages, published prior to Sep 21, 1999.

"An Introduction to Computer Telephony", Dialogic Corporation, pp. 1-10, Jan. 1997.

Kerry W. Hassler et al., "Revolutionizing Definity Call Centers in the 1990s", AT&T Technical Journal, pp. 64-75, Jul./Aug. 1995.

"EMMS Electronic Mail & Messaging System", vol. 22, No. 18, pp. 1-4, Oct. 2, 1998.

"Microlog's Uni-Que Agent", Computer Telephony the Magazine for Computer and Telephony Integration, a Miller Freeman Publication, cover page and p. 78, Dec. 1998.

Betty Yuan, "Building an All Media Call Center", Teleconnect, Special Section: Small Call Centers, vol. 17, No. 7, 3 pages, Jul. 1999.

Eric Anrum, "Unified Messaging: It's All Just Email", Business Communications Review, pp. 37-40, Nov. 1998.

Andrew Singleton, "Cash on the Wirehead", 9 pages, Jun. 1995.

* cited by examiner

Period: 4/14/99  
Organization: Services  
Agent: David  
Campaign: All  
Total Activity Recap

Report Date: 4/17/99  
Report Time: 14:05:03

| <u>Log In</u> | <u>Log Out</u> | <u>Duration</u> | Telephone Contacts | | | Email | Web | Other | Total | Avg. Min. <u>Per/Contact</u> |
|---|---|---|---|---|---|---|---|---|---|---|
| | | | <u>In-bound</u> | <u>Out-bound</u> | <u>Total</u> | | | | | |
| 8:00 | 10:00 | 120 | 13 | 4 | 17 | 4 | 3 | | 24 | 5.00 |
| 10:15 | 12:00 | 105 | 7 | 3 | 10 | 11 | 4 | | 25 | 4.20 |
| 12:45 | 14:30 | 105 | 12 | 3 | 15 | 5 | 3 | | 23 | 4.57 |
| 14:45 | 16:00 | 75 | 7 | 6 | 13 | 3 | 2 | | 18 | 4.17 |
| | Total | 405 | 39 | 16 | 55 | 23 | 12 | | 90 | 4.50 |

FIG. 29  204

Contact Handling Time

| | | Unavailable | No Activity | Inbound | Outbound | | | | Total |
|---|---|---|---|---|---|---|---|---|---|
| <u>Log In</u> | <u>Log Out</u> | <u>Time</u> | <u>Time</u> | <u>Telephone</u> | <u>Telephone</u> | <u>Email</u> | <u>Web</u> | <u>Other</u> | <u>Time</u> |
| 8:00 | 10:00 | 2 | 7 | 72 | 24 | 8 | 8 | | 120 |
| 10:15 | 12:00 | 2 | 5 | 45 | 21 | 24 | 8 | | 105 |
| 12:45 | 14:30 | 11 | 4 | 57 | 15 | 11 | 7 | | 105 |
| 14:45 | 16:00 | 3 | 3 | 29 | 28 | 7 | 5 | | 75 |
| | Total | 18 | 19 | 203 | 88 | 50 | 27 | | 405 |

FIG. 30  206

| | Period: | 4/14/99 | | | | Report Date: 4/17/99 | |
|---|---|---|---|---|---|---|---|
| | Organization: Services | | | | | Report Time: 14:05:03 | |
| | Campaign: | All | | | | | |

Total Activity Recap

| Agent | Telephone Contacts Inbound | Telephone Contacts Outbound | Email Contacts | Web Contacts | Other Contacts | Total Contacts | Avg. Min. Per/Contact |
|---|---|---|---|---|---|---|---|
| David Robinson | 43 | 4 | 47 | 4 | | 98 | 4.23 |
| Joe Mc Colum | 34 | 3 | 37 | 11 | | 85 | 5.65 |
| Harry Doyle | 65 | 3 | 68 | 5 | | 141 | 7.89 |
| Jane Alexander | 98 | 6 | 104 | 3 | | 211 | 113.65 |
| Kermit Spenser | 132 | 3 | 135 | 11 | | 281 | 23.50 |
| Mike Alabastor | 45 | 5 | 0 | 5 | | 55 | 4.50 |
| Milan Jones | 32 | 6 | 0 | 6 | | 44 | 4.12 |
| Scott Nyquist | 65 | 8 | 45 | 3 | | 121 | 7.30 |
| Total | 514 | 38 | 436 | 48 | 0 | 1036 | 2.84 |

FIG. 31  208

| | Unavailable Time | No Activity Time | Inbound Telephone | Outbound Telephone | Email | Web | Other | Total Time |
|---|---|---|---|---|---|---|---|---|
| David Robinson | 12 | 14 | 300 | 43 | 23 | 12 | | 404 |
| Joe Mc Colum | 34 | 12 | 234 | 23 | 45 | 15 | | 363 |
| Harry Doyle | 12 | 0 | 432 | 54 | 43 | 16 | | 557 |
| Jane Alexander | 6 | 0 | 123 | 23 | 54 | 18 | | 224 |
| Kermit Spenser | 15 | 0 | 123 | 23 | 67 | 19 | | 247 |
| Mike Alabastor | 7 | 12 | 189 | 56 | 65 | 20 | | 349 |
| Milan Jones | 12 | 45 | 321 | 71 | 23 | 21 | | 493 |
| Scott Nyquist | 23 | 23 | 200 | 23 | 12 | 22 | | 303 |
| Total | 121 | 106 | 1922 | 316 | 332 | 143 | 0 | 2940 |

FIG. 32  210

| | | Total | No Of Abandoned | | Average Abandoned Wait Time |
|---|---|---|---|---|---|
| ACD Group | ACD Name | Calls | Calls | Percent | (in min) |
| 1 | Inbound Sales | 120 | 23 | 19% | 0.34 |
| 2 | Service | 60 | 4 | 7% | 0.56 |
| 3 | Customer Support | 75 | 7 | 9% | 1.5 |
| 4 | Outbound Sales | 68 | 0 | 0% | 0 |
| | Total | 323 | 34 | 11% | |

Period: 4/14/99
Report Date: 04/17/99
Report Time: 14:05:03

FIG. 33   212

Shift 1

| | | Total Calls | No Of Abandoned Calls | Percent | Average Abandoned Wait Time (in sec) | Average Pre Call Processing Time |
|---|---|---|---|---|---|---|
| 8:00 | 8:15 | 5 | 0 | 0% | 0 | 0 |
| 8:15 | 8:30 | 5 | 0 | 0% | 0 | 0 |
| 8:30 | 8:45 | 9 | 3 | 33% | 115 | 136 |
| 8:45 | 9:00 | 8 | 1 | 13% | 15 | 15 |
| 9:00 | 9:15 | 6 | 1 | 17% | | |
| 9:15 | 9:30 | 7 | 1 | 14% | | |
| 9:30 | 9:45 | 2 | 0 | 0% | | |
| 9:45 | 10:00 | 12 | 4 | 33% | | |
| 10:00 | 10:15 | 15 | 3 | 20% | | |
| 10:15 | 10:30 | 7 | 1 | 14% | | |
| 10:30 | 10:45 | | | | | |
| 10:45 | 11:00 | | | | | |
| 11:00 | 11:15 | | | | | |
| 11:30 | | | | | | |

FIG. 34   214

Organization : Services  
Reporting Period: 4/14/99  
Campaign:  Widgets 1

Report Date: 04/17/99  
Report Time: 14:05:03

| Shift 1 | | Calls | E-Mails | Web Contacts | Total Contacts | Average Wait (in Min) | Average Session (in Min) | Average Wrap-up (in Min) |
|---|---|---|---|---|---|---|---|---|
| 8:00 | 8:15 | 5 | 15 | | 20 | 0.00 | 3.50 | 0.50 |
| 8:15 | 8:30 | 5 | | 1 | 6 | 0.00 | 4.20 | 0.03 |
| 8:30 | 8:45 | 9 | | | 9 | 3.00 | 6.30 | 0.40 |
| 8:45 | 9:00 | 8 | 5 | | 13 | 7.50 | 15.00 | 0.40 |
| 9:00 | 9:15 | 6 | | | 6 | 1.00 | 15.00 | 0.40 |
| 9:15 | 9:30 | 7 | | 1 | 8 | 1.00 | 15.00 | 0.40 |
| 9:30 | 9:45 | 2 | | | 2 | 0.00 | 15.00 | 0.40 |
| 9:45 | 10:00 | 12 | | | 12 | 4.00 | 15.00 | 0.40 |
| 10:00 | 10:15 | 15 | | | 15 | 3.00 | 15.00 | 0.40 |
| 10:15 | 10:30 | 7 | | | 7 | 1.00 | 15.00 | 0.40 |
| 10:30 | 10:45 | 12 | 1 | | 13 | | | |
| 10:45 | 11:00 | 2 | | | | | | |

Organization : Services  
Reporting Period: 4/14/99  
Campaign:  Widgets 1

Report Date: 04/17/99  
Report Time: 14:05:03

OUTCOME: Successful Contact

Successful Contacts Result Summary

| Result | Inbound Telephone Calls | Outbound Telephone Calls | Email Contacts | Web Contacts | Other Contacts | Total Contacts |
|---|---|---|---|---|---|---|
| New Customer Sale | 16 | 8 | 17 | 17 | | 58 |
| Existing Customer Sale | 56 | 23 | 5 | 23 | | 107 |
| No Sale | 34 | 34 | 7 | 5 | | 80 |
| Successful Service - Products | 21 | 32 | 23 | 7 | | 83 |
| Unsuccessful Service - Products | 80 | 12 | 4 | 9 | | 105 |
| Other | 12 | 23 | 5 | 12 | | 52 |
| Total | 219 | 132 | 61 | 73 | 0 | 485 |

FIG. 36 —218

Successful Contact Result Detail

Result - New Customer Sale

| Reason | | | Inbound Telephone Calls | Outbound Telephone Calls | Email Contacts | Web Contacts | Other Contacts | Total Contacts |
|---|---|---|---|---|---|---|---|---|
| Good Price | | | 3 | 1 | 2 | 2 | | 8 |
| Loyal Customer | | | 1 | 2 | 2 | 3 | | 8 |
| Likes Product | | | 6 | 0 | 1 | 1 | | 8 |
| In a Good Mood | | | 1 | 1 | 3 | 8 | | 13 |
| Has the Money | | | 2 | 3 | 4 | 2 | | 11 |
| Other | | | 3 | 1 | 5 | 1 | | 10 |
| Total | | | 16 | 8 | 17 | 17 | 0 | 58 |

FIG. 37  220

| | | | | | | Report Date: 04/17/99 | |
|---|---|---|---|---|---|---|---|
| Organization : Services | | | | | | Report Time: 14:05:03 | |
| Reporting Period: 4/14/99 | | | | | | | |
| Campaign: | | | | | | | Total |
| | Outbound | Rerouted | Outbound No Connects | | | | No Contacts |
| Agent | No Contact Telephone Calls | Inbound Contacts | Busy Signals | No Answer | SIT Tone No Connect | Answering Machines | Total No Connects | Reroutes & No Connects |
| David Robinson | 43 | 34 | 4 | 23 | 1 | 23 | 28 | 105 |
| Joe Mc Colum | 34 | 31 | 11 | 12 | 2 | 12 | 25 | 90 |
| Harry Doyle | 65 | 60 | 5 | 16 | 5 | 4 | 26 | 151 |
| Jane Alexander | 98 | 91 | 3 | 19 | 1 | 2 | 23 | 212 |
| Kermit Spenser | 132 | 124 | 11 | 23 | 2 | 13 | 36 | 292 |
| Mike Alabastor | 45 | 33 | 5 | 25 | 3 | 34 | 33 | 111 |
| Milan Jones | 32 | 26 | 6 | 28 | 1 | 12 | 35 | 93 |
| Scott Nyquist | 65 | 63 | 3 | 12 | 2 | 1 | 17 | 145 |
| Total | 514 | 462 | 48 | 158 | 17 | 3 | 223 | 1199 |

FIG. 38  222

|  |  |  |  |  |  |  |  | Report Date: 04/17/99 |
|---|---|---|---|---|---|---|---|---|
| Organization : Services |  |  |  |  |  |  |  | Report Time: 14:05:03 |
| Reporting Period: 4/14/99 |  |  |  |  |  |  |  |  |
| Campaign: |  |  |  |  |  |  |  |  |
|  | Outbound | Right |  | Wrong | No Connects |  |  | Total |
|  | Telephone | Party |  | Party | Busy | No | SIT Tone | Answering | No |
| Agent | Attempts | Contacts | Percent | Contacts | Signals | Answer | No Connect | Machine | Connects |
| David Robinson | 71 | 34 | 48% | 9 | 4 | 23 | 1 | 3 | 28 |
| Joe Mc Colum | 59 | 31 | 53% | 3 | 11 | 12 | 2 | 23 | 25 |
| Harry Doyle | 91 | 60 | 66% | 5 | 5 | 16 | 5 | 21 | 26 |
| Jane Alexander | 121 | 91 | 75% | 7 | 3 | 19 | 1 | 17 | 23 |
| Kermit Spenser | 168 | 124 | 74% | 8 | 11 | 23 | 2 | 12 | 36 |
| Mike Alabastor | 78 | 33 | 42% | 12 | 5 | 25 | 3 | 3 | 33 |
| Milan Jones | 67 | 26 | 39% | 6 | 6 | 28 | 1 | 4 | 35 |
| Scott Nyquist | 82 | 63 | 77% | 2 | 3 | 12 | 2 | 6 | 17 |
| Total | 737 | 462 | 63% | 52 | 48 | 158 | 17 | 89 | 223 |

FIG. 39   224

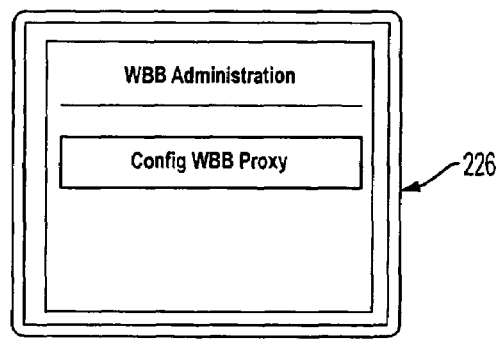

CONTACT CENTER SYSTEM CAPABLE OF HANDLING MULTIPLE MEDIA TYPES OF CONTACTS AND METHOD FOR USING THE SAME

CROSS-REFERENCE TO RELATED APPLICATIONS

Related subject matter is disclosed in a co-pending U.S. patent application of Gary E. Korzeniowski, William R. Lewis, Jr., and Ly K. Peang-Meth entitled "Method and System for Enabling Computer Terminals in a Call Center Environment to Display and Perform Telephony Related Functions," Ser. No. 09/260,549, filed on Mar. 2, 1999, the entire contents of which is expressly incorporated herein by reference.

BACKGROUND OF THE INVENTION

1. Field of the Invention

The present invention relates to a contact center system capable of handling different types of media contacts. More particularly, the present invention relates to a contact center system capable of receiving contacts of different media types, such as telephone calls, e-mails, facsimiles, web chat, voice over Internet protocol, and so on, maintaining the different media-type contacts in a common queue, and distributing the queued contacts to appropriate agents in the contact center for handling based on criteria associated with the contacts and the available agents.

2. Description of the Related Art

Many businesses such as commercial retailers, financial institutions such as banks and lending companies, credit card companies, telemarketing companies, and so on, employ customer service representatives or agents who assist customers by telephone. Generally, the agents are grouped into a particular environment commonly known as a "call center". Typically, each agent is assigned to a telephone having a particular extension number. The telephones are connected to a telephony switch, such as a private branch exchange (PBX), or preferably, an automatic call distributor (ACD) which functions to distribute incoming calls to the agents.

That is, a call center will typically have one or more telephone numbers, such as toll-free numbers, which customers can call to place a purchase order, register a complaint, or conduct other business with an agent. When the telephony switch receives an incoming call, the telephony switch searches for an extension number that is available, and transfers or switches the incoming call to that extension number. The phone assigned to that extension number rings, and when the receiver is taken off-hook by the agent, the agent is connected with the incoming call.

The agent can then take the caller's information over the phone, and manually enter that information into a computer terminal. The information is then handled in the appropriate manner by the computer system assigned to the call-center. For instance, if the caller wishes to place an order, the agent may enter the information in a computer-generated order form which appears on the agent's computer display screen. Also, if the caller is a repeat customer, the agent can use the computer terminal to access the caller's files, based on the caller's name, telephone number, credit card number, or the like.

In recent years, technology has developed to enable computer terminals in call centers to display information in response to incoming calls being handled by the telephony switch. For example, an article by Dialogic Corporation entitled "An Introduction to Computer Telephony", published in IEEE Communications Magazine in May 1996, describes a computer telephony system which controls an agent's computer terminal to display or "pop-up" certain information in response to an incoming telephone call routed to that agent.

That is, when the incoming call is received at the agent's telephone, the system also sends a telephone event message to the agent's computer terminal. The telephone event message is processed by a program running at the agent's computer terminal, which enables the program to retrieve desired data from a database. The computer terminal can display the retrieved information on the computer display screen when the agent answers the incoming call. Accordingly, the agent can receive information over the phone from the caller, and enter that information into the computer at the appropriate positions on the display screen. The agent can also use the information displayed on the display screen to assist the caller with his or her particular problem.

Although known computer telephony call centers provide some benefit in enabling an agent to handle incoming calls, traditional call centers are incapable of efficiently handling requests made in media other than telephony. For example, traditional call centers are incapable of efficiently routing customer request or complaints that are received, for example, via facsimile. Also, although the agent's individual computer terminals may be equipped with e-mail, these traditional call centers generally do not have a mechanism for routing customer e-mails to the agents for handling. Furthermore, call centers of this types are incapable of supporting any internet-based activity from customers, such as voice over Internet protocol (voice over IP) communications, web chat communications, and so on.

With the proliferation in use of the Internet, many businesses have found traditional call centers to be unsuitable for servicing their customers. Accordingly, call centers are being expanded to be capable of handling other types of Internet-based media, such as e-mail and web-based communications. For example, U.S. Pat. No. 5,884,032 to Bateman et al. describes a call center having some limited web-browser based capabilities. Specifically, the patent describes a call center which allows a customer to submit a call-back request to the call center via an entry on the call center's web page. The call center will then place the call back to the customer, and establish a telephony connection between the customer and an agent in the call center, so that the agent can service the customer.

However, the call center disclosed in the Bateman patent, as well as other call centers having limited web-browser based capabilities, are incapable of sufficiently handling contacts from customers that are received over different types of media, such as via facsimile, e-mail, Internet-based media, and so on. In particular, these conventional call centers are incapable of collectively routing the different types of media contacts to the appropriate agents in a timely and organized manner.

Accordingly, a need exist for a call center that is capable of receiving contacts over various types of media, such as telephony, e-mail, facsimile, Internet-based media, and so on, and efficiently routing the received contacts to the appropriate agents in the call center for handling for handling in a timely manner.

SUMMARY OF THE INVENTION

An object of the present invention is to provide a contact center system capable of efficiently and effectively handling different types of media contacts.

Another object of the present invention is to provide a contact center system capable of receiving and maintaining different types of contact media in a common queue when awaiting routing to the appropriate agents of the call center system.

A further object of the present invention is to provide a contact center system capable of receiving contacts of different media types, such as telephone calls, e-mails, facsimiles, web chat, voice over Internet protocol, and so on, maintaining the different media types contacts in a common queue, and distributing the queued contacts to appropriate agents in the contact center for handling based on criteria associated with the contacts and the available agents.

These and other objects are substantially achieved by providing a contact center system comprising a plurality of agent workstations, and which includes a queuing component, capable of receiving contacts of different media-types, such as telephone calls, e-mails, facsimiles, web callbacks, web chat, voice over internet protocol, and so on, and maintaining the different media types contacts in a common queue while awaiting routing to the agent workstations. The system further comprises a routing component which routes the queued contacts to the agents based on criteria of the contacts, criteria of the agents, or both. A media changing component of the system is capable of changing a media-type of any of the media-type contacts to generate a changed media-type contact, while the queuing component is capable of entering the changed media-type contact in the common queue, and the routing component is capable of routting the queued changed media-type contact to at least one of the workstations. A contact handling component initiates an event at any of the workstations in response to the contact being routed to the workstation, so that an agent at the workstation can handle the contact as appropriate.

BRIEF DESCRIPTION OF THE DRAWINGS

These and other objects, advantages and novel features of the invention will be more readily appreciated from the following detailed description when read in conjunction with the accompanying drawings, in which:

FIGS. 29 through 39 illustrate examples of different types of reports generated by the system administrator using the menu shown in FIG. 28;

FIG. 40 is an example of a menu which is displayed by a workstation to enable a system administrator to access a window to enter criteria for a Web bulletin board accessible by the call center system;

FIG. 91 is an example of another window that can be displayed on the display screen of a contact's PC when performing a web chat;

FIG. 92 is an example of another window that can be displayed on the display screen of a contact's PC when the contact is performing a web chat;

DETAILED DESCRIPTION OF THE PREFERRED EMBODIMENTS

Figure 1:
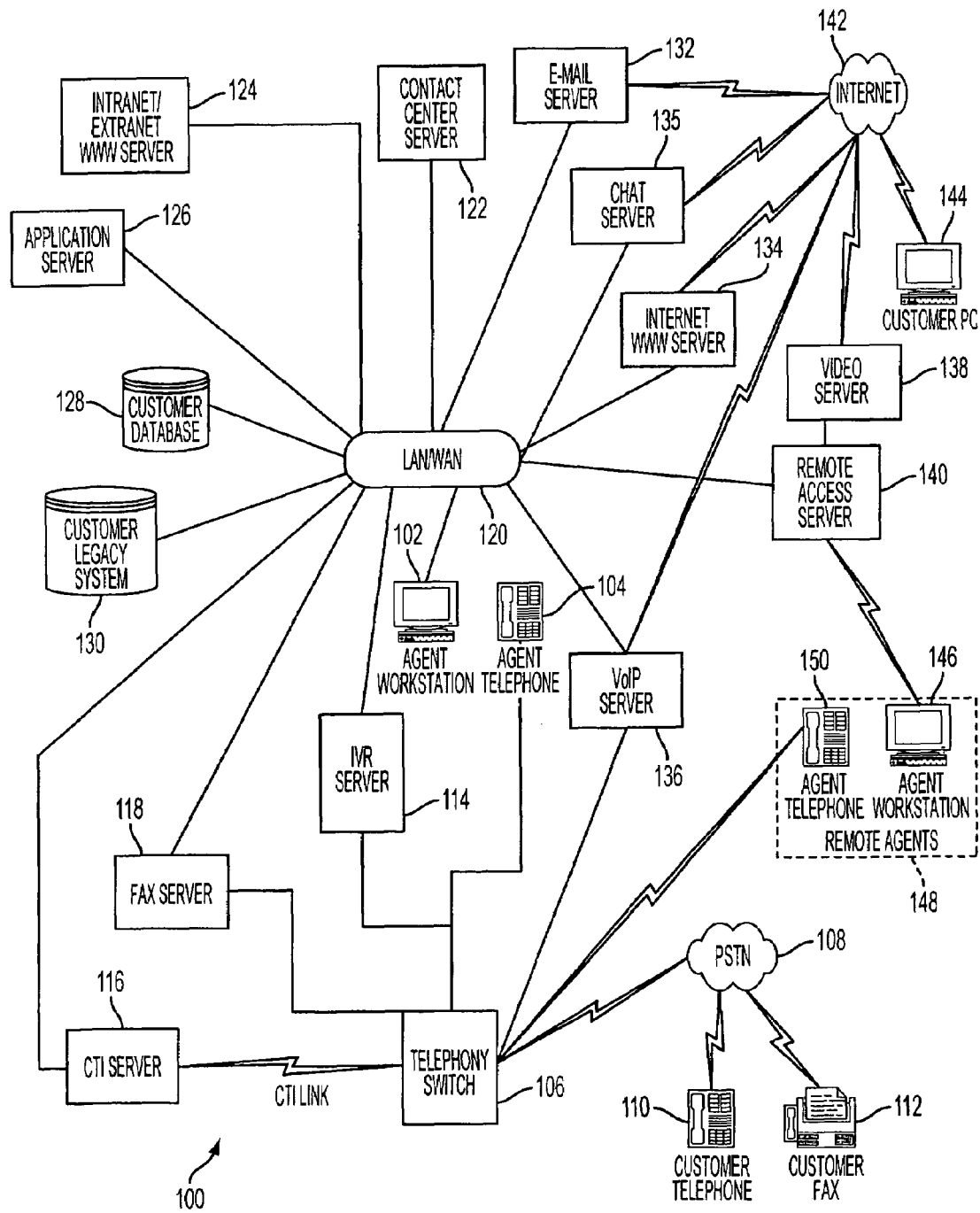
FIG. 1 is a block diagram of an example of a call center system according to an embodiment of the present invention, which is capable of receiving contacts of different media and efficiently routing the contacts to a plurality of agent workstations.

FIG. 1 is a block diagram of a contact center 100 according to an embodiment of the present invention. The contact center includes a plurality of agent work stations 102 which are each operated by an agent, such as a customer service representative or the like. Each agent workstation 102 includes a computer terminal having a computer display screen, and standard required hardware, such as a CPU, ROM, RAM, and so on. For exemplary purposes, only one workstation 102 is shown.

The computer terminal of each agent workstation 102 should include, or otherwise have access to, a Java-enabled web browser with a Java virtual machine supporting version 1.1.4 or better of Java. Netscape 4.06 or better and Microsoft Internet Explorer 4.72.2106.8 or better both meet this requirement. Hot Java also can be a suitable web browser.

Each agent workstation 102 is associated with a respective keypad-type telephone station 104 (hereinafter referenced to as a "telephone"). For exemplary purposes, only one telephone 104 is shown. The telephones 104 each include a standard telephone headset, or alternatively can include a headset having an earphone and a microphone. A unique extension number is assigned to each telephone 104. For example, sequential 3-digit extension numbers "100," "101," . . . " nnn" can be assigned to the telephones 104. However, the extension number can be assigned in any manner and can include any desired number of digits.

As further shown in FIG. 1, the telephones 104 are connected to a telephony switch 106, such as an ACD known in the art. The telephony switch is connected to the public switched telephone network (PST) 108, which is in turn connected to residential, commercial, and public telephones. An exemplary keypad-type telephone is shown as a customer telephone 110. Also, a customer can have a customer facsimile (fax) machine 112, which is also connected to the PSTN 108.

As further shown, the telephony switch 106 can be connected to an interactive voice response (IVR) server 114 or other automated attendant features, which provide a caller with voice instructions to enter information pertaining to the manner in which the call should be handled by the telephony switch 106.

The telephony switch 106 is further connected to computer telephony integration (CTI) server 116 by a CTI link, the functions of which are described below. Furthermore, the telephony switch 106 is connected to a fax server 118, the functions of which are described below.

As further shown in FIG. 1, the computer terminals of the agent workstation 102, along with the IVR server 114 and fax server 118 are coupled to a local area network (LAN) or, alternatively, a wide area network (WAN), and thus communicate with each other over the LAN/WAN 120. As described in more detail below, the contact center 100 further includes a contact center server 122, an Intranet/extranet WWW server 124, an application server 126, a customer database 128, and a customer legacy system 130, which are all connected to the LAN/WAN 120.

As further described below, the contact center system 100 is capable of receiving and routing Internet-based contacts. Accordingly, the call center system 100 includes an e-mail server 132, an Intranet/extranet WWW server 134, a chat server 135, a voice over internet protocol (VoIP) server 136, a video server, 138, and remote-access server 140, which are each capable of providing Internet access for the contact center system 100, and are each connected to the LAN/WAN 120. For example, the e-mail server 122, WWW server 134, VoIP server 136, video server 138, and remote-access server 140 are capable of handling Internet-based media that can be received over the Internet 142 from a customer PC 144 running a Java-enabled web browser of the type described above, or any other suitable web browser.

Furthermore, the remote-access server 140 provides access to remote agent workstations 146 of remote agents 148 that are at locations remote from the contact center system 100. Like the agents who are local to the contact center system 100, the remote agents 148 also include agent telephones 150 associated with the agent workstations 146. As shown, the remote agent telephones 150 can communicate with the telephony switch 106 via the PSTN 108.

As will now be described, the contact center system 100 is configured to receive, organize, queue, and properly route contacts of different media types to the agent telephones 104 and, if appropriate, to the agent workstations 102. The system 100 can also route the contacts to the agent telephones 150 and, if appropriate, to the agent workstations 146 of the remote agents 148.

One of the basic structures used in the contact center system 100 to achieve this organizing and routing of contacts is a concept known as a "campaign". The term originally comes from a traditional call center where the basic measure of work was the telephone call and "campaigns" were created to organize the workers within a call center around the various types of telephone calls that were received or made.

Campaigns are often thought of as outbound telemarketing campaigns where a plan is organized, a list of contacts are identified, a time frame for running the campaign is decided, a script is developed, and a desired response is sought. Once initiated, specific results are recorded to measure the success of the campaign.

Generally, and for purposes of this disclosure, a campaign is defined as a focused set of resources targeted towards achieving a specific goal according to a pre-established plan. Campaigns are not restricted to outbound telemarketing activities. Within the contact center system 100, campaigns are the universal elements upon which the work of a contact center can be organized. Campaigns can be either outbound or inbound. Campaigns are not necessarily dependent upon selling a product or requesting a response from a specific group. There are customer service campaigns where the campaign is created for anyone calling in with a question. There can be a technical support campaigns where problems are reported. Basically, any organized structure created to accept, distribute, and monitor work coming into an organization using any media type is considered a campaign. An example of criteria of a campaign for the call center system 100 is set forth in the attached Appendix.

As exemplified in more detail below, once a contact is initiated, the contact center system 100 prioritizes the contact and sends it to the agent queue. Based on the priority ranking for customer type, customer media type, agent skill needed, or type of contact, all of which are set up in advance by the system administrator, the contact is moved higher and higher in the queue. Thus, the best customers can be handled quickly, and by the best available agent.

As also exemplified in detail below, the software and related hardware of the contact center system 100 provide multimedia blending in a contact center. Specifically, the software and related hardware provide unified queuing of all media types, such as e-mail, telephony, web chat, and web call back into a single unified queue. The software and associated hardware also provide skills-based and priority-based routing of these contacts to agents within the contact center.

Configuring the Call Center System

Before the first contact is received, the contact center system 100 must be configured. Also, prior to beginning the actual process of configuring the contact center system is begun, there is a significant amount of information that should be gathered from a variety of different sources.

Some types of information are required, while other types are optional, or not needed unless the system will be handling a particular media type requiring certain information. Once the system 100 is ready to be configured, the following configuration information is inserted in the sequence shown in Table 1:

TABLE 1

Exemplary Configuration Information

| Required Data | |
|---|---|
| Routing Rules | This will include creating a set of skills, customer types, and media types. |
| Agents | This will include creating agent profiles and linking skills and media types to the Agent. |
| Telephony | This will include configuring the telephony extensions, devices, and IVR ports (if any). |
| Campaigns | Creating new campaigns, assigning Agents to campaigns, configuring the telephony devices and incoming call mapping. |
| E-mail Proxy | If e-mail routing will be used in the contact center. |
| Optional Data | |
| Outcome Results and Reason | If the system is tracking the result of each contact handled, Result and Reason choices for each of the campaigns will need to be created . . . |
| Incoming Telephone Numbers | Special telephone numbers (800, toll free, etc.) assigned to a campaign. |
| Text String to Skill Mapping | Used for written contact types such as e-mail, faxes, and regular mail messages to determine required skills to properly service the contact. |

Figure 2:
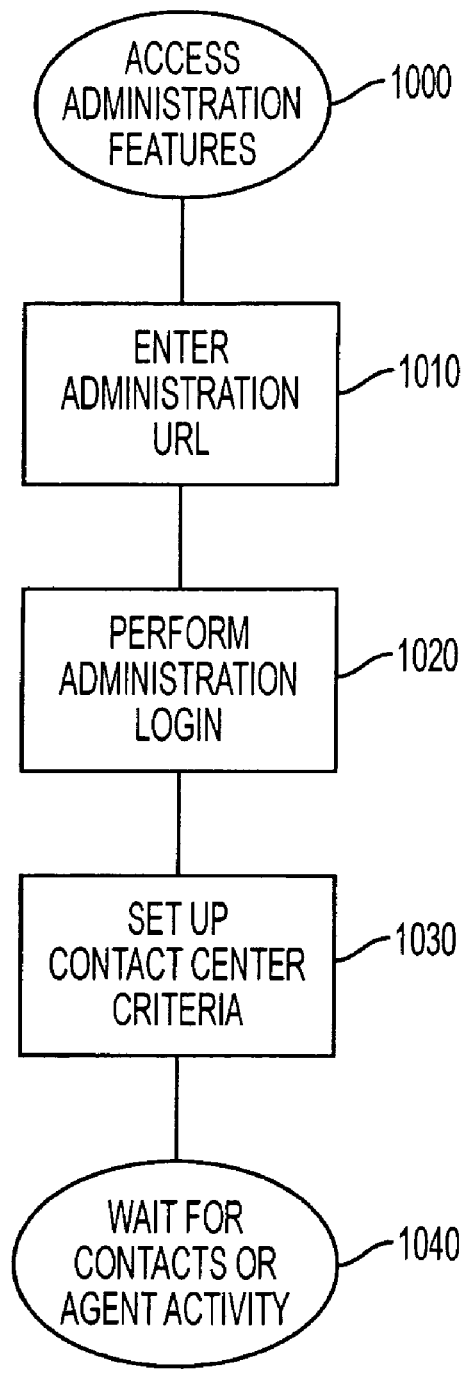
FIG. 2 is a flowchart illustrating exemplary operations performed by a system administrator to configure the call center system shown in FIG. 1 according to an embodiment of the present invention.

The administration features of the contact center system 100 allow a user to manage campaigns, agents, telephony devices, e-mail configurations, routing, and generate reports. Access to contact center system administration is provided through a link on a Web page being displayed on any of the agent workstations 102 or remote agent workstations 146, provided that the user of the workstation 102 or 146 has administrator privileges. For purposes of this explanation, it will be assumed that the administration features are being accessed from a local agent workstation 102. Steps associated with accessing the administration features to set up the criteria of the contact center system 100 are shown in the flowchart of FIG. 2.

Figure 3:
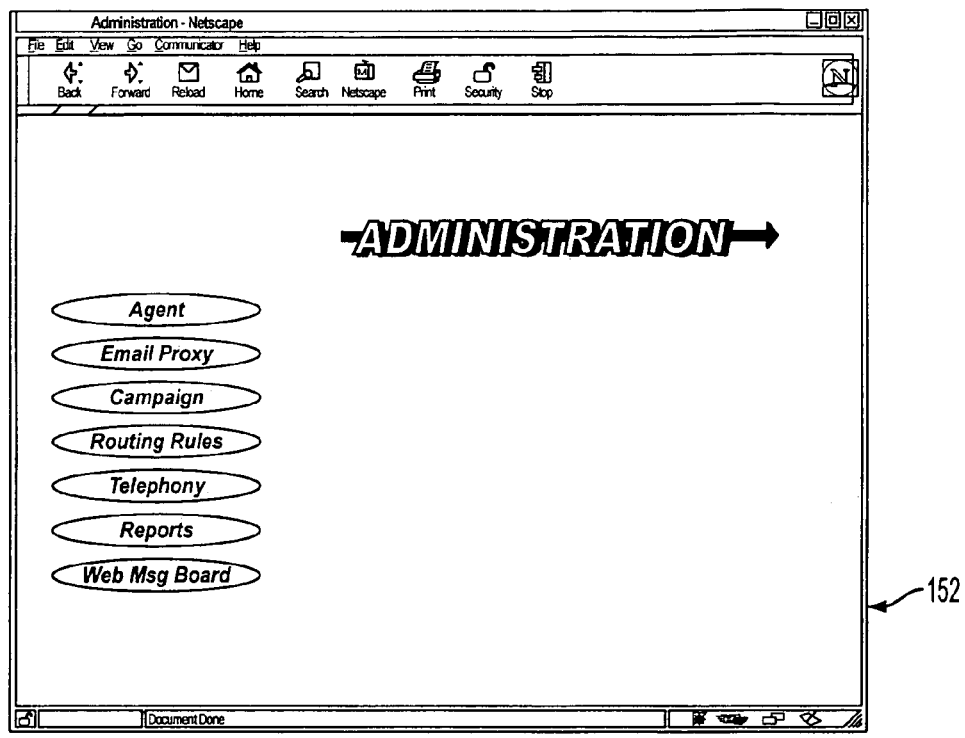
FIG. 3 is an example of an administrative menu displayed on a display screen of a workstation of the system shown in FIG. 1 for configuring the system.

Specifically, to access the administration features beginning in step 1000, a user can open the administration application by typing the URL in the location field in the web browser running on his or her workstation 102 as indicated in step 1010. The workstation 102 will then display an administration page 152 as shown in FIG. 3, having the buttons described in Table 2 as follows:

TABLE 2

Description of the Administration Web Page Buttons

| Item | Description |
| --- | --- |
| Agent | Allows system administration to set up and maintain agent accounts, which includes Agent profile information, Agent skill assignments, and Agent media skill assignments. |
| Email Proxy | Allows system administration to configure e-mail mailboxes to be monitored by the e-mail proxy and its related configuration items. |
| Campaign | Allows system administration to set up campaigns, configure contact outcome reasons and results, and assign Agents to campaigns. |
| Routing Rules | Allows system administration to create text/skill mappings, contact types, media types and skill. |
| Telephony | Allows system administration to configure telephony extensions, ACD queues, route points, and IVR ports to be used by system through the CTI link . . . |
| Reports | Standard performance reports which can be generated by system. |
| Web Msg Board | Allows system administration to set up the configuration for the Web Bulletin Board. |

Figure 4:
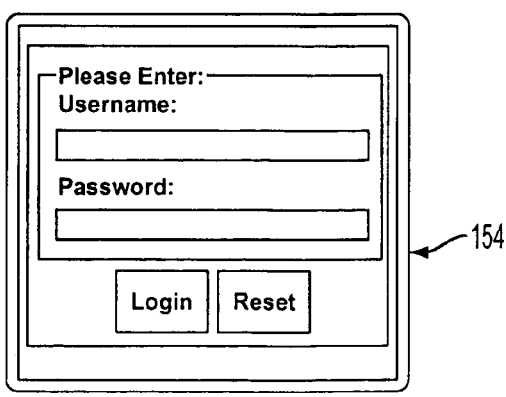
FIG. 4 is an example of a login interface display which is displayed by a workstation to enable a system administrator to log into the call center system to access the configuration features of the administrative menu shown in FIG. 3.

To login in step 1020, the user can click on any buttons of the Administration Main Menu 152. A Login interface display 154 will appear on the display screen of the agent workstation 102 as shown in FIG. 4. The buttons and entry items on the Login interface 154 are described in Table 3 as follows:

TABLE 3

Login Interface Buttons and Entry Items

| Item | Description |
| --- | --- |
| Username: | Administrator user name (4–20 characters) |
| Password: | Administrator password (6–12 characters, displays asterisks) |
| Login | Button to log into system Administration. |
| Reset | Button to clear the fields of any data. |

The user can perform the following operations to log into the administration features if he or she has system administration privileges:

1. Click in the Username: field and type his or her user name.
2 Click in or tab to the Password: field and type his or her password. As the user types his or her password, only asterisks (*) will appear in the field.
3. Click Login The interface will then close, and the user is now ready to use all of the administration features to set up the criteria of the contact center system 100 in step 1030 as will now be described. For purposes of the following explanation, the logged-in user will be referred to as a system administrator. Also, it is noted that the viewing area on most of the interface windows is limited. Therefore, if a scroll bar appears to the right of a window, there are more entries to view.

An agent's role within a campaign is to accept and complete the basic work unit of the campaign (i.e. the contact interaction). Receiving contacts, developing and delivering appropriate responses, and reporting contact results are all part of an agent's responsibility. In order to manage the contact center, the system administrator will need to configure how contacts are distributed to the agents. Whether or not all of the agents have equal abilities to handle contacts, strategically, the contact center might be better served by limiting the types of contacts that individual agents should receive. The agent administration allows agent administrator to set up the agents in the contact center system 100 and to assign them system skill sets and media types they are to receive.

Figure 5:
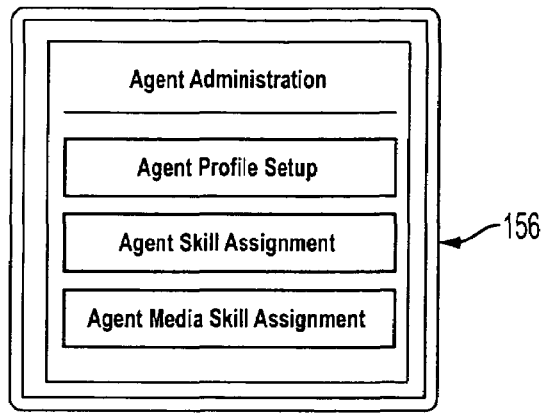
FIG. 5 is an example of an agent administration menu which is displayed by a workstation to enable a system administrator to enter criteria pertaining to the agents of the call center system.

From the Administration Main Menu 152, the user can click the Agent button to cause an Agent Administration Menu 156 to be displayed on the display screen of the workstation 102 as shown in FIG. 5. The buttons of the Agent Administration Menu 156 are described in Table 4 below:

TABLE 4

Agent Administration Menu Buttons

| Item | Description |
| --- | --- |
| Agent Profile Setup | To identify a new Agent by name, create a user name and password, and grant administrative privileges. |
| Agent Skill Assignment | To link defined skills to an Agent. |
| Agent Media Skill Assignment | To link defined media types to an Agent. |

Figure 6:
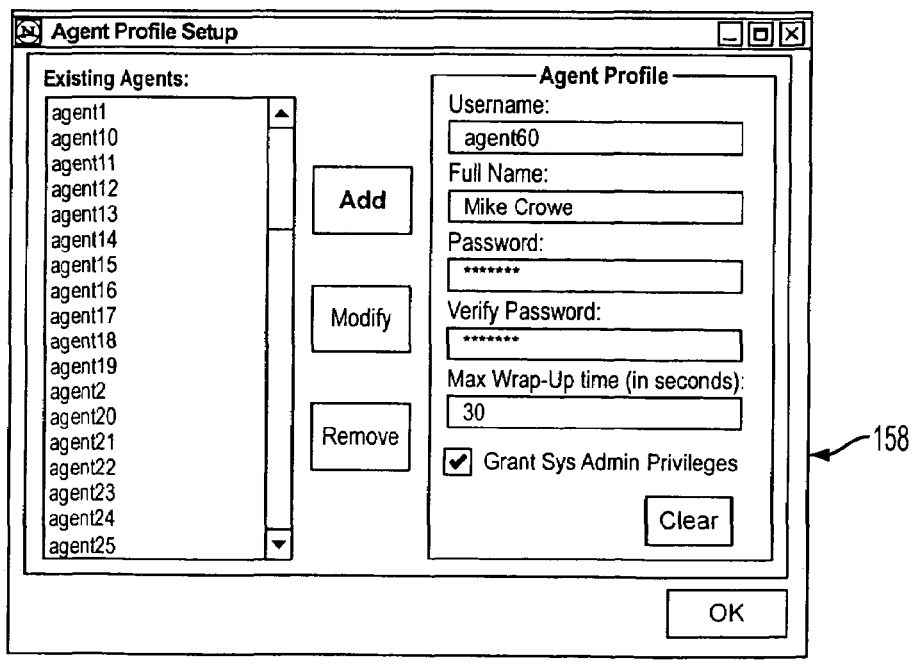
FIG. 6 is an example of an agent profile setup window which is displayed by a workstation to enable a system administrator to enter profile criteria pertaining to the agents of the call center system.

A new agent will start with just the personal information. As the agent is trained and assigned to various campaigns, skills, media and telephony, attributes will be linked to the agent. From the Agent Administration Menu 156, the user can click the Agent Profile Setup button to cause the Agent Profile Setup Window 158 to appear as shown in FIG. 6. The buttons and entry items of the Agent Profile Setup Window 158 are described in Table 5 as follows.

TABLE 5

Agent Profile Setup Window Buttons and Entry Items

| Item | Description |
| --- | --- |
| Username: | Agent user name (6 to 12 characters, no spaces) |
| Full Name: | Agent name as displayed to the public (254 character limit, including spaces) |
| Password | Agent password (6 to 12 characters, no spaces). Only asterisks appear in the this field. NOTE: Can be changed by the Agent after login. |
| Verify Password: | Repeat of password typed in the Password: field to verify accuracy. Only asterisks appear in the this field. |
| Max Wrap-Up Time (in seconds): | Period of time the Agent is expected to complete the Wrap-Up process on the average (1 to 600 seconds). Agent's Wrap-Up time display will begin counting down from this number of seconds (displayed to the Agent in the format (H)H:MM:SS). |
| Grant Sys Administration Privileges | Checkbox to allow the Agent all of the system privileges of an Administrator. |
| Clear | Button to clear any data entered into the Agent Profile fields. |
| OK | Button to accept the Agent Profile Setup. |

To add an agent, the system administrator can perform the following operations:
1. Enter data in Username:, Full Name:, and Password:.
2. Repeat the same Password in the Verify Password: field
3. Enter a time allotment in seconds the Max Wrap-Up time: field.
4. If this Agent is also an Administrator, click the Grant Sys Administration Privileges checkbox.
5. Click OK.

The Agent Profile Setup window 158 will then close, and the system administrator will be returned to the Agent Administration Menu 156.

To modify the criteria of an existing agent, the system administrator can perform the following operations:
1. Using the down arrow in the Existing Agents: list box, scroll down to the agent the to change
2. Once the correct agent is located, click in the field on the right side of the window to change
3. Enter the new information
4. Click Modify, then click OK The Agent Profile Setup Window 158 will then close, and the system administrator will be returned to the Agent Administration Menu 156. It is noted, however, that the username cannot be modified. To change the Username name, remove the entire agent record, and then create a new agent record.

To remove an existing agent, the system administrator can then perform the following operations:
1. Using the down arrow in the Existing Agents: list box, scroll down to the Agent to be deleted.
2. Click Remove, then click OK.

The Agent Profile Setup Window 158 will close and the agent administrator will be returned to the Agent Administration Menu 156.

A campaign will normally require an agent who is trained on the various features of the product or service offered. A word or two can define these skills. For example, a lawn mower company may wish to promote a new weed trimmer as well as its regular line of products. Skills for this campaign would include knowledge of 'weed trimmer', 'mower' and possibly 'riding mower'.

Figure 7:
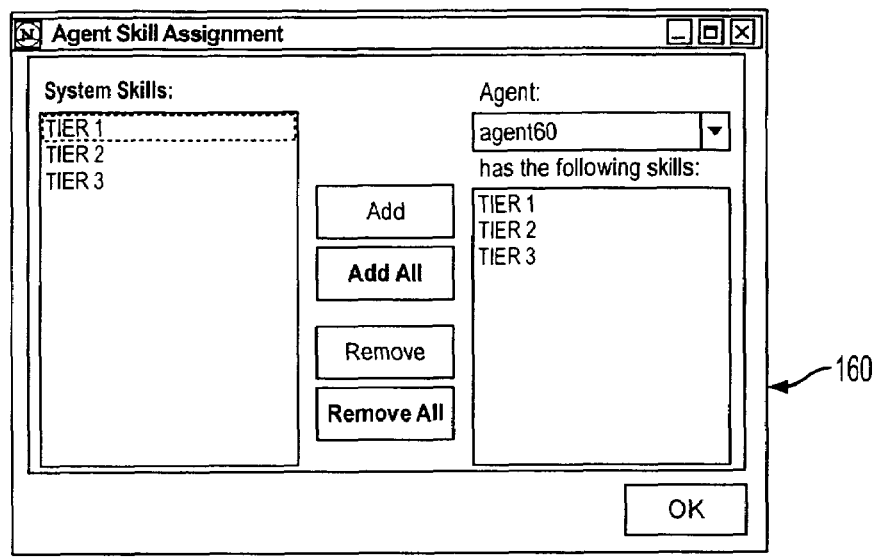
FIG. 7 is an example of an agent skill assignment window which is displayed by a workstation to enable a system administrator to enter system related skills associated with agents of the call center system.

To add new skills requirements for the agents, the system administrator can click the Agent Skills Assignment button on the Agent Administration Menu 156 to cause the Agent Skills Assignment Window 160 to be displayed as shown in FIG. 7. The buttons and entry items of the Agent Skills Assignment Window 160 are described in Table 6 below.

TABLE 6

Agent Skill Assignment Window Buttons and Entry Items

| Item | Description |
| --- | --- |
| System Skills: | All the currently defined skills in all the active campaigns. |
| System Agent: | A pull-down list of all the active Agents. |
| has the following skills | The skills currently linked to the selected Agent. |
| Add | Button to add any selected System Skills to the Agent's list. |
| Add All | Button to add all System Skills to the Agent's list. |
| Remove | Button to remove selected skills from the Agent's list. |
| Remove All | Button to remove all skills from the Agent's list. |
| OK | Button to accept the Agent Skill Assignment |

To add a skill to an agent's profile, the system administrator can perform the following operations:

1. Select an agent by using the down arrow on the Agent: drop-down list box. If the agent already has linked skills, these will appear in the has the following skills: list box.
2. On the System Skills: list box, select the skill to add. If a vertical scroll bar appears to the right of the list box, there are more skills to view.
3. Click Add, then click OK.

The Agent Skill Assignment window will close and the system administrator will be returned to the Agent Administration Menu 156. The agent administrator can verify the skills linked to an agent by opening up the Agent's profile from the Agent Administration Menu 156. It is also noted that the Add All button of the Agent Skills Assignment Window 160 will add the entire list of system skills. Hence, when creating a new Agent with multiple skills, it might be easier to add the entire list, then remove those that do not apply.

To remove a skill from an agent's profile, the system administrator can perform the following operations:
1. Select an Agent by using the down arrow on the Agent: drop-down list box.
2. Once an Agent has been specified, select the skill under the has the following skills: list box.
3. Click Remove, then click OK The Agent Skill Assignment window will close and the system administrator will be returned to the Agent Administration Menu 156. The agent administrator can verify the skills linked to an agent by opening up the agent's profile from the Agent Administration Menu 156. It is also noted that the Remove All button of the Agent Skills Assignment Window 160 will delete all the skills linked to the selected Agent.

Figure 8:
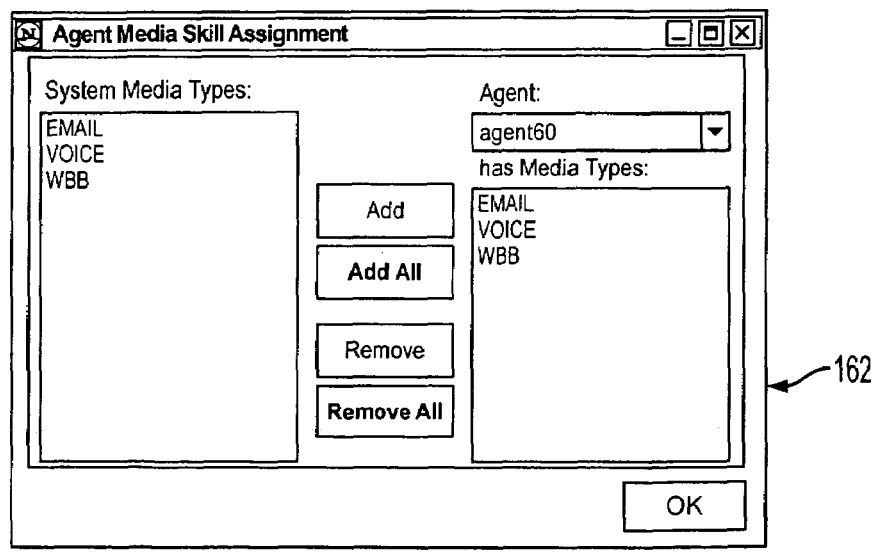
FIG. 8 is an example of an agent media skill assignment window which is displayed by a workstation to enable a system administrator to enter media-type skills associated with agents of the call center system.

It is noted that campaigns have differing media type requirements, and not all agents will use all of the types. To modify the media type requirements for an agent, the system administrator can click the Agent Media Type Assignment button of the Agent Administration Menu 156 to cause the Agent Media Skills Assignment Window 162 as shown in FIG. 8 to appear. A description of the buttons and entry items of the Agent Media Skills Assignment Window 162 is set forth in Table 7 as follows:

TABLE 7

Agent Media Skill Assignment Window Buttons and Entry Items

| Item | Description |
| --- | --- |
| System Media Types: | A listing of all Media Types currently in use by the system. |
| system Agent: | A pull-down list of all active Agents. |
| has Media Types: | Media Types currently assigned to the Agent. |
| Add | Button to add any selected System Media Types to the Agent's list. |
| Add All | Button to add all System Media Types to the Agent's list. |
| Remove | Button to remove any selected Media Types from the Agent's list. |
| Remove All | Button to remove all Media Types from the Agent's list. |
| OK | Button to accept the Agent Media Skill Assignment. |

To add a media type to an agent's profile, the system administrator can perform the following operations:

1. Select an Agent by using the down arrow on the Agent: drop-down list box. If the Agent already has linked media types, these will appear in the has Media Types: list box.

2. In the System Media Types: list box, select the media type to add. If a vertical scroll bar appears to the right of the list box, there are more media types to view.
3. Click Add, then click OK.

The Agent Media Skill Assignment Window 162 will close and the system administrator will be returned to the Agent Administration Menu 156. The system administrator can verify the media types linked to an agent by opening up the agent's profile from the Agent Administration Menu 156. It is noted that the Add All button of the Agent Media Skill Assignment Window 162 will add the entire list of media types. When creating a new Agent with multiple media types, it might be easier to add the entire list, then remove those that do not apply.

To remove a media type from an agent's profile, the agent administrator can perform the following operations:
1. Select an Agent by using the down arrow on the Agent: drop-down list box.
2. Once an agent is specified, select the media type under the has Media Types: list box.
3. Click Remove, then click OK.

The Agent Media Skill Assignment Window 162 will close and the system administrator will be returned to the Agent Administration Menu 156. It is noted that the Remove All button on the Agent Media Skill Assignment Window 162 will delete all the media types linked to the selected Agent.

As discussed above, contacts form the basic element of a campaign. Contacts will come from telephone calls, e-mails, web site "hits", facsimile devices and other forms of contact. The following describes how to configure the mailboxes which will receive the incoming e-mails and the proxies which will link the e-mail messages to the system.

Figure 9:
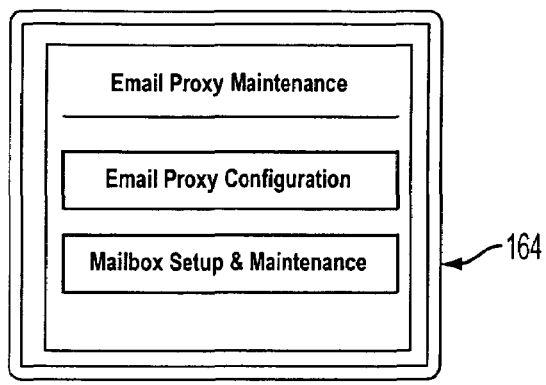
FIG. 9 is an example of an e-mail proxy maintenance menu which is displayed by a workstation to enable a system administrator to access display windows for entering criteria in accordance with which e-mails are handled by the call center system.

From the Administration Menu 152 (FIG. 3), the system administrator clicks the Email Proxy button to cause the Email Proxy Maintenance Menu 164 as shown in FIG. 9 to be displayed. The buttons of the Email Proxy Maintenance Menu 164 are described in Table 8 as follows:

TABLE 8

Email Proxy Configuration Menu Buttons

| Item | Description |
| --- | --- |
| Email Proxy Configuration | Links incoming e-mail messages to system |
| Mailbox Setup & Maintenance | Address location where incoming e-mail messages are stored. |

Figure 10:
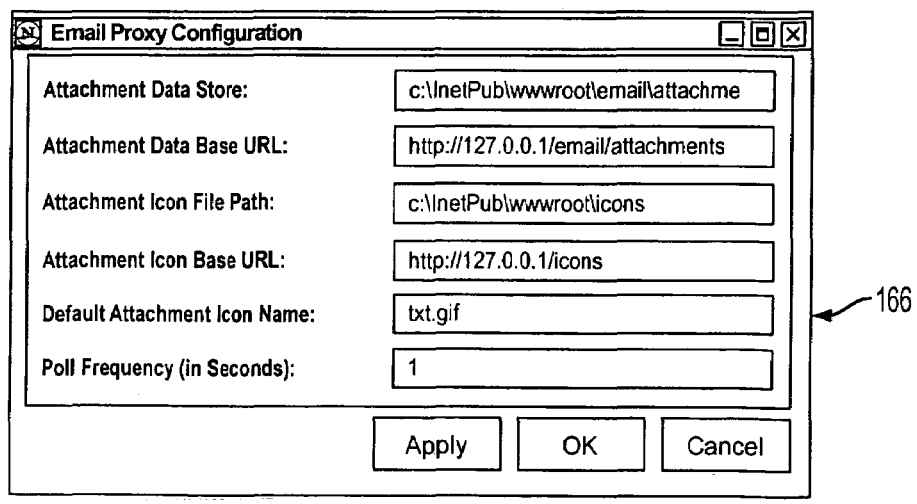
FIG. 10 is an example of an email proxy configuration window which is displayed by a workstation to enable a system administrator to enter criteria in which e-mails are handled by the call center system.
Figure 11:
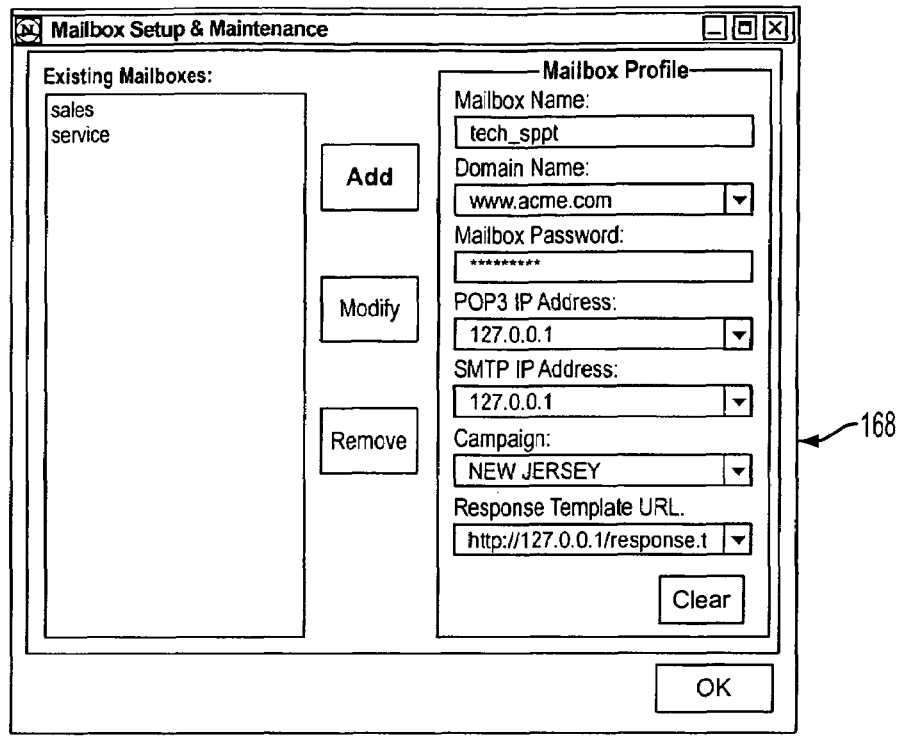
FIG. 11 is an example of a mailbox setup and maintenance window which is displayed by a workstation to enable a system administrator to enter criteria for the mailboxes of the call center system which receive e-mails.

Just as there are a variety of different phone companies, there are a number of different e-mail software packages. The E-mail Server 132 (See FIG. 1) is used to translate the various messages into a format that the system 100 can handle. From the E-mail Proxy Administration Menu 164, the system administrator can click the E-mail Proxy Configuration button to cause the Email Proxy Configuration Window 166 as shown in FIG. 10 to be displayed. The buttons and entry items of the Email Proxy Configuration Window 166 are described in Table 9 below.

TABLE 9

Email Proxy Configuration Buttons and Entry Items

| Item | Description |
| --- | --- |
| Attachment Data Store | File path where the incoming e-mail message attachment files are stored Format: 254 characters |
| Attachment Data Base URL: | URL address of the base attachment file path specified above Format: 254 characters in http://format |
| Attachment Icon File Path | File path of the directory where the individual mime icon image files are stored. Format: 254 characters, <filename>.gif |
| Attachment Icon Base URL: | URL address of the mime icon image .gif files Format: 254 characters in http://format |
| Default Attachment Icon Name: | Specifies the name of the default mime icon that will be used when an e-mail attachment is received for which no attachment icon exists. Format: 254 characters, <filename>.gif |
| Poll Frequency (in Seconds): | How frequently the e-mail proxy will poll for incoming mail Format: Positive number, 01 to 9,999,999,999 |
| Apply | Button to apply any changes made to the E-mail Proxy Configuration without closing the window. |
| OK | Button to accept the E-mail Proxy Configuration including any changes (window closes). |
| Cancel | Button to close the window and cancel any changes that have not yet been applied to the database using Apply. |

Unless the files are moved to a new location, or a new software format is created and a new ".gif" file needs to be added to the E-mail Server 132, this information most likely will remain the same.

To modify an e-mail proxy configuration, the system administrator can perform the following operations.
1. Click in the field, and type in the new information.
2. Click Apply, then click OK The E-mail Proxy Configuration Window 166 will close and the system administrator will be returned to the e-mail Proxy Administration Menu 164. However, if the system administrator has made a mistake, he or she can click Cancel, which causes the E-mail Proxy Configuration Window 166 to close and the original data to be restored.

The "mailbox" discussed above actually represents all the mailboxes of all the currently active campaigns. Contacts will send messages and inquiries about a particular product or service. This message is received here, then forwarded to the routing queue via the E-mail Proxy as described in more detail below.

When the system administrator clicks the Mailbox Setup & Maintenance button of the Email Proxy Menu 164, the Mailbox Setup and Maintenance Window 168 shown in FIG. 10 will appear. The buttons and entry items of the Mailbox Setup & Maintenance Window 168 are described in Table 10 below.

TABLE 10

Mailbox Setup & Maintenance Window Buttons and Entry Items

| Item | Description |
| --- | --- |
| Existing Mailboxes: | List of mailboxes currently in the system. |
| Add | Button to add a new mailbox as specified in the Mailbox Profile fields. |
| Modify | Button to load the Mailbox Profile with the current information on any selected existing mailbox where it can then be modified. |
| Remove | Button to remove any selected existing mailbox from the system. |

TABLE 10-continued

Mailbox Setup & Maintenance Window Buttons and Entry Items

| Item | Description |
| --- | --- |
| Mailbox Name: | Name of the e-mail's mailbox. Some campaigns may have more than one mailbox, but a mailbox can only be assigned to one campaign.<br>Format: Alpha Characters<br>No spaces between words<br>Maximum length of 31 characters, cannot contain the character "," |
| Domain Name: | Internet domain of mailbox<br>Format: <name>.com or <name>.net, etc. |
| Mailbox Password: | Password specific for this mailbox<br>Format: Maximum of 31 Alpha Characters |
| POP3 IP Address: | IP address of the incoming mail server Post Office Protocol 3<br>Format: Numeric 1–254 in .###.###.###.### format |
| SMTP IP Address: | Simple Mail Transfer Protocol. The outgoing mail server address.<br>Format: Numeric 1–254 in .###.###.###.### format |
| Campaign: | Name of the campaign to which a message received will be routed |
| Response Template URL: | URL address of the template file to be used to build the dynamic automated response to the originator.<br>Format: 254 characters in http://format |
| Clear | Button to clear all Mailbox Profile fields. |
| OK | Button to accept the Mailbox Setup including any changes. |

To add a new mailbox, the system administrator performs the following operations:
1. Click in the Mailbox Name field
2. Enter the name of the new mailbox.
3. Using the down arrows, scroll to the Domain where the mailbox will reside, or type in the Domain name
4. Enter the password of this mailbox
5. Enter the POP3 and SMTP IP addresses of a mailbox.
6. Using the down arrow, select the correct campaign
7. Using the down arrow, select to the response template.
8. Click Add, then click OK.

The Mailbox Setup & Maintenance Window 168 will close, and the system administrator will be returned to the E-mail Proxy Maintenance Menu 166.

To modify and existing mailbox, the system administrator performs the following operations:
1. Select a mailbox from the Existing Mailboxes: list box, then enter the new information.
2. Click Modify, then click OK.

The Mailbox Setup & Maintenance Window 168 will close, and the system administrator will be returned to the E-mail Proxy Maintenance Menu 166.

To remove an existing mailbox, the system administrator performs the following operations:
1. Select the name of the Mailbox in the Existing Mailboxes: list box,
2. Click Remove, then click OK.

The Mailbox Setup & Maintenance Window 168 will close, and the system administrator will be returned to the E-mail Proxy Maintenance Menu 166.

The campaign aspects of the system 100 will now be described. A campaign is defined as a focused set of resources targeted towards achieving a specific goal according to a pre-established plan. Campaigns are not restricted to outbound telemarketing activities. Within the contact center system 100, campaigns are the universal elements upon which the work of the contact center system 100 can be organized.

Campaigns can be either outbound or inbound, and are not necessarily dependent upon selling a product or requesting a response from a specific group. There are customer service campaigns where the campaign is created for anyone calling in with a question. There can be a technical support campaign where problems are reported. Basically, any organized structure created to accept, distribute, and monitor work coming into an organization using any media type is considered a campaign.

Figure 12:
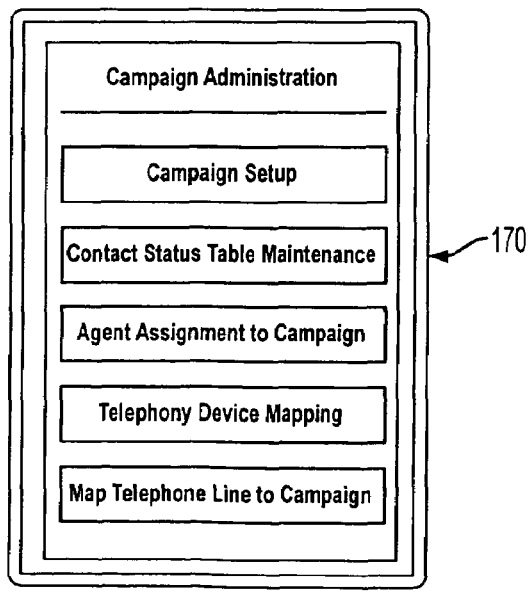
FIG. 12 is an example of a campaign administration menu which is displayed by a workstation to enable a system administrator to access display windows for entering criteria of the campaigns handled by the call center system.

To access the campaign functions, the system administrator can click the Campaign button of the Administration Menu 152 (see FIG. 3), which will cause his or her workstation 102 to display the Campaign Administration Menu 170 shown in FIG. 12. The buttons of the Campaign Administration Menu 170 are described in Table 11 as follows:

TABLE 11

Campaign Administration Window Buttons

| Item | Description |
| --- | --- |
| Campaign Setup | To add, modify, or remove a campaign |
| Contact Status Table Maintenance | To define contact outcome, reason and results |
| Agent Assignment to Campaigns | To link Agents to a campaign |
| Telephony Devices Mapping | To link incoming telephone switches to a particular campaign |
| Map Telephone Line to Campaign | To link incoming telephone contacts to the primary and possibly secondary (backup) switch types |

Figure 13:
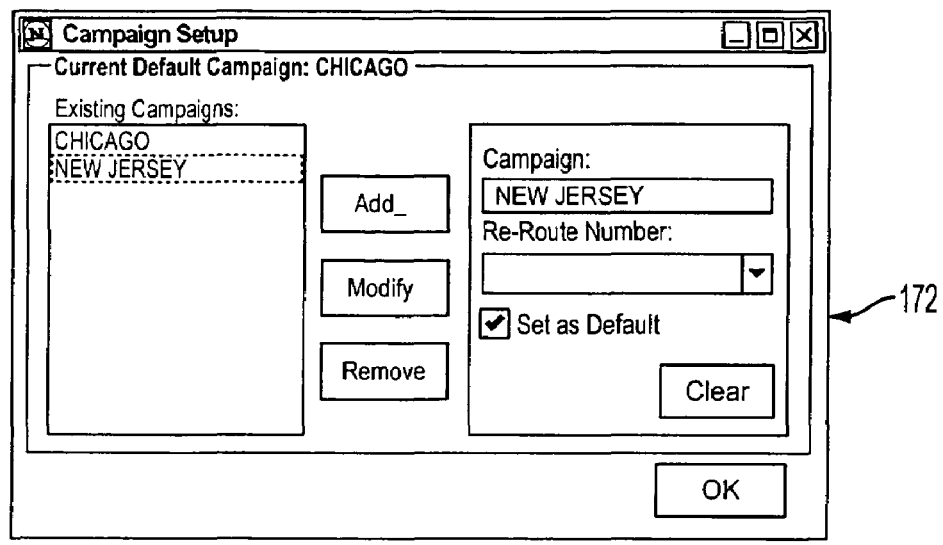
FIG. 13 is an example of a campaign setup window which is displayed by a workstation to enable a system administrator to enter criteria for campaigns handled by the call center system.

When the system administrator wishes to add, modify, or remove a campaign, he or she can click the Campaign Set-up button on the Campaign Administration Menu 170, which causes his or her workstation 102 to display the Campaign Setup Window 172 as shown in FIG. 13. The buttons and entry items of the Campaign Setup Window 172 are described in Table 12 below.

TABLE 12

Campaign Setup Window Buttons and Entry Items

| Item | Description |
| --- | --- |
| Existing Campaigns: | |
| Add | Button to add a new campaign as specified in the Campaign: field. |
| Modify | Button to load the Campaign: field with any selected existing campaign, along with its Re-Route Number (if any) and default where the current information can be modified. |
| Remove | Button to remove any selected existing campaign from the system. |
| Campaign: | Name of previously defined campaign<br>Format: Up to 50 characters |
| Reroute Number: | If an Agent transfers a voice contact or returns it to the queue, this device will hold the contact until the rerouting is complete. |
| Set as Default: | Checkbox to replace the Current Default Campaign with the one identified in the Campaign: field upon clicking OK.<br>NOTE: Only one campaign can be designated as the Default Campaign. |
| Clear | Button to clear the contents of the Campaign: and Reroute Number: fields and Set as Default checkbox. |
| OK | Button to accept the Campaign Setup including any changes. |

To add a new campaign, the system administrator performs the following operations:

1. Click in the Campaign field and type the name of the new campaign.
2. If this campaign is using incoming telephone contacts, click in the Re-Routed Device Number and enter the number of the device that will hold the telephone contacts during re-routing.
3. If this campaign is the default campaign, click the Set as Default box. The system 100 requires one campaign be designated the 'Default Campaign'. If this is the first campaign created, it must to the default campaign.
4. Click Add, then click OK The Campaign Setup Window 172 will then close, and the system administrator will be returned to the Campaign Administration Menu 170.

To modify a campaign, the system administrator performs the following operations on the Campaign Setup Menu 172:
1. Select a campaign in the Existing Campaigns list box (use the scroll bar if necessary)
2. Click Modify. The Re-Routed Number and Set Default fields are now available for modification
3. Click in the Re-Routed Number field and enter the new data
4. If this campaign is to be designated as the default, click the Set as Default checkbox.
5. Click OK The Campaign Setup Window 172 will then close, and the system administrator will be returned to the Campaign Administration Menu 170. Also, it is noted that only the time out figure can be changed. To change a name of a campaign, the system administrator will have to remove the old name and create a new one. To deselect the default designation, the system administrator will have to designate another campaign as the default campaign. The system 100 will then automatically remove the default designation from this campaign.

To remove an existing campaign, the system administrator performs the following operations on the Campaign Setup Window:
1. Click in the Existing Campaign list box and select the name of the campaign to delete.
2. Click Remove, then click OK The Campaign Setup Window 172 will close, and the system administrator will be returned to the Campaign Administration Menu 170. It is noted that a campaign designated as the default campaign cannot be removed until another campaign is designated as the default campaign. A campaign, which still has active contacts in the queue described in more detail below cannot be removed until those contacts are closed out.

As described in more detail below, once the Agent has completed the interaction with the contact, he/she needs to report the outcome of the contact. The results and the reasons for the result can be quite varied. Table 13 shows some typical outcome options.

TABLE 13

Examples of Typical Call Outcome Options

| Call Outcome | Result Values | Reason Values |
|---|---|---|
| Contact | Sale | Good Price |
| | | Features |
| | | Availability |
| | No Sale | Too Expensive |
| | | No Money |
| | | Lacks Features |

TABLE 13-continued

Examples of Typical Call Outcome Options

| Call Outcome | Result Values | Reason Values |
|---|---|---|
| | Call Me Back | No Time |
| | | Need to Research Information |
| | | Requested Call Back Later |
| | Solved service problem or question | Answered |
| | Problem unresolved | Documented bug |
| No Contact | Busy | None |
| | No Answer | |
| | Wrong Party | |
| | Answering Machine | |
| No Connect | SIT | None |
| | Wrong Number | |
| | Disconnected | |
| Re-Routed | Returned to Queue | Wrong campaign |
| | Placed in Personal Queue | Requested Call Back Later |
| | Routed to Specific Agent | Requested Specific Agent |
| | Routed to Supervisor | Requested Supervisor |

Figure 14:
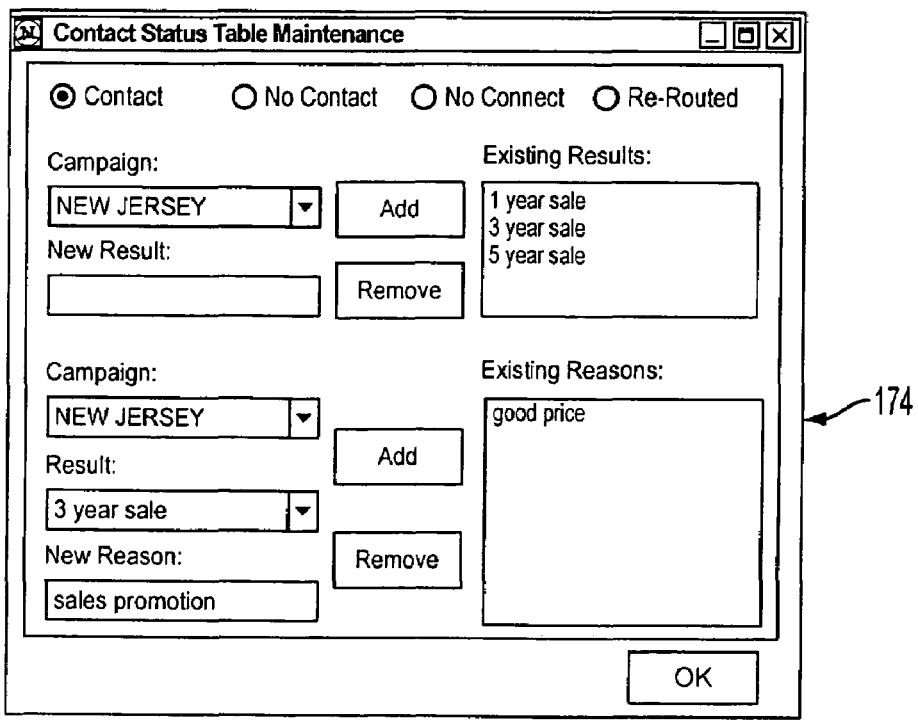
FIG. 14 is an example of a contact status table maintenance window which is displayed by a workstation to enable a system administrator to enter criteria pertaining to the outcome, results, and reasons of the contacts handled by the call center system.

To modify the contact status maintenance, the system administrator clicks on the Contact Status Table Maintenance button of the Campaign Administration Menu 170 to display Contact Status Table Maintenance Menu 174 as shown in FIG. 14. The buttons and entry items of the Contact Status Table Maintenance Menu 174 are described in Table 14 below.

TABLE 14

Contact Status Table Maintenance Window Buttons and Entry Items

| Item | Description |
|---|---|
| Outcomes | |
| Contact | Option button to indicate that the contact was successfully completed. For inbound Media Types the outcome is always Contact. |
| No Contact | Option button to indicate that the contact was not successful due to issues other than connectivity (line busy, no answer, answering machine, etc.). |
| No Connect | Option button to indicate that the contact was not successful due to connectivity issues (wrong number, line out of order, disconnection, etc.) |
| Re-Routed | Option button to indicate that the contact was established then rerouted. |
| Results | |
| Campaign: | Drop-down list box of existing campaigns. |
| New Result: | Text field for entering the name of a new result of a specified outcome of a specified campaign (31 character limit). |
| Existing Results: | List box of existing results of a specified outcome of a specified campaign. |
| Add | Button to add a new result to the Existing Results list of a specified outcome of a specified campaign. |
| Remove | Button to remove a selected result from the Existing Results list of a specified outcome of a specified campaign. |
| Reasons | |
| Campaign: | Drop-down list box of existing campaigns. |
| Result: | Drop-down list box of existing results of a specified outcome of a specified campaign. |
| New Reason: | Text field for entering a new reason of a specified result of a specified outcome of a specified campaign (31 character limit). |
| Existing Reasons: | List box of existing reasons of a specified result of a specified outcome of a specified campaign. |
| Add | Button to add a new reason to the Existing Reasons list of a specified result of a specified outcome of a specified campaign. |

TABLE 14-continued

Contact Status Table Maintenance Window Buttons and Entry Items

| Item | Description |
|---|---|
| Remove | Button to remove a selected reason from the Existing Reasons list of a specified result of a specified outcome of a specified campaign. |
| OK | Button to accept the Contact Status Table including any changes. |

It is noted that the left side of the Contact Status Table Maintenance Window 174 has two separate sections divided by a line in the center, namely, the Campaign/New Result section and the Campaign/Result/New Reason section. When the system administrator selects a campaign in the Campaign/New Result section, nothing will appear in the lower section. Conversely, when the system administrator selects a campaign in the Campaign/Result/New Reason section, nothing will appear in the upper section.

To add a new result in the upper section of the Contact Status Table Maintenance Window 174, the system administrator performs the following operations:
1. Using the down scroll arrow in the Campaign: list box on the left side of the window, select a campaign.
2. Click in the New Result field and enter the new text. A space can exist between words.
3. Click Add.
4. To add another result, click in the New Result field and enter the new text.
5. When finished, click OK.

The Contact Status Table Maintenance Window 174 will close, and the system administrator will be returned to the Campaign Administration Menu 170.

To remove an existing result, the system administrator performs the following operations on the Contact Status Table Maintenance Window 174:
1. Using the down scroll arrow in the Campaign: drop-down list box on the left side of the window, select a campaign.
2. Click in the Existing Results: list box on the right side of the window and select the result to delete.
3. Click Remove.
4. Remove more by repeating these steps.
5. When finished, click OK.

The Contact Status Table Maintenance Window 174 will close, and the system administrator will be returned to the Campaign Administration Menu 170.

To add a new reason in the lower section, the system administrator performs the following operations on the Contact Status Table Maintenance Window 174:
1. Using the down scroll arrow in the Campaign: drop-down list box on the left side of the window, select a campaign.
2. Then click in the Result: drop-down list box, use the down scroll arrow and select a result.
3. Click in the New Reason: list box and enter the new text. A space can exist between words.
4. Click Add.
5. Add another New Reason by repeating these steps.
6. When finished, click OK.

The Contact Status Table Maintenance window 174 will close and the system administrator will be returned to the Campaign Administration Menu 170.

To remove an existing reason, the system administrator performs the following operations on the Contact Status Table Maintenance Window 174:
1. Using the down scroll arrow in the Campaign: drop-down list box on the left side of the window, select a campaign.
2. Then click in the Result: drop-down list box, use the down scroll arrow and select a result.
3. Click in the Existing Reason list box on the right side of the window and select the result to delete.
4. Click Remove, then click OK.

The Contact Status Table Maintenance Window 174 will close and the system administrator will be returned to the Campaign Administration Menu 170.

Figure 15:
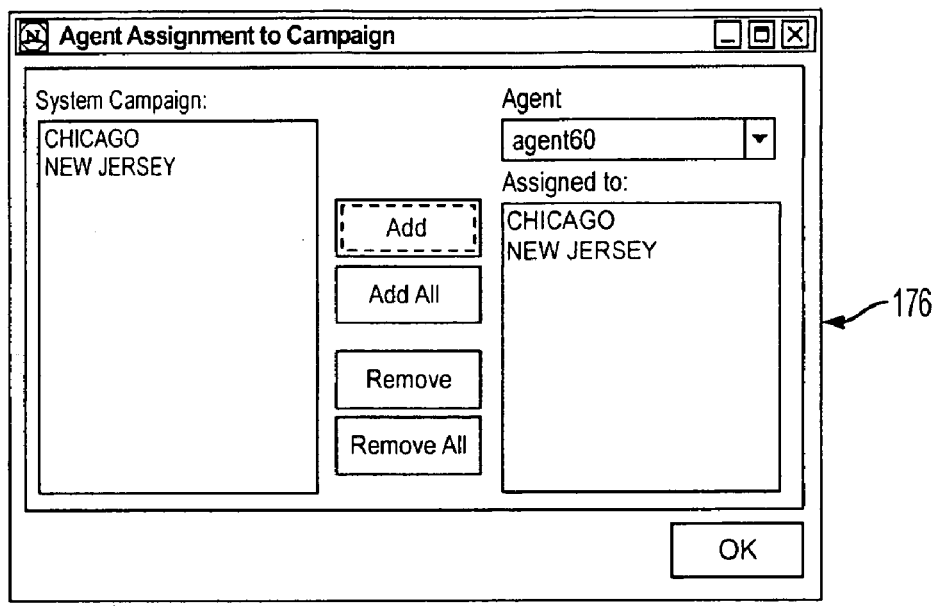
FIG. 15 is an example of an agent assignment to campaign window which is displayed by a workstation to enable a system administrator to assign agents of the call center system to campaigns handled by the call center system.

An agent can be assigned to more than one campaign. To assign an agent to a campaign, the system administrator clicks the Agent Assignment button from the Campaign Administration Menu 170 to cause his or her workstation 104 to display the Agent Assignment to Campaign Window 176 as shown in FIG. 15, the buttons and entry items of which are described in Table 15 below.

TABLE 15

Agent Assignment to Campaign Window Buttons and Entry Items

| Item | Description |
|---|---|
| System Campaign: | List box of existing campaigns. |
| system Agent: | Drop-down list box of Agents currently in the system. |
| Assigned to: | List box of campaigns assigned to a specified Agent. |
| Add | Button to add a selected system campaign to a specified Agent's list of campaign assignments. |
| Add All | Button to add all system campaign to a specified Agent's list of campaign assignments. |
| Remove | Button to remove a selected campaign from a specified Agent's list of campaign assignments. |
| Remove All | Button to remove all campaigns from a specified Agent's list of campaign assignments. |
| OK | Button to accept the current Agent Assignment to Campaign including any changes. |

To add a campaign to an agent's profile, the system administrator performs the following operations:
1. Select an agent by using the down arrow on the Agent: drop-down list box If the Agent already has campaigns linked, these will appear in the Assigned to: list box.
2. On the System Campaign: list box, select the campaign to add. If a vertical scroll bar appears to the right of the list box, there are more campaigns to view.
3. Click Add, then click OK.

The Agent Assignment to Campaign Window will close and the system administrator will be returned to the Campaign Administration Menu 170. It is noted that Add All will add the entire list of campaigns. Also, when assigning a new agent to multiple campaigns, it might be easier to add the entire list, then remove those that do not apply.

To remove a campaign from an agent's profile, the system administrator performs the following operations:
1. Select an Agent by using the down arrow on the system Agent: drop-down list box.
2. Once an Agent has been specified, select the campaign in the Assigned to: list box.
3. Click Remove, then click OK.

The Agent Assignment to Campaign Window 176 will close and the system administrator will be returned to the Campaign Administration Menu 170. The system administrator can verify the media types linked to an agent by opening up the agent's profile from the Agent Administration Menu 156 (see FIG. 5). It is also noted that Remove All will delete all the media types linked to the selected agent.

As will now be described, a contact type and the physical telephony device (with its associated extension) can be linked with a campaign. To do this, the system administrator clicks the Telephony Device Mapping button of the Campaign Administration Menu 170, which causes the Telephony Device Mapping Window 178 shown in FIG. 16 to be displayed on the display of his or her workstation 102. The buttons and entry items of the Telephony Device Mapping Window 178 are described in Table 16 below.

TABLE 16

Telephony Device Mapping Window Buttons and Entry Items

| Item | Description |
| --- | --- |
| Existing Telephony Devices: | Option list box of existing telephony devices. |
| Option No. (no label) | Option number button (not labeled). Click this button to select from the list of existing telephony devices. |
| Type | RPT-Routing Point QUE-ACD (Queue) |
| Number | Physical telephony device within the switch (31 digit maximum). |
| Campaign | Current campaign. |
| Type: | Text box for changing telephony device type. Current information automatically entered in field upon selection of an existing telephony device. |
| Number: | Text box for changing telephony device number. Current information automatically entered in field upon selection of an existing telephony device. |
| Campaign: | Drop-down list box of existing campaigns. Current information automatically entered in field upon selection of an existing telephony device. |
| Modify | Button to accept changes made in the Type:, Number:, and Campaign: fields of a selected telephony device. |
| OK | Button to close the Telephony Device Mapping window. |

To map a campaign to a telephony device, the system administrator performs the following operations:

1. Select on the Existing Telephony Devices: list box on the left side of the window and select the type and number to link.
2. Click in the Campaign: drop-down list box on the right side of the window.
3. Using the down arrow, scroll to or type in the name a campaign to be mapped to the telephone type and number.
4. Click Modify, then click OK The Telephony Device Mapping Window will close and the system administrator will be returned to the Campaign Administration Menu 170

A telephone number (Dialed Number Identification Service or DNIS) can also be linked to a particular campaign. Campaigns can have multiple DNIS's. However, each DNIS can only be linked to one campaign. To perform this linking, the system administrator clicks the Map Telephone Lines to Campaign button on the Campaign Administration Menu 170 to cause the Map Telephone Line to Campaign Window 180 to be displayed. The buttons and entry items of the Map Telephone Line to Campaign Window 180 are described in Table 17 below.

TABLE 17

Map Telephone Line to Campaign Window Buttons and Entry Items

| Item | Description |
| --- | --- |
| Existing DNIS: | Option list box of existing DNIS. |
| Option No. (no label) | Option number button (not labeled). Click this button to select from the list of listing DNIS. |
| DNIS | Dialed Number Identification Service identifies the telephone number a caller dials to reach Agents assigned to its specified campaign. |
| Campaign DNIS Mapping | Campaign associated with the specified DNIS. |
| DNIS: | Text box for adding or modifying a DNIS number to be associated with a specified campaign (numeric field, no spaces). Current information automatically entered in field upon selection of an existing DNIS. |
| Campaign: | Drop-down list box of existing campaigns. Current information automatically entered in field upon selection of an existing DMS. |
| Add | Button to add a new DMS Mapping entry to the Existing DNIS list. |
| Modify | Button to accept changes made to a selected existing DNIS. |
| Remove | Button to remove a selected DNIS from the Existing DNIS list. |
| Clear | Button to clear data entered in the DNIS Mapping fields. |
| OK | Button to close the Map Telephone Line to Campaign window. |

To map a telephone line to a campaign, the system administrator performs the following operations:

1. Click in the DNIS: text box in the DNIS Mapping section of the window and enter the complete incoming telephone number (no spaces between digits).
2. Using the down arrow to open the Campaign: drop-down list box, select the campaign.
3. Click Add, then click OK.

The Map Telephone Line to Campaign Window 180 will close and the system administrator will be returned to the Campaign Administration menu.

To modify a telephone line, the system administrator performs the following operations, with only the campaign field changing.

1. Click in the Existing DNIS: list box on the left side of the window. The information will appear on the two fields on the right side in the DNIS Mapping section.
2. Click the down arrow to open the Campaign: drop-down list box on the right side of the window and select a different campaign name.
3. Click Modify, then click OK.

The Map Telephone Lines to Campaign Window 180 will close and the system administrator will be returned to the Campaign Administration Menu 170.

To remove a telephone line, the system administrator performs the following operations:

1. Select a telephone line from the Existing DNIS: list box on the left side of the window. The information will appear on the two fields on the right side in the DNIS Mapping section.
2. Click Remove, then click OK.

The Map Telephone Lines to Campaign Window 180 will close and the system administrator will be returned to the Telephony Administration Menu 170.

Figure 18:
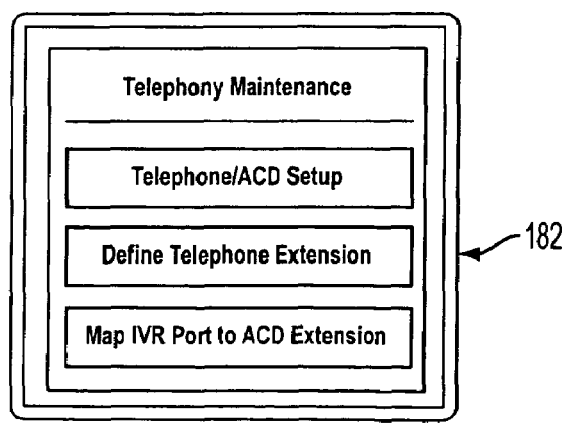
FIG. 18 is an example of a telephony maintenance window which is displayed by a workstation to enable a system administrator to access display windows for entering criteria in accordance with which telephone calls are handled by the call center system.

As will now be described, links can between incoming telephone lines and campaigns, define agent position extensions, and map Interactive Voice Response ports. To perform these operations, the system administrator clicks the Telephony Maintenance button on the Administration Menu 152 to cause the Telephony Maintenance Menu 182 shown in FIG. 18 to be displayed, the buttons of which are described in Table 18 below.

TABLE 18

Telephony Maintenance Window Buttons

| Item | Description |
| --- | --- |
| Telephone/ACD Setup | To link DNIS contacts to a particular campaign |
| Define Telephone Extension | To configure telephony contracts to the primary and possibly backup switch types |
| Map IVR Port to ACD Extension | To link incoming telephone extensions to a particular IVR port or channel. |

Figure 19:
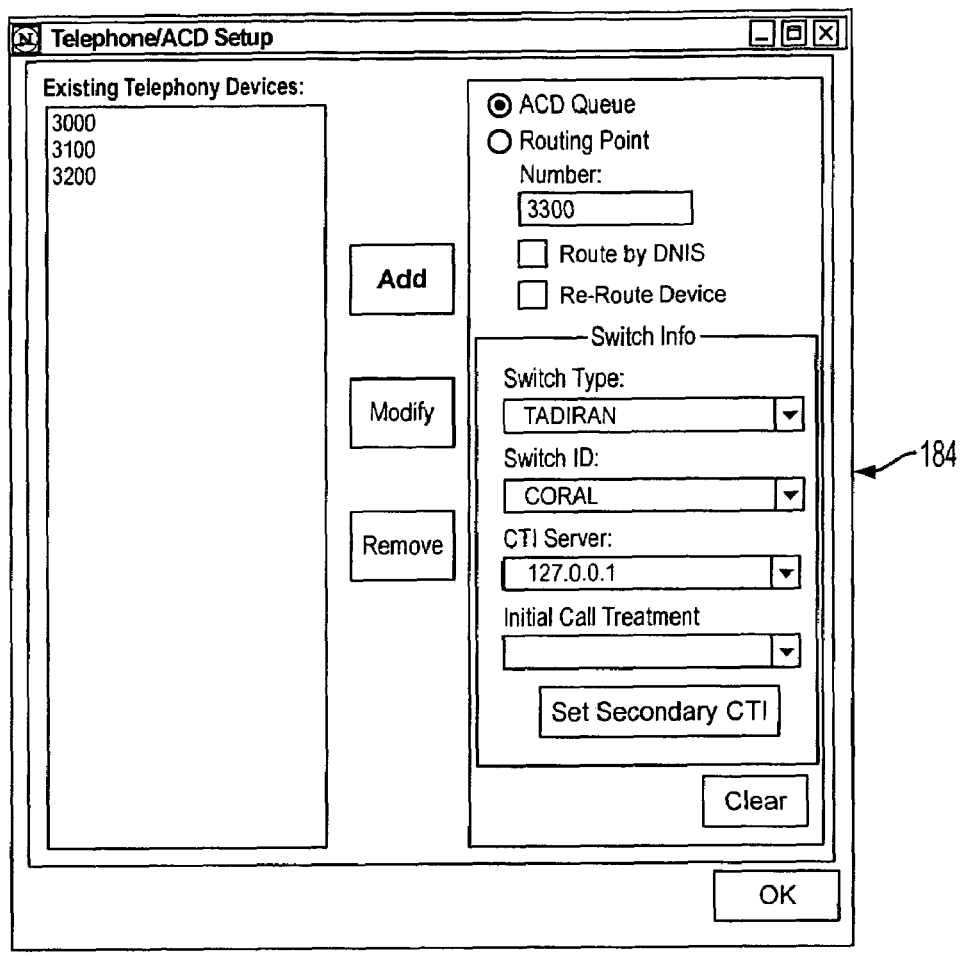
FIG. 19 is an example of a window which is displayed by a workstation to enable a system administrator to define telephony devices that will be monitored by the call center system for new incoming calls to be routed through the system's queue to an agent.

This Window 182 configures how the telephony contacts are routed through either the Automatic Call Distributor (ACD) or a Routing point, the switch information, and which recording will play while the contact is waiting. From the Telephony Maintenance menu, the system administrator clicks the Telephony/ACD Setup button to cause the Telephony/ACD Setup Window 184 shown in FIG. 19 to be displayed, the buttons and entry items of which are described in Table 19 below.

TABLE 19

Telephony/ACD Setup Buttons and Entry Items

| Item | Description |
| --- | --- |
| Existing Telephony Devices: | List box of existing telephony devices. |
| ACD Queue | Option button indicating that a specified telephony device is to be associated with the ACD (Automatic Call Distributor); the physical ACD queue within the telephony switch. |
| Routing Point | Option button indicating that the specified telephony device is to be associated with a software device within the physical telephony switch. |
| Number: | Telephony device number to be associated with either an ACD queue or the Routing Point (31 digit maximum). |
| Route by DNIS: | Checkbox indicating that incoming calls to the specified telephony device are to be linked to a specific campaign associated with its DNIS. |
| Reroute Device | Checkbox indicating that incoming calls to the specified telephony device are to be placed on hold while the system updates the contact information. Holds a rerouted contact and updates the contact information. |
| Switch Info | |
| Switch Type: | Drop-down list box of available switch types that can be assigned to a specified telephony device (31 character maximum) |
| Switch ID: | Drop-down list box of available switch links to the Dialogic CT Connect configuration that can be assigned to a specified telephony device (31 character maximum). |
| CTI Server: | Drop-down list box of available IPs (numeric Internet Protocol addresses) where Dialogic CT-Connect switches reside that can be assigned to a specified telephony device (Format: 255.255.255.255). |
| Initial Call Treatment: | Drop-down list box of available call treatments that can be assigned to a specified telephony device (31 character maximum). This applies only to calls that enter through the routing point and identifies what the caller will hear while on hold (ringing, message, music, etc.). |
| Set Secondary CTI | Button to open a separate window for configuring a back-up or redundant Dialogic CT-Connect server. |
| Add | Add device to monitored device list. |
| Modify | Modify current device parameters. |
| Remove | Remove current device from monitored device list. |
| Clear | Clear all fields on device form. |
| OK | Close this window. |

To add a new telephony device, the system administrator performs the following operations:
1. Starting at the top of the right side of the window, click either the ACD or Routing Point option button.
2. In the Number field, enter the device number.
3. If this contact is to be routed by DNIS, click the "Route by DNIS" checkbox.
 OR
 If contacts will be re-routed calls, click the Re-Route Device checkbox.
4. Using the down arrows, choose the switch type and ID in the next two drop-down list boxes (or type in the information directly).
5. Using the down arrow, choose the CT-Connect Server (or type in the information directly).
6. For initial contacts, select the type of "on hold" message or music the contact will hear. This varies from switch to switch, so be sure that the switch you have selected supports the contact treatment selected.
7. If Set Secondary CTI button is clicked, a separate window will open to specify a back-up switch and CTI server for the telephony device currently selected.
8. After the system administrator has completed entering, (or have completed the Secondary CTI entry), click Add, then click OK.

The Telephone/ACD Setup Window 184 will close and the system administrator will be returned to the Telephony Maintenance Menu 182.

To modify an existing telephony device, the system administrator performs the following operations:
1. From the Existing Telephony Devices: list box on the left side of the window, select the device you wish to modify
2. Click in the appropriate field on the right side of the window and enter the new information.
3. Click Modify, then click OK.

The Telephone/ACD Setup Window 184 will then close and the system administrator will be returned to the Telephony Maintenance Menu 182. It is noted, however, that the device number cannot be modified.

To remove an existing telephony device, the system administrator performs the following operations:
1. From the Existing Telephony Devices: list box on the left side of the window, select the device to delete.
2. Click Remove, then click OK.

The Telephone/ACD Setup Window 184 will close and the system administrator will be returned to the Telephony Maintenance Menu 182.

Figure 20:
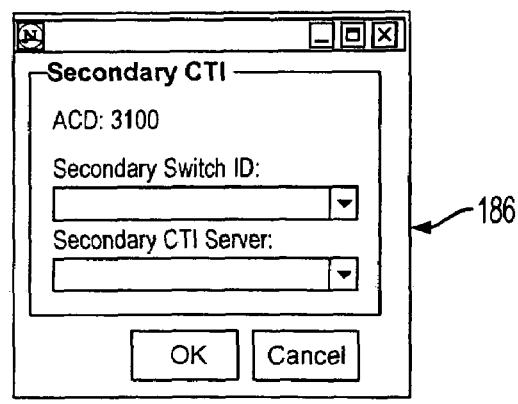
FIG. 20 is an example of a secondary CTI window which is displayed by a workstation to enable a system administrator to enter criteria to establish a secondary CTI link between the ACD and the contact center system.
Figure 21:
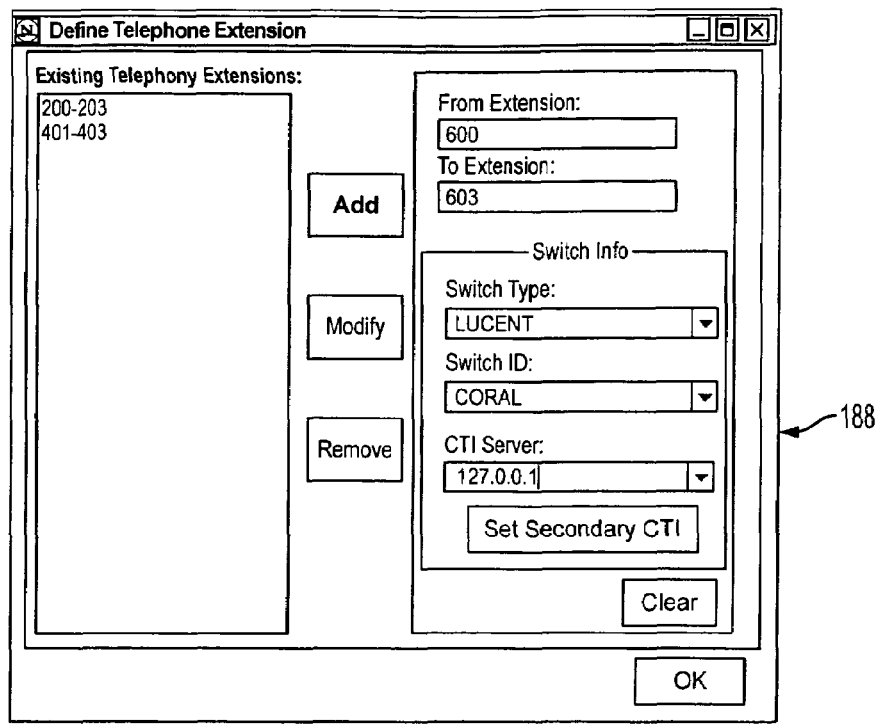
FIG. 21 is an example of a window which is displayed by a workstation to enable a system administrator to enter criteria to define telephone extensions of the call center system.

As will now be described, the secondary CTI is a redundant, or back-up CT-Connect server. If the primary system is down, CTI functionality will be performed via this redundant CT-Connect server. The system administrator can click the Set Secondary CTI button on the Telephone/ACD Setup Window 184 to display the Secondary CTI Window 186 shown in FIG. 20 and having the button and entry items described in Table 20 below.

TABLE 20

Secondary CTI Buttons and Entry Items

| Item | Description |
| --- | --- |
| <ACD/RPT>:<Number> | ACD or Routing Point number of the selected telephony device. |

TABLE 20-continued

Secondary CTI Buttons and Entry Items

| Item | Description |
| --- | --- |
| Secondary Switch ID: | Drop-down list box of available switch links to the Dialogic CT-Connect configuration that can be assigned to back-up a specified telephony device (31 character maximum). |
| Secondary CTI Server: | Drop-down list box of available IPs (numeric Internet Protocol addresses) where Dialogic CT-Connect switches reside that can be assigned to back-up a specified telephony device (Format: 255.255.255.255). |
| OK | Button to accept the Secondary CTI configuration. |
| Cancel | Button to close the Secondary CTI configuration window without changes. |

To add a new secondary CTI link, the system administrator performs the following operations:
1. From the Telephone/ACD Setup window select a particular switch device number from the Existing Telephony Devices: list box on the left side of the window.
2. Click the Set Secondary CTI button.
3. A separate Secondary CTI window will open displaying the ACD or Routing Point number of the selected telephony device.
4. Click in the Secondary Switch ID field and enter the new information.
5. Click in the Secondary CTI Server and enter the new information.
6. Click OK.

The Secondary CTI Window 186 will then close and the system administrator will be returned to the Telephony Maintenance Menu 182.

To modify a secondary CTI link, the system administrator performs the following operations:
1. From the Telephone/ACD Setup window select a particular switch number from the Existing Telephony Devices: list box on the left side of the window.
2. Click the Set Secondary CTI button
3. A Secondary CTI window will open to allow to specify a back-up switch and CTI server for the telephony device the system administrator currently has selected. If a backup already exists for the selected device, the switch and server information will appear in the appropriate fields.
4. To change to an existing switch ID and/or CTI server address, use the down arrow to scroll to the new switch or server
5. To enter a new switch or server, click in the appropriate field and type in the new information
6. Click OK The Secondary CTI Window 186 will close and the system administrator will be returned to the Telephony Maintenance Menu 182.

To remove a secondary CTI link, the system administrator performs the following operations:
1. From the Telephony/ACD Setup Window 186 select a particular telephony device from the Existing Telephony Devices: list box on the left side of the window.
2. Click the Secondary CTI button
3. A separate Secondary CTI window will open to allow to specify a back-up switch and CTI server for the telephony device currently have selected. If a backup already exists for the selected device, the switch and server information will appear in the appropriate fields.
4. To remove an existing switch and server link, click in the Secondary Switch ID: drop-down list box and delete the information. Repeat the deletion in the Secondary CTI Server: drop-down list box.
5. Click OK The Secondary CTI Window 186 will close and the system administrator will be returned to the Telephony Maintenance Menu 182.

The system administrator can define the range of incoming extensions assigned to a particular switch. To do this from the Telephony Administration Menu 182, the system administrator clicks the Telephony Extension Configuration button to display the Define Telephony Extension Window 188, the buttons and entry items of which are described in Table 21 below.

TABLE 21

Define Telephony Extension Window Buttons and Entry Items

| Item | Description |
| --- | --- |
| Existing Telephony Extensions: | List box of existing telephone extensions (individual or ranges of extensions). |
| From Extension: | Initial (and inclusive) telephone extension in a range (3 digits) |
| To extension: | Last (and inclusive) telephone extension in a range (3 digits). |
| Switch Info | |
| Switch Type: | Drop-down list box of available switch types that can be assigned to a specified telephony device (31 character maximum) |
| Switch ID: | Drop-down list box of available switch links to the Dialogic CT Connect configuration that can be assigned to a specified telephone extension or range of extensions (31 character maximum). |
| CTI Server: | Drop-down list box of available IPs (numeric Internet Protocol addresses) where Dialogic CT-Connect switches reside that can be assigned to a specified telephone extension or range of extensions (Format: 255.255.255.255). |
| Set Secondary CTI | Button to open a separate window for configuring a back-up or redundant Dialogic CT-Connect server. |
| Add | Add this range of extensions to the monitored device list. |
| Modify | Modify the parameters for the current range of extensions. |
| Remove | Remove the current range of extensions. |
| Clear | Clear the extension range form. |
| OK | Close this window. |

The Range can be as small as one extension, such as from 401 to 401. However, extension ranges must not overlap anywhere on the Existing Telephony Extensions: list box on the left side of this window.

To add a new telephone extension range, the system administrator performs the following operations:
1. Click in From Extension field and enter the first telephony port number
2. Click in To Extension field and enter the last telephony port number
3. Using the down arrow, select the switch type and ID in the next two list boxes
4. Using the down arrow, select the CT-Connect Service
5. If Set Secondary CTI button is clicked, a separate window will open to allow to specify a back-up switch and CTI server for the telephony device currently selected.
6. After completed entering, (or have completed the Secondary CTI entry), Click Add, then click OK The Define Telephone Extension Window 188 will close and the system administrator will be returned to the Telephony Maintenance Menu 182.

To modify and existing telephone extension range, the system administrator performs the following operations:
1. From the Existing Telephony Extensions: list box on the left side of the window, select the range to modify
2. Click in the appropriate field on the right side of the window and enter the new information.
3. Click Modify, then click OK.

The Define Telephone Extension Window 188 will close and the system administrator will be returned to the Telephony Maintenance Menu 182.

To remove an existing telephone extension range, the system administrator performs the following operations:
1. From the Existing Telephony Extensions: list box on the left side of the window, select the range to delete.
2. Click Remove, then click OK.

The Define Telephone Extension Window 188 will close and the system administrator will be returned to the Telephony Maintenance Menu 182.

As will now be described, the Map IVR Ports to ACD Extensions window maps an incoming telephone extension to an individual IVR port or channel. It is noted that the Master (or Controller) is the processor that controls one or more IVR devices. If the configuration only has one Master, a separate identifying number is not needed. In these cases, simply enter zero.

Figure 22:
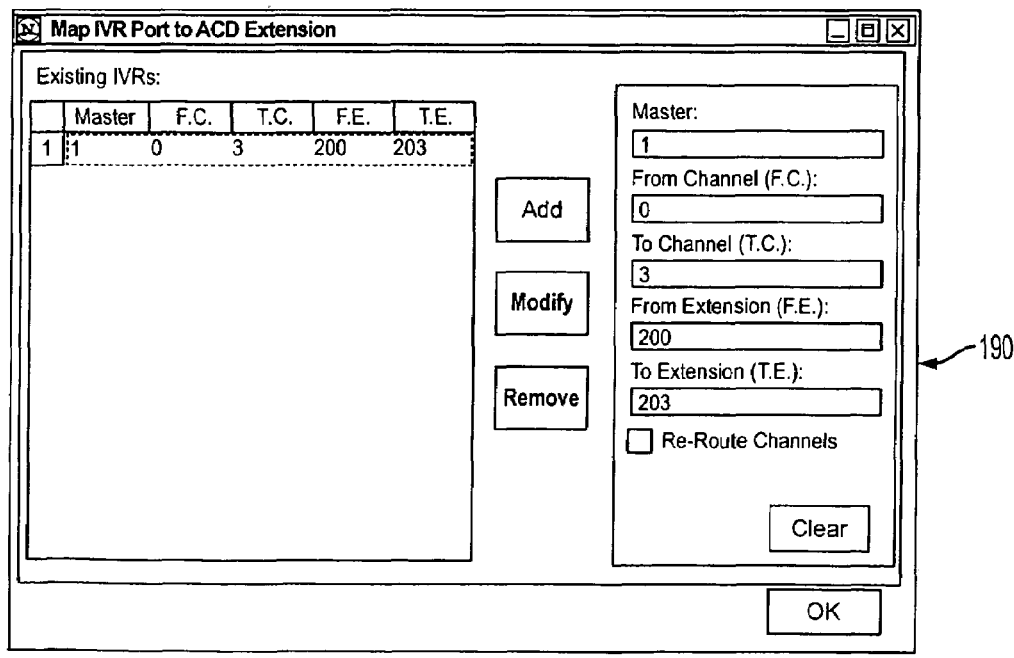
FIG. 22 is an example of a window which is displayed by a workstation to enable a system administrator to map the interactive voice response (IVR) ports to the ACD extensions of the call center system.

To perform these operations from the Telephony Maintenance Menu, the system administrator clicks the Map IVR Port to ACD Extension button to display the Map IVR Port to ACD Extension Window 190 shown in FIG. 22, the buttons and entry items of which are described in Table 22 as follows:

TABLE 22

Map IVR Port to ACD Extension Buttons and Entry Items

| Item | Description |
| --- | --- |
| Existing IVRs: | List box of existing IVR devices. |
| Option No. (no label) | Option number button (not labeled). Click this button to select from the list of existing IVRs. |
| Master F.C. T.C. F.E. T.E. | |
| Master: | Identifies the controller of one or more IVR devices. If there's only one master, the value is zero |
| From Channel (F.C.): | Initial (and inclusive) IVR port of the range Format: 0–9999 |
| To Channel: (T.C.): | Final (and inclusive) IVR port of the range Format: 0–9999 |
| From Extension (F.E.): | Initial (and inclusive) extension of the range |
| To Extension (T.E.): | Final (and inclusive) extension of the range |
| Add | Add the range of IVR ports to the IVR port map table. |
| Modify | Modify the parameters for the current IVR port range. |
| Clear | Clear the IVR port range form. |
| Remove | Remove the current IVR port range. |
| OK | Close this window. |

It is noted that the range can be as small as one channel or extension, such as from 401 to 401. However, ranges must not overlap anywhere on the Existing IVRs: list box on the left side of this window. Also, the number of channels selected must equal the number of extensions.

To add a new IVR range, the system administrator performs the following operations:
1. Click in the Master field and enter the Master identifier.
2. Click in From Channel (F.C.) field and enter the first channel value.
3. Click in To Channel (T.C.) field and enter the last channel value.
4. Click in From Extension (F.E.) field and enter the first extension number.
5. Click in To Channel (T.C.) field and enter the last extension number.
6. Click Add, then click OK The Map IVR Ports to ACD Extensions window 190 will then close, and the system administrator will be returned to the Telephony Maintenance Menu 182. It is noted that the range of the number of channels selected must match the number of extensions.

To modify and existing IVR range, the system administrator performs the following operations:
1. From the Existing IVRs: list box on the left side of the window, select the range you wish to modify
2. Click in the appropriate field on the right side of the window and enter the new information.
3. Click Modify, then click OK.

The Map IVR Ports to ACD Extensions Window 190 will close and the system administrator will be returned to the Telephony Maintenance menu.

To remove and existing IVR range, the system administrator performs the following operations:
1. From the Existing IVRs: list box on the left side of the window, select the range to delete.
2. Click Remove, then click OK The Map IVR Ports to ACD Extensions Window 190 will close and the system administrator will be returned to the Telephony Maintenance Menu 182.

Figure 23:
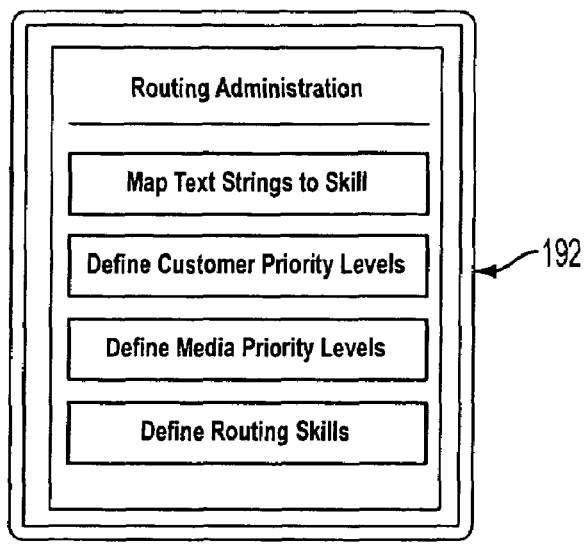
FIG. 23 is an example of a routing administration menu which is displayed by a workstation to enable a system administrator to access display windows for entering criteria in accordance with which contacts are routed by the call center system.

As will now be described, the system administrator can use the Routing Rule Administration windows to define the skills of an agent, prioritize contacts, and define media types and skill requirements for campaigns. To access the Routing Rule windows, the system administrator clicks on the Routing Rule button on the Administration Menu 152, to cause the Routing Administration Menu 192 as shown in FIG. 23 to appear, the buttons of which are described in Table 23 below.

TABLE 23

Routing Administration Menu Buttons

| Item | Description |
| --- | --- |
| Map Text Strings to Skill | Links skills to text strings to better route a contact |
| Define Customer Priority Levels | Ranks the priority level of different contacts and the frequency they move up the queue. |
| Define Media Priority Levels | Ranks the priority level of different types of media messages |
| Define Routing Skills | Defines contact center system routing skills. |

Figure 24:
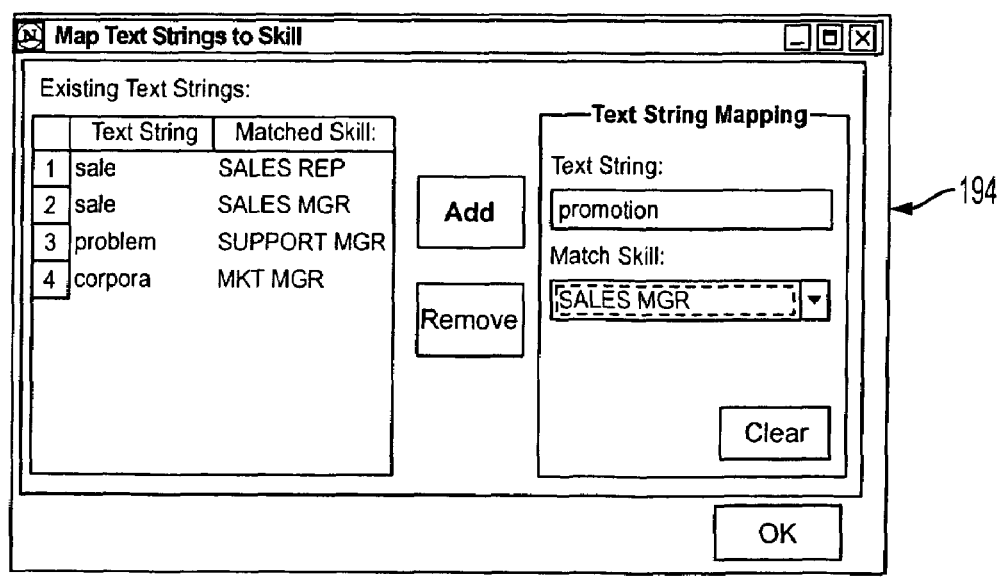
FIG. 24 is an example of a window which is displayed by a workstation to enable a system administrator to enter criteria to associate text strings of, for example, e-mails or facsimiles received by the call center system with skills of the agents of the call center system.

The system administrator can then access the Map Text Strings to Skill Window 194 as shown in FIG. 24 by clicking on the Map Text Strings to Skill button of the Routing Administration Window 192. The Map Text Strings to Skill Window 194 is for e-mail media types, that is, for matching a text string to a particular agent skill. For instance, the text string "mechanical problem" might be matched to the Skill "automobile". A customer might send an e-mail stating that they had problems with their vehicle's braking system. The string "vehicle braking" in their e-mail would be matched to the Skill "automobile". The e-mail would then be routed to an Agent working on an automotive repair shop campaign. One Matched Skill can be pointed to many different Text Strings.

The buttons of the Map Text Strings to Skill Window 194 are described in Table 24 as follows:

TABLE 24

Map Text Strings to Skill Window Buttons

| Item | Description |
|---|---|
| Existing Text Strings: | List box of existing text strings matched with a skill. |
| Option No. (no label) | Option number button (not labeled). Click this button to select from the list of existing test strings. |
| Text String | String of alphanumeric characters mapped to a specified skill. |
| Matched Skill | Existing skill to which a specific string of alphanumeric characters is associated for contact routing purposes. |
| Text String Mapping | |
| Text String: | Text box to enter an alphanumeric string of characters to map to a specified skill (254 character maximum). |
| Matched Skill: | Drop-down list box of existing skills to which the specified text string is to be mapped. |
| Clear | Button to clear the Text String Mapping fields. |
| Add | Button to add a Text String Mapping entry to the list of existing text strings. |
| Remove | Button to remove a selected existing text string. |
| OK | Button to close the Map Text Strings to Skill window. |

To map a text string to a skill, the system administrator performs the following operations:
1. Use the down arrow on the Matched Skill: drop-down list box in the Text String Mapping section to select a skill.
2. Click in the Text String: field and enter a string (up to 254 alphanumeric characters).
3. Click Add. The new string will appear as an item on the left side in the Existing Text Strings: list box.
4. Click OK.

The Map Text Strings to Skill Window 194 will then close, and the system administrator will be returned to the Routing Administration Menu 192.

To remove a link between a text string and a skill, the system administrator performs the following operations:
1. In the Existing Text Strings: list box, select the Matched Skill/Text String line to remove.
2. Click Remove. Both the Skill and the Text String fields will be empty.
3. Click OK.

The Map Text Strings to Skill Window 194 will then close, and the system administrator will then be returned to the Routing Administration Menu 192.

As will now be described, a campaign's existing customer database will classify a contact's type based on the size or volume of an account, years as a customer, or other market-driven criteria. Just as the contacts are different, their priority in the queue should be different. For instance, a "Gold" contact might have a higher priority than a "Silver" or a "Regular" contact and should be handled sooner. This ranking can also apply to the different types of contact, such as Voice, IVR, e-mail, Web callback, fax, and so on.

Figure 25:
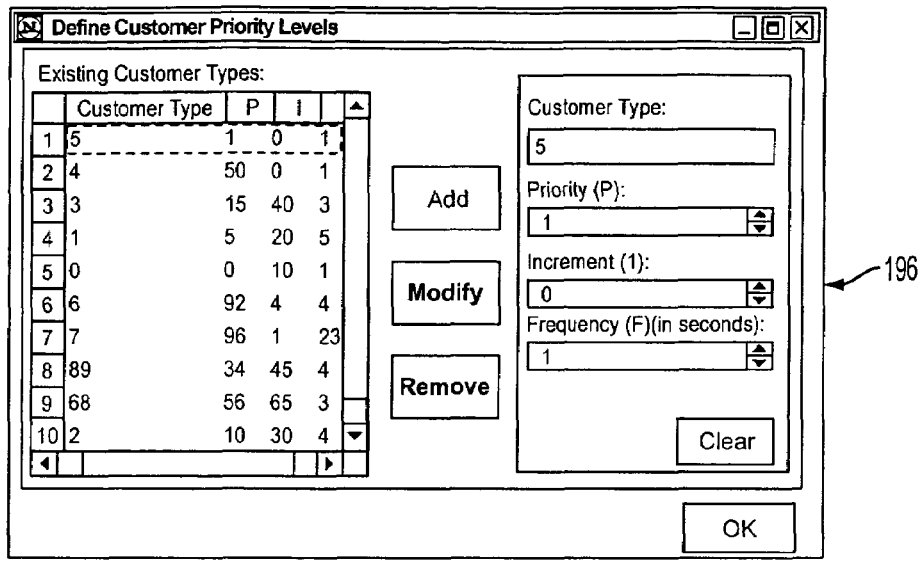
FIG. 25 is an example of a window which is displayed by a workstation to enable a system administrator to map the priority levels of the customers contacting the call center system.

To define the customer priority levels from the Routing Administration Menu 192, the system administrator clicks the Define Customer Priority Levels button. This causes the Define Customer Priority Levels Window 196 as shown in FIG. 25 to appear, with the buttons and entry items as described in Table 25 below.

TABLE 25

Define Customer Level Priority Levels Window Buttons and Entry Items

| Item | Description |
|---|---|
| Existing Customer Types: | List box of existing customer types. |
| Option No. (no label) | Option number button (not labeled). Click this button to select from the list of existing customer types. |
| Customer Type | Existing customer type. |
| P | Priority level associated with the specified customer type. |
| BR | Bump rate associated with the specified customer type. |
| BI | Bump interval associated with the specified customer type. |
| Customer Type: | Text box to enter a new customer type or to display an existing customer type when selected from the accompanying list (50 character maximum). |
| Priority (P): | Spin box to set the priority level of the specified customer type (Range: 01 to 100). Current information automatically entered in field upon selection of an existing customer type. This is the initial priority level upon entering the queue, the highest being 01. |
| Bump Rate (BR): | Spin box to set the bump rate of the specified customer type (Range: 01 to 4,294,967,295). Current information automatically entered in field upon selection of an existing customer type. This is the delay in seconds that a contact of the specified customer type remains in any given position in the queue before being moved up in the queue. |
| Bump Interval (BI): | Spin box to set the bump interval of the specified customer type (Range: 00 to 4,294,967,295). Current information automatically entered in field upon selection of an existing customer type. This is the number of levels that a contact of the specified customer type moves up in the queue each time the assigned bump rate delay has expired. |
| Clear | Button to clear all editable fields. |
| Add | Button to add a new customer type with its settings to the list of existing customer types. |
| Modify | Button to accept changes to the settings of a selected existing customer type. |
| Remove | Button to remove a selected existing customer type. |
| OK | Button to close the Define Customer Priority Levels window. |

To define a customer type, the system administrator performs the following operations:
1. In Customer Type: text box on the right side of the window, enter the word or abbreviation to describe a contact
2. Using the spin box arrows, select a pre-existing the Priority, Bump Rate and Bump Interval for this type of contact, or type in a new configuration
3. Click Add.

The Define Customer Priority Levels window will then close, and the system administrator will be returned to the Routing Administration Menu 192.

To modify a customer type, the system administrator performs the following operations:
1. Using the Existing Customer Types: list box, select the Customer Type.
2. Select the field(s) you wish to change and enter the correct data
3. Click Modify, then click OK.

The Define Customer Priority Levels Window 196 will then close, and the system administrator will be returned to the Routing Administration Menu 192. It is noted, however, that the customer type cannot be modified in this example.

To remove a customer type, the system administrator will perform the following operations:
1. Select the Customer Type line on the Existing Media Types: list box on the left side of the window
2. Click Remove, then click OK.

The Define Customer Priority Levels Window 196 will then close and system administrator will be returned to the Routing Administration Menu 192.

As described above, contacts reach the campaign contact center through a variety of different paths such as voice, web, e-mails or bulletin board message. As in the Customer Priority Level, some may require a higher priority (voice) than others (e-mail or fax).

Figure 26:
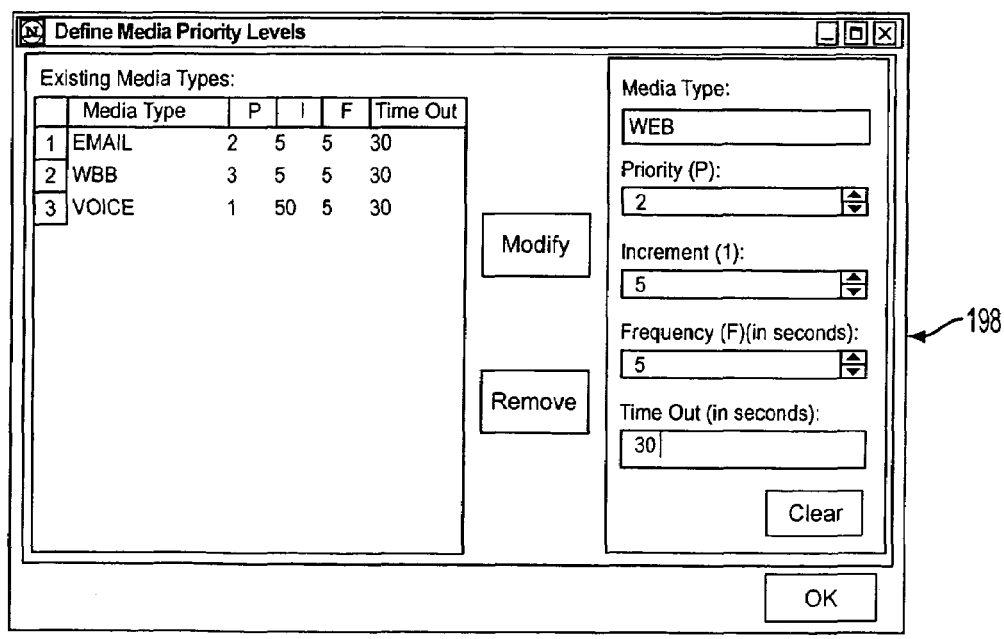
FIG. 26 is an example of a window which is displayed by a workstation to enable a system administrator to define the priorities of the media types being received and handled by the call center system.

Therefore, to define media priority levels from the Routing Administration Menu 192, the system administrator clicks the Media Priority Levels button to cause the Define Media Priority Levels Window 198 as shown in FIG. 26 to appear, with the buttons and entry items as described in Table 26 below.

TABLE 26

Define Media Priority Levels Window Buttons and Entry Items

| Item | Description |
| --- | --- |
| Existing Media Types: | List box of existing media types and their settings. The following media types are supported in the current release of system: |
| | VOICE — Voice: Inbound telephone call. |
| | CALLBACK — Call Back: Inbound contact scheduling an automated outbound telephone call. |
| | EMAIL — E-mail: Inbound e-mail with automated outbound e-mail response ('e-mail received' notice). |
| | WEB — Web Call Back: Inbound Web contact initiating an automated outbound telephone call. |
| | CHAT — Web Chat: Inbound Web contact initiating an automated Web chat. |
| | WBB — Web Bulletin Board: Inbound Web bulletin board post. |
| Option No. (no label) | Option number button (not labeled). Click this button to select from the list of existing media types. |
| Customer Type | Existing media type. |
| P | Priority level associated with the specified media type. |
| I | Bump rate associated with the specified media type. |
| F | Bump interval associated with the specified media type. |
| Timeout | Timeout interval associated with the specified media type. |
| Media Type: | Text box to enter a new media type or to display an existing media type when selected from the accompanying list (50 character maximum). |
| Priority (P): | Spin box to set the priority level of the specified media type (Range: 01 to 100). Current information automatically entered in field upon selection of an existing media type. This is the initial priority level upon entering the queue, the highest being 01. |
| Increment (I): | Spin box to set the increment rate of the specified media type (Range: 01 to 4,294,967,295). This is the delay in seconds that a contact of the specified media type remains in any given position in the queue before being moved up in the queue. Current information automatically entered in field upon selection of an existing media type. |
| Frequency (F): | Spin box to set the increment frequency of the specified media type (Range: 01 to 4,294,967,295). This is the number of levels that a contact of the specified media type moves up in the queue each time the assigned bump rate delay has expired. Current information automatically entered in field upon selection of an existing media type. |

TABLE 26-continued

Define Media Priority Levels Window Buttons and Entry Items

| Item | Description |
| --- | --- |
| Timeout (in Seconds): | Text box to set the timeout interval of the specified media type (Range: 01 to 4,294,967,295). This is the delay that a contact of the specified media type remains at the top of an Agent's queue before being rerouted to another Agent with 'next best match' qualifications. |
| Clear | Button to clear all editable fields. |
| Modify | Button to accept changes to the settings of a selected existing media type. |
| Remove | Button to remove a selected existing media type. |
| OK | Button to close the Define Media Priority Levels window. |

In the above example and as described in more detail below, an e-mail contact requesting information on a riding mower starts at a priority of 10. After 6 seconds, the contact is bumped up 2 intervals. Another 6 seconds will bump the contact again. After waiting 2 minutes at the top of the agent's queue, the contact is bounced to another agent qualified to handle this type of contact. If no qualified agent is available, the contact will be routed to the next lower qualified agent.

To define media priority levels, the system administrator performs the following operations:
1. Click in the Media Type field
2. Enter the alpha text to identify a media type (no spaces between words)
3. Using the Up/Down arrows, select a pre-existing the Priority, Bump Rate and Bump Interval for this type of contact, or type in a new configuration
4. Click Add, then click OK.

The Define Media Priority Levels Window 198 will then close, and the system administrator will return to the Routing Administration Menu 192.

To modify a media type requirement, the system administrator performs the following operations:
1. Using the Existing Media Types on the left side of the window, select the Media Type to change.
2. In the right, select the list box to change and enter the correct data.
3. Click Modify, then click OK.

The Define Media Priority Levels Window 198 will then close, and the system administrator will return to the Routing Administration Menu 192. It is noted, however, that the media type filed cannot be modified in this example.

To remove a media type, the system administrator performs the following operations:
1. Select the Media Type line on the Existing Media Types: list box on the left side of the window.
2. Click Remove, then click OK.

The Define Media Priority Levels Window 198 will then close, and the system administrator will return to the Routing Administration Menu 192. It is noted, however, that a media type cannot be removed if an active contact uses this media type.

As described in more detail below, a skill can be any ability that will facilitate the handling of a contact. The system administrator typically works with his or her campaign's coordinator or a representative from the client to create a list of appropriate skills. The initial list can be modified or expanded as experience dictates.

Figure 27:
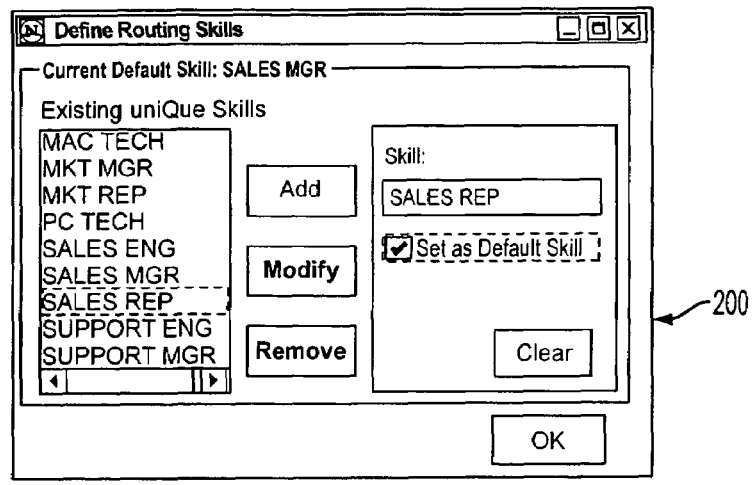
FIG. 27 is an example of a window which is displayed by a workstation to enable a system administrator to define the routing skills of the agents of the call center system.

Each campaign will have a variety of required skills. Some are general, such as service or sales ability, others more specific to the requirements of the campaign. To define routing skills from the Routing Administration Menu 192, the system administrator clicks the Define Routing Skills button to display the Define Routing Skills Window 200 as shown in FIG. 27, the buttons and entry items of which are described in Table 27 below.

TABLE 27

Define Routing Skills Window Buttons and Entry Items

| Item | Description |
| --- | --- |
| Current Default Skill: <SKILL> | Existing skill currently set as the default. Inbound contacts not mapped to a specific skill are automatically routed according to the default skill. |
| Existing system Skill: | List box of existing skills. |
| system Skill: | Text box to enter a new skill (50 character maximum) or to display a selected existing skill from the accompanying list. |
| Set as Default Skill | Checkbox to assign the specified skill as the default (replacing the previous default skill). |
| Clear | Button to clear the contents of all editable fields. |
| Add | Button to add a new skill to the list of existing skills. |
| Modify | Button to accept changes to a selected existing skill. |
| Remove | Button to remove a selected existing skill. |
| OK | Button to close the Define Routing Skills window. |

A campaign will normally require an Agent to be trained on the various features of the product or service offered. A word or two can define these skills. For example, an auto repair campaign skill requirement could be defined as automotive or mechanical while a computer campaign would want a skill in hardware, software, or a particular operating system.

To add a routing skill, the system administrator performs the following operations:
1. Click in the system Skill field
2. Type in the skill
3. If this skill is going to serve as the default skill, click the Set as Default Skill checkbox
4. Click Add, then click OK The Define Routing Skills Window 200 will then close, and the system administrator will return to the Routing Administration Menu 192. It is noted, however, that the system 100 requires one skill to be designated as the default skill. When setting up the first campaign, the system administrator should designate the first skill as the default skill.

To modify the default skill, the system administrator performs the following operations:
1. Click in the Existing system Skills: list box on the left side of the window.
2. Select the skill to be designated as the default skill.
3. If this skill is going to serve as the default skill, click the Set as Default Skill checkbox.
4. Click Modify, then click OK.

The Define Routing Skills Window 200 will then close, and the system administrator will return to the Routing Administration Menu 192. It is noted, however, that to change the default designation, the system administrator will have to designate another skill as the default skill. The system will automatically remove the default designation from this skill.

To remove a routing skill, the system administrator performs the following operations:
1. Click in the Existing system Skills: list box on the left side of the window.
2. Select the skill to be deleted.
3. Click Remove, then click OK.

The Define Routing Skills Window 200 will then close, and the system administrator will return to the Routing Administration Menu 192. It is noted, however, that to remove the default designation, the system administrator will have to designate another skill as the default skill. The system will automatically remove the default designation from this skill. Also, the system administrator may not remove a skill that is currently assigned to a queued contact.

The call center system 100 in this example contains a set of nine standard performance reports such as agent productivity and performance along with a user controlled report writer that allows the user to design and develop a complete set of reports to meet even the most detailed reporting requirements. Because the system 100 combines both the contact reporting statistics with the business results (outcome, result, reason) a supervisor can produce reports that provide insight as to how successful a campaign is at any point in time.

Figure 28:
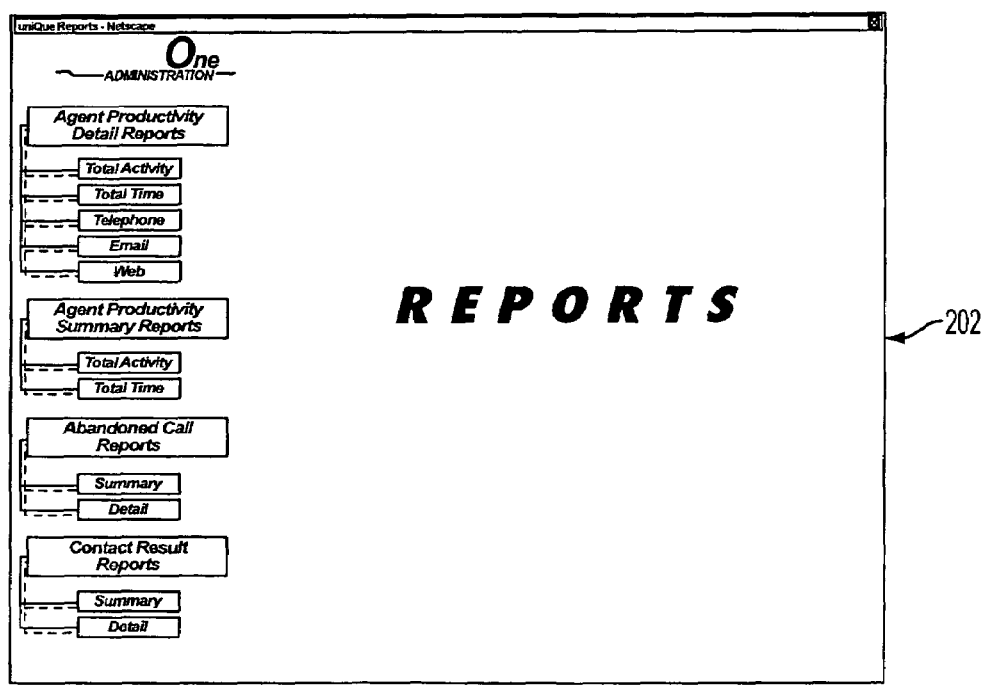
FIG. 28 is an example of a menu which is displayed by a workstation to enable a system administrator to generate reports pertaining to the contacts being handled by the call center system.

To reach the Report menu, the system administrator can click the Report button on the Administration Menu 152, which causes the Reports Window 202 as shown in FIG. 28 to be displayed. The Agent Productivity Detail Reports buttons are described in Table 28 below, and can be used to generate productivity reports 204 and 206 as shown, for example, in FIGS. 29 and 30.

TABLE 28

Agent Productivity Detail Reports Buttons

| Item | Description |
| --- | --- |
| Total Activity | Shows total number of contacts by needed type separated by tune intervals. |
| Total Time | Total media activity time divided by media type and time intervals. |
| Telephone | Shows number of telephone contact handled by each agent and average handling time. |
| Email | Shows number of email handled by each agent and average handling time. |
| Web | Shows number of web contacts handled by each agent and average handling time. |

The Agent Productivity Summary Reports Buttons are described in Table 29 below and can be used to Summarize productivity for all agents in a campaign, and to generate reports 208 and 210 as shown in FIGS. 31 and 32.

TABLE 29

Agent Productivity Summary Reports Buttons

| Item | Description |
| --- | --- |
| Total Activity | Shows number of contacts for all agents separated by media type. |
| Total Time | Shows number of minutes for all agents separated by media type. |

The Abandoned Call Reports buttons are described in Table 30 below and can be used to provide summary and detail reports 212, 214 and 216 on abandoned calls as shown in FIGS. 33–35.

TABLE 30

Abandoned Call Reports Buttons

| Item | Description |
| --- | --- |
| Summary | Shows number of contacts by campaign. |
| Detail | Shows number of contacts for each 15 minute time interval. |

The Contact Results Reports buttons are described in Table 31 below and can be used to provide summary and detail reports 218, 220, 222 and 224 and shown in FIGS. 36–39.

TABLE 31

Contact Results Reports Buttons

| Item | Description |
| --- | --- |
| Summary | Shows number of contacts by configured outcome results. |
| Detail | Shows number of contacts by reason and media type. |

As will now be described, an example of XYZ company's Web Bulletin Board for its customers to exchange information and ideas will be used to illustrate this concepts. Messages that remain unanswered for a specified amount of time need to be rerouted to an appropriate Agent for handling. To configure this Bulletin Board, the system administrator clicks the Web Msg Board button on the Administration Menu 152 (see FIG. 3) to cause the WBB Administration Menu 226 as shown in FIG. 40 to be displayed.

Figure 41:
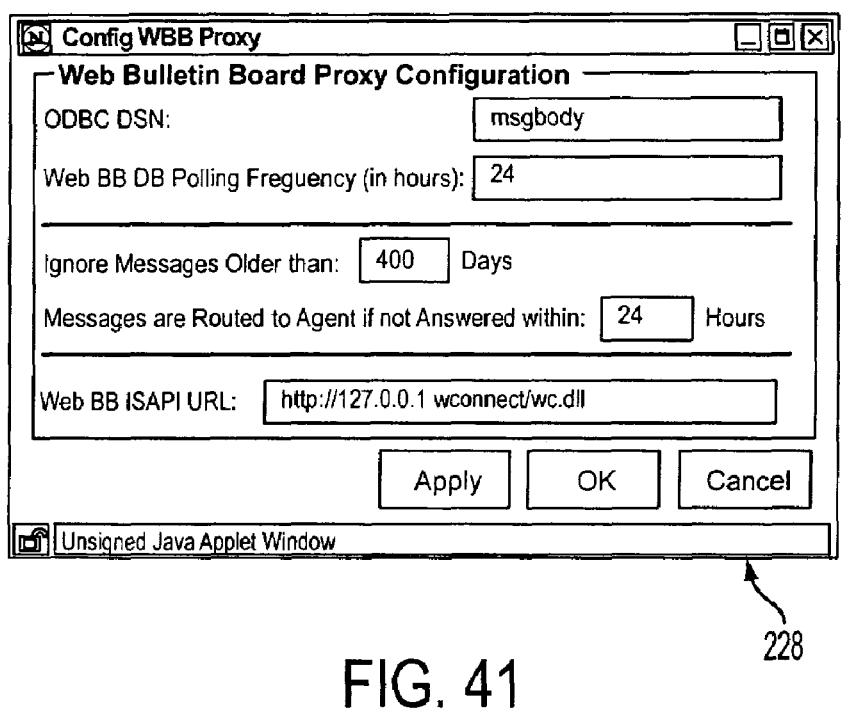
FIG. 41 is an example of a window which is displayed by a workstation to enable a system administrator to enter criteria for a Web bulletin board accessible by the call center system.

To access the Web Bulletin Board Proxy Configuration Window 228 as shown in FIG. 41, the system administrator clicks on the Config WBB Proxy button of the WBB Administration Menu 226. The buttons and entry items of the Web Bulletin Board Proxy Configuration Window 228 is described in Table 32 as follows.

TABLE 32

Web Bulletin Board Proxy Configuration Buttons and Item Entries

| Item | Description |
| --- | --- |
| Web Bulletin Board Proxy Configuration | |
| ODBC DSN: | Text box to specify the Open Database Connectivity Data Source Name, the database identifier (alphanumeric field, 64 character maximum) |
| Web BB DB Polling Frequency (in Hours): | Text box to specify how often in hours that the database is to be checked for unanswered bulletin board messages (integers only). |
| Ignore Messages Older than: | Text box to specify the upper age limit of messages in days that system is to scan when polling the bulletin board (integers only). |
| Messages are Routed to Agent if not Answered within: | Text box to specify the amount of time in hours a bulletin board message is to remain unanswered before being routed to an Agent (integers only). |
| Web BB ISAPI URL: | Text box to specify the Web Bulleting Board Internet Server Application Program Interface Uniform Resource Locator, the Internet address of the database (alphanumeric field, full URL only). |
| Apply | Button to accept the WBB proxy configuration (including any changes) without closing the window |
| OK | Button to accept the WBB proxy configuration (including any changes) and close the window. |
| Cancel | Button to close the Config WBB Proxy window without accepting further changes, if any. |

To add a Web bulletin board proxy, the system administrator clicks in the ODBC DSN field and enter the name of the database and performs the following operations:

1. In the Pooling Frequency field, enter the number of hours between pollings.
2. In the Ignore Messages Older Than field, enter the maximum number of days the program is to poll. Older messages will no longer be polled.
3. In the Messages Are Routed to Agent if Not Answered Within field, enter length of time, in hours, that a message will remain on the Bulletin Board
4. In the Web BB ISAPI URL field, enter the Web server address and application name and URL.
5. Click Add, then click OK The Web Bulletin Board Proxy Configuration Window 228 will then close, and the system administrator will be returned to the Administration Menu 252.

After all of the desired configurations for the call center system 100 have been entered, the processing shown in FIG. 2 continues to step 1040, during which the system 100 awaits contact and agent activity as will now be described.

Agent Logon Process

Once the call center system 100 of FIG. 1 has been configured in the manner described above, the agents will be available to log into their respective workstations 102 or remote workstations 148 to handle the various types of contacts as exemplified in detail below. For exemplary purposes, the login process will be described in relation to a local workstation 102, although the same process is performed in relation to a remote workstation 146.

Figure 42:
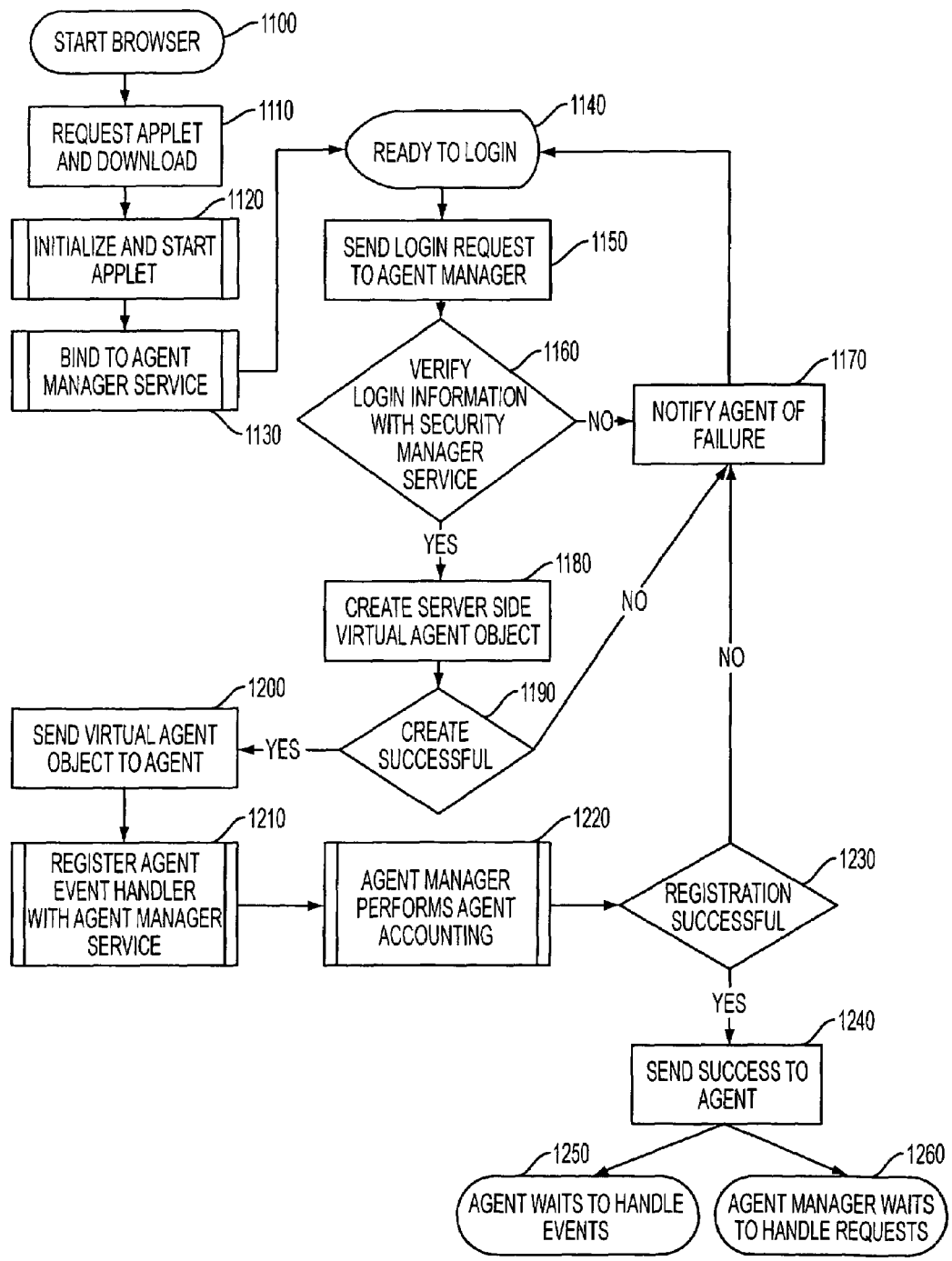
FIG. 42 is a flowchart illustrating an example of operations performed by an agent to log into the call center system.

In order to be ready to log into the call center system 100, an agent will need to request and download the necessary applet to his or her workstation 102. The operations for performing these initial steps are shown in the flowchart of FIG. 42.

Specifically, in step 1110, the agent starts the web browser on his or her workstation 102. For example, the workstation can be running an operating system, such as Windows NT, capable of running a Java enabled web browser application, such as Nescape, which will be controlled by the web browser to display a plurality of icons on the display terminal of the workstation 102 when the web browser is started. The web browser can be configured to include among the icons a specific icon which, when clicked, causes the web browser to request an HTML page which contains the required applet from, for example, the intranet/extranet server WWW server 124 (see FIG. 1).

Figure 43:
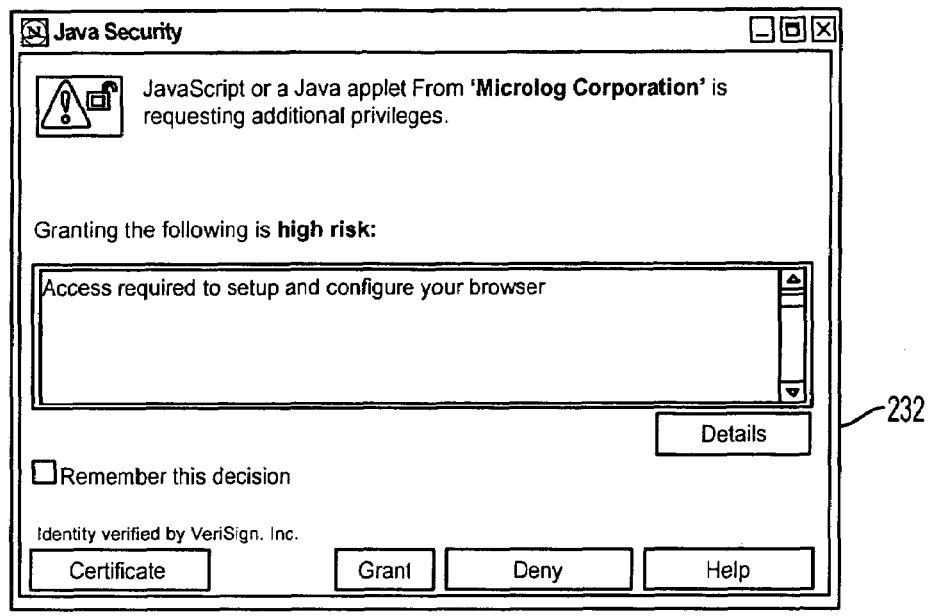
FIGS. 43–45 are examples of display windows generated at an agent's workstation providing security warnings when an agent is performing the login operations shown in the flowchart of FIG. 42.
Figure 44:
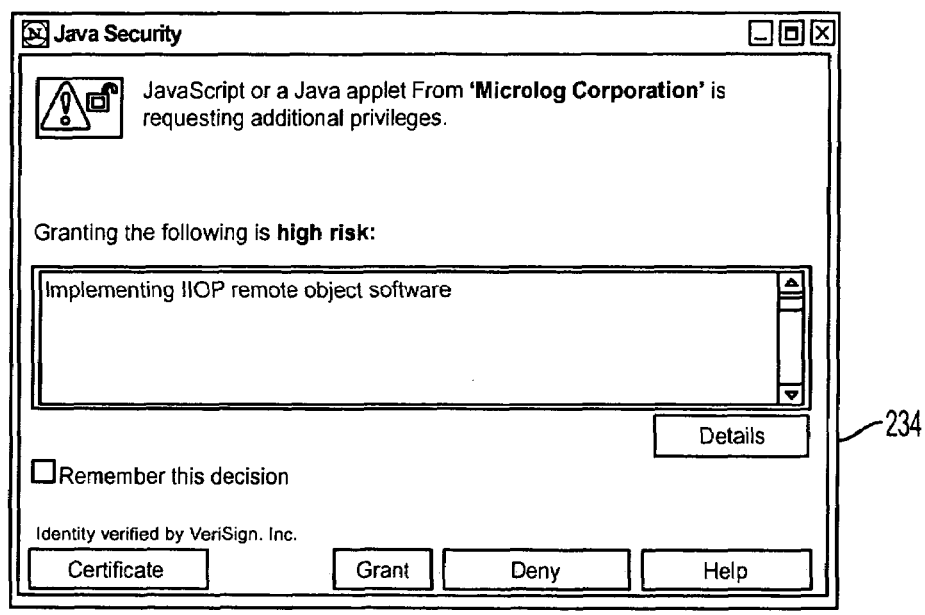
Figure 45:
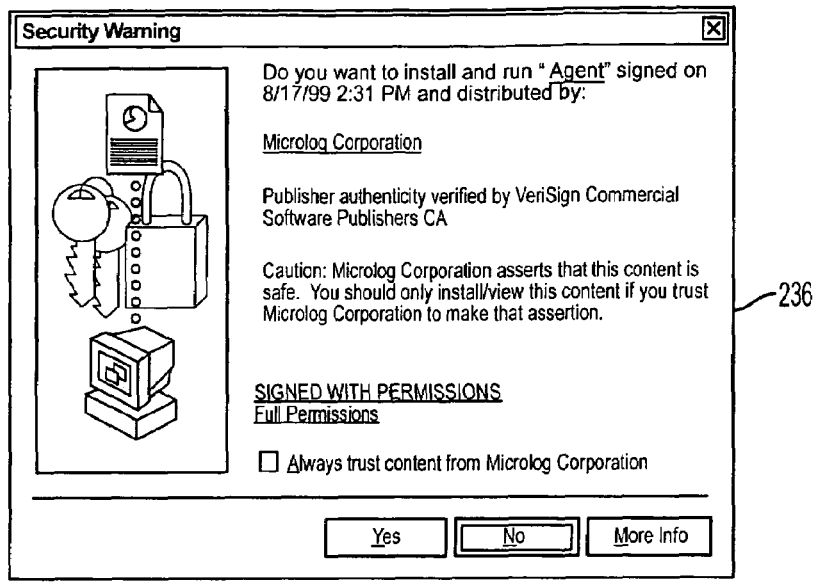

When agent instructs the web browser to request the appropriate applet by clicking on the appropriate icon, the flow of operations proceeds to step 1110, during which the WWW server 123 downloads the applet over the LAN/WAN 120 to the agent's workstation 102. When the downloading is occurring, the web browser may generate the security alert windows 232, 234 and 236 as shown in FIGS. 43–45. In this event, the agent can enter the appropriate information to allow the web browser to download the applet.

Specifically, as can be appreciated by one skilled in the art, security alerts are generated by the browser at the agent's workstation 102 whenever external applications, such as Java applets, attempt to access the workstation 102 without permission. In most cases, an agent workstation 102 will have been fully configured by the system administrator in advance as described above, to insure that the web browser running on the workstation 102 automatically accept all requests by the software of the system 100 to access the workstation 102. If this configuration has not been done, the workstation 102 will display one or two security alert windows, depending on whether the workstation 102 is using Internet Explorer or Netscape.

In the event that the automatic access permission was not configured in advance at workstation 102, upon requesting the applet, the agent will have to grant the required privileges in order to log into the system. If the workstation 102 is running Netscape, two Java Security windows appear on the workstation 102 display screen as shown in FIGS. 232 and 234 If the agent wants Netscape to automatically grant these privileges in the future for each Java security alert, the agent should check the "remember this decision" checkbox before granting the privilege. The agent then can click the "Grant" button to allow the workstation 102 to continue loading the applet.

Alternatively, if the workstation 102 is using Internet Explorer, one Java security window 236 appears on the display screen as shown in FIG. 45. If the agent wants Internet Explorer to automatically grant these privileges in the future, the agent should check the "Always trust content from Microlog Corporation" checkbox before granting the privilege, and the click the "Yes" button to allow the workstation 102 to continue loading the applet.

Figure 46:
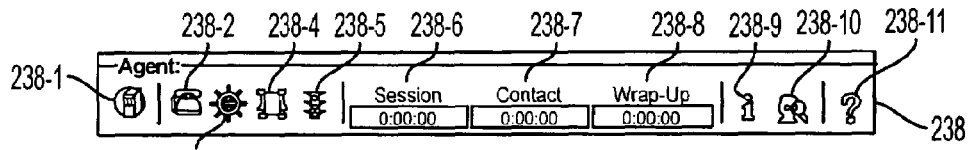
FIG. 46 is an example of a toolbar displayed at the agent's workstation when the agent is performing the login operations of the flowchart shown in FIG. 42.

Once the applet has been downloaded, the flow of operations proceeds to step 1120 where the web browser initializes and starts the applet to cause the workstation 102 to display the agent toolbar 238 as shown in FIG. 46 and as described in Table 33 below.

TABLE 33

Agent Toolbar Features

| Item | | Description |
|---|---|---|
| Agent: | (Name) | Name of the Agent currently logged into the workstation. |
| System Interface | 238-1 | Button allowing you to log in/log out and change your password |
| Virtual Phone | 238-2 | Button for opening the Virtual Phone and visual indicator of the connection status of a telephone contact. |
| Web Collaboration Interface | 238-3 | Button for opening the Web Collaboration Interface that allows you to communicate with a contact via the Web. |
| Reroute Contact | 238-4 | Button for rerouting a contact and for consulting with another Agent during a contact. |
| Agent Status Indicator | 238-5 | Button for transitioning from one stage of a contact into another and visual indicator of your current contact status. |
| Session Timer | 238-6 | Displays the total time you have been logged in to the system. |
| Contact Timer | 238-7 | Displays the total time you have been working with a contact. |
| Wrap-Up Timer | 238-8 | Displays the amount of time remaining for Wrap-Up as established for you by the Administrator. |
| Agent Queue Monitor | 238-9 | Button for accessing a display of an Agent's personal queue. |
| Campaign Monitor | 238-10 | Button for accessing current queue information regarding all campaigns assigned to you. |
| Help | 238-11 | Button for accessing on-line help. |

The processing will continue to step 1130 where the applet loaded to the agent's workstation 102 is bound to the agent manager service of the contact center server 122 (see FIG. 1). The processing then continues to step 1140 where the agent is ready to log in.

Figure 16:
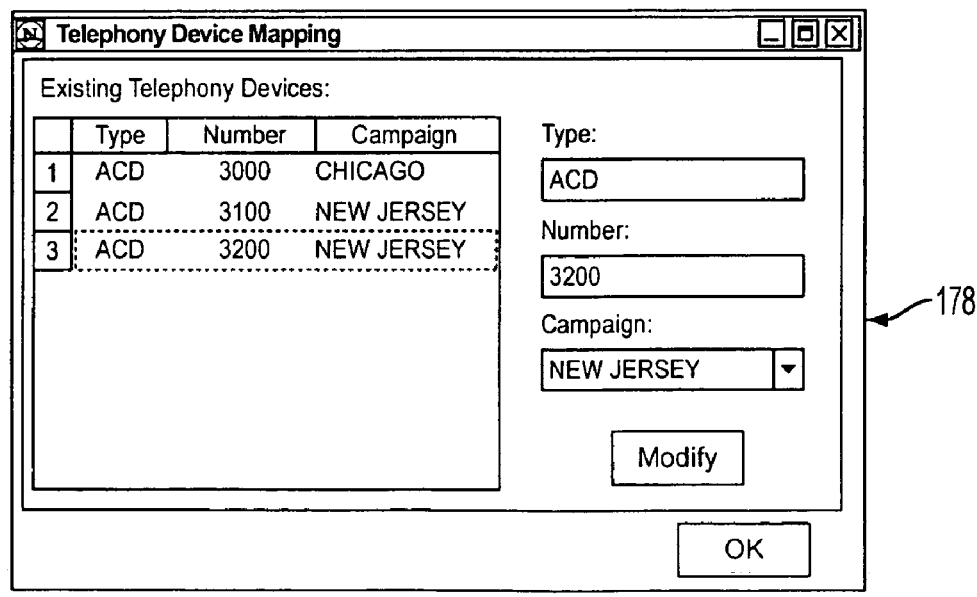
FIG. 16 is an example of a telephony device mapping window which is displayed by a workstation to enable a system administrator to assign telephony devices of the call center system to campaigns handled by the call center system.
Figure 17:
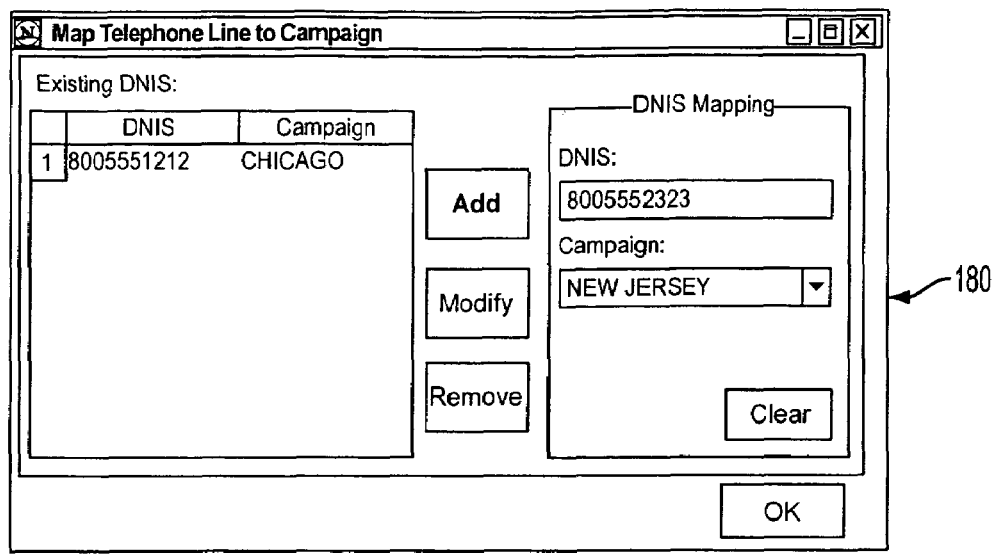
FIG. 17 is an example of a window which is displayed by a workstation to enable a system administrator to map the call identified by the Dialed Number Identification Service (DNIS) to campaigns handled by the call center system.
Figure 47:
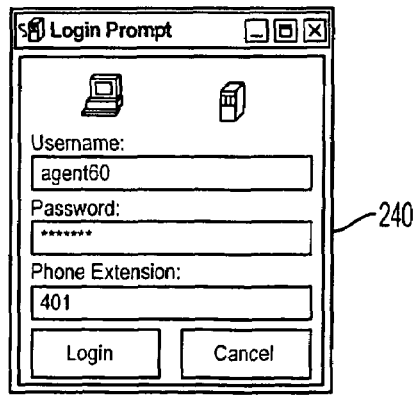
FIG. 47 is an example of a login prompt displayed at the agent's workstation when the agent is performing the login operations of the flowchart shown in FIG. 42.

As shown in FIG. 16, the system interface icon 238-1, which at this time is a circle and bar in the left hand portion of the agent toolbar 138, indicates that the agent has not logged in. To activate the agent tools on the workstation 102, the agent can begin the login process by clicking on the system interface icon 238-1 to cause the log in prompt window 240 to appear as shown in FIG. 47 and described in Table 34 below.

TABLE 34

Agent Login Prompt Features

| Item | Description |
|---|---|
| Username: | Agent username. This is assigned by the Administrator. |
| Password: | Agent password. The Administrator initially assigns a password for the agent. An agent may change the password any time you are logged into the system except during a contact. |
| Phone Extension: | Agent telephone contact phone extension. |
| Login | Button to complete the login process. |
| Cancel | Button to cancel the login process. |

The agent then enters the appropriate information and clicks the log-in button, which causes the processing to flow to step 1150 where a log-in request is sent to the agent manager. In step 1160, the agent manager verifies the log-in information with the security manager service. If the log-in information is incorrect, the processing continues to step 1170 where the agent is notified of a log-in failure by an error message displayed on his or her workstation. The processing then returns to step 1140 where the agent can again attempt to log in.

However, if the log-in information is verified as being correct in step 1160, the processing continues to step 1180 where the contact center server 122 creates a server site virtual agent object using CORBA as can appreciated by one skilled in the art. The processing then continues to step 1190 where it is determined whether the server site virtual agent object has been successfully created. If the virtual agent object has not been successfully created, the processing continues to step 1170 where an error message is displayed to notify the agent of a failure, and then the processing proceeds to step 1140 to await another log-in attempt. However, if the virtual agent object has successfully been created, the processing flows to step 1200 where the virtual agent object is sent to the agent's workstation 102 by the contact center server 122 over the LAN/WAN 120.

The processing then continues to step 1210 where the agent event handler is registered with the agent manager service. The agent manager service then performs an agent accounting in step 1220, where the agent manager determines how many agents are available, the skills of the available agents, and so on.

Figure 48:
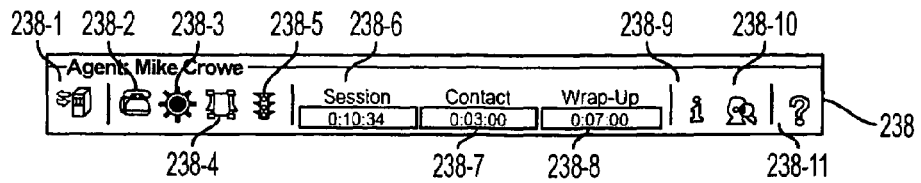
FIG. 48 is an example of a toolbar displayed at the agent's workstation when the agent has successfully performed the login operations of the flowchart shown in FIG. 42.

The processing then continues to step 1230 where the registration is verified. If the registration has not been successful, the processing continues to step 1170 to generate an error message on the display screen of the agent's workstation 102, and then continues to step 140 to await another log-in attempt. However, if the registration is successful, the processing continues to step 1240 where the agent workstation 102 is controlled to display the agent toolbar 238 as shown in FIG. 48. It is noted that in the left hand side of toolbar 238, the system interface icon 238-1 indicates via the opposite facing arrows that the agent has successfully logged in and thus has established a communication link with the contact center server 122. Also, all three lights of the "traffic light" agent status indicator icon 238-5 will be on.

Parallel processing then occurs as indicated in steps 1250 and 1260. Specifically, in step 1250, the agent sets his or her status to "ready" and waits to handle contacts that are routed to him or her as will be described further below. To indicate that he or she is available to receive contacts, the agent clicks on the agent status indicator icon 238-5, which causes the red and yellow traffic lights to turn off, thus leaving the green light active as an indication that the agent is ready.

In step 1260, the agent manager waits to handle requests from the agent, such as e-mails, telephone call requests, VoIP requests, and so on, as described in more detail below, and other agent related tasks. For example, if the agent wishes to log off, the agent can click on the system interface icon 238-1. The agent manager will then perform the necessary steps to destroy the server side virtual agent object, and thus undo the established communication link with the agent workstation 102. In this event, the system interface icon 238-1 will return to a circle and bar display, indicating that the agent has logged out.

Figure 49:
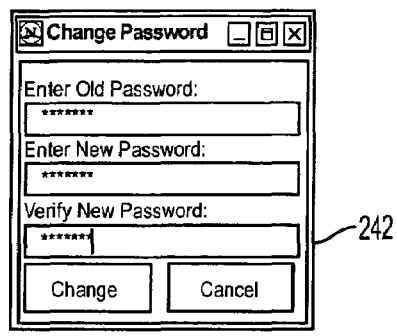
FIG. 49 is an example of a change password window displayed at the agent's workstation when the agent wishes to change his or her password.

Also, the agent can change his or her password. To open the Change Password box as shown in FIG. 49 while logged into the system, the agent right-clicks on the System Interface icon 238-1 on the toolbar 238. A drop down menu will appear, which will allow the agent to left-click on the "change password" option to open the Change Password dialog box. The agent can then perform the following steps:
1. Click in the Enter Old Password: field and enter the existing password.
2. Type the new password in the "Enter New Password:" field. Enter it again in the "Verify New Password:" field. (If necessary, click Cancel to clear the fields, and try again.).
3. Click "Change".

The old password is then replaced by the new one. However, if the old password is not entered correctly, or if the password typed in the "Verify New Password:" field does not match what was typed in the "Enter New Password:" field, an error message box will appear. In this event, the agent can click "OK" to clear the error message box and try again.

As discussed above, the agents who have logged into the system 100 will be available to handle contacts being received by the system 100. The following describes an exemplary manner in which the call center system 100 receives and queues contacts of different media types, such as telephony, facsimile, e-mail, Internet-based contacts, and so on, and routes those different contacts to the agents best suited to handle and respond to them.

Queuing and Routing of Contacts

Figure 50:
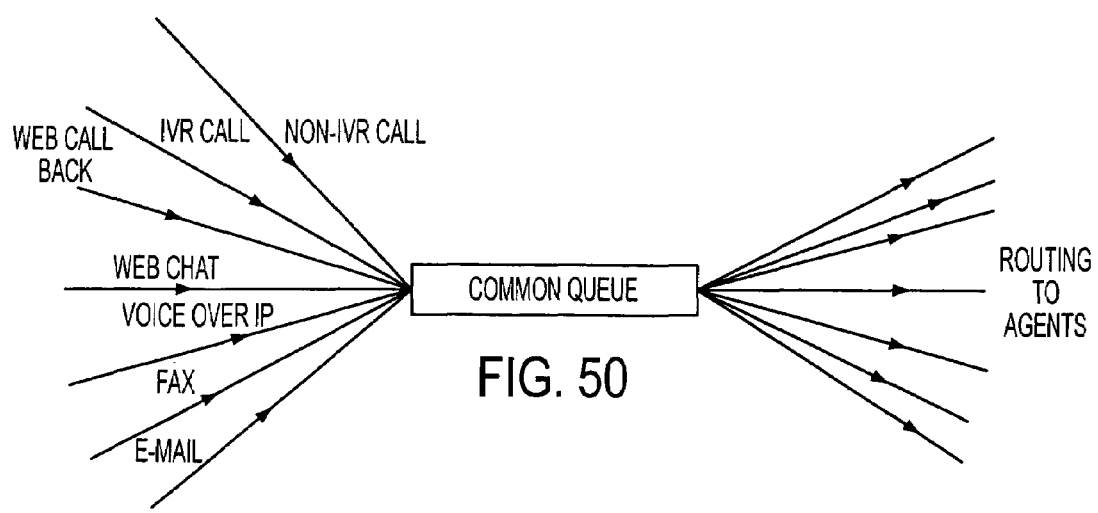
FIG. 50 is a conceptual diagram illustrating an example of the manner in which different media-type contacts are input and maintained in a common queue, and then routed to the appropriate agents.

FIG. 50 is a conceptual flow diagram illustrating the basic manner in which the contact center system 100 receives contacts of different media types, retains the different media types in a common queue, and routes the queued contacts to the appropriate agents. As shown, the contact center system 100 in this example is capable of handling non-IVR telephone calls, IVR telephone calls, web callback requests, web chat, voice over IP communications, faxes and e-mails. However, as described below, because the different media-type contacts are all queued in a common queue independent of media type, the system is adaptable to handle any type of contact.

For purposes of this explanation, the receipt, queuing and routing of each different type of media contact will be discussed separately. However, as can be appreciated by one skilled in the art, the contact center system 100 receives and handles many of the different types of media contacts simultaneously.

Figure 51:
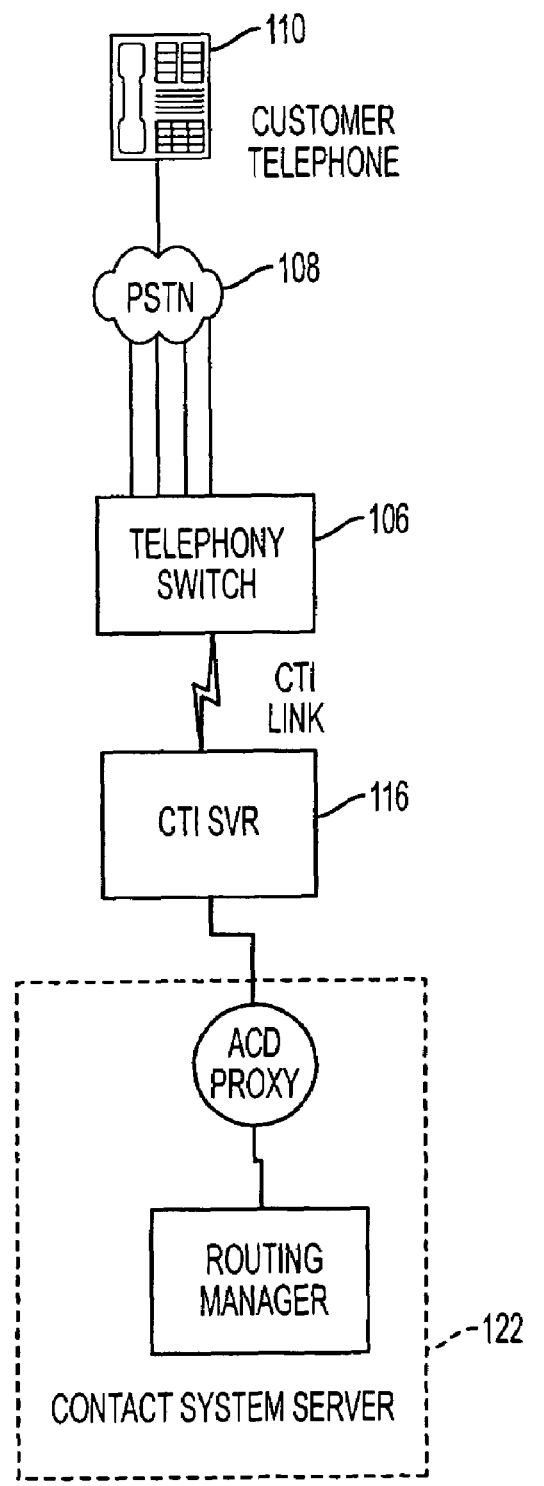
FIG. 51 is a conceptual block diagram illustrating features of the contact center system involved in receiving a non-IVR telephone call.
Figure 52:
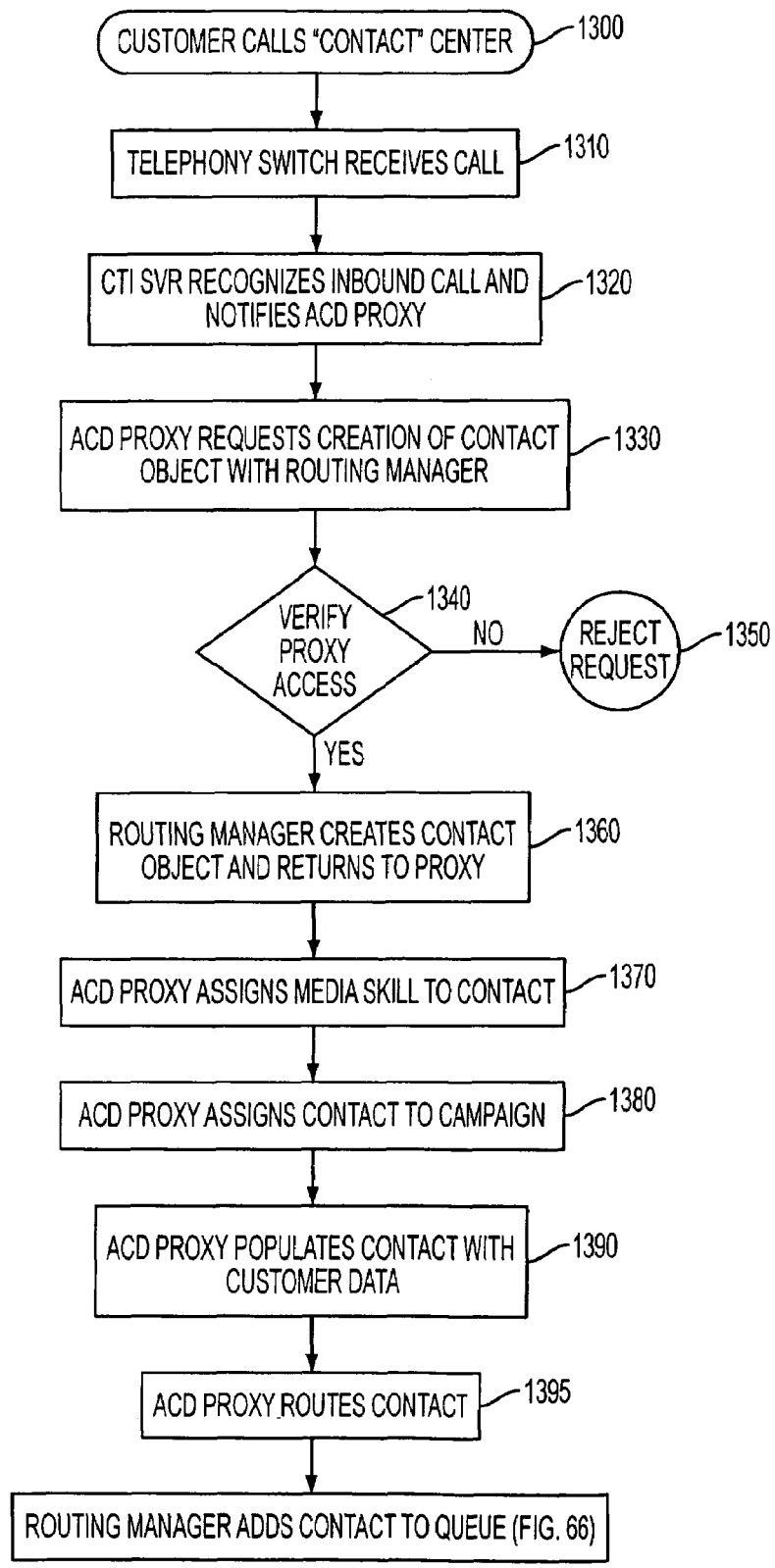
FIG. 52 is a flowchart illustrating an example of steps preformed by components shown in FIG. 51 to receive a non-IVR contact.

Like a traditional call center, the contact center system 100 is capable of receiving and routing normal, non IVR telephone calls to agent telephones 104 and remote agent telephones 150, as appropriate. The components associated with the receipt, queuing and routing of telephone calls are shown in the diagram of FIG. 51, while FIG. 52 illustrates the steps performed by these components for receiving and placing the calls in the common queue.

As indicated in step 1300, a customer can place a call to the contact center over the PSTN 108 via his or her customer telephone 110. The call is received by the telephony switch 106 in step 1310. In step 1320, the CTI server 106 recognizes the receipt of the incoming call, and notifies the ACD proxy of the contact system server 122. In step 1330, the ACD proxy then requests creation of a contact object with the routing manager which is also resident in the contact system 122.

The processing proceeds to step 1340, where the routing manager verifies the request from the ACD proxy. If the request cannot be verified, the processing proceeds to step 1350, where the ACD proxy is informed by the routing manager that the contact object request has been rejected. However, if the request is verified, the processing proceeds to step 1360 where the routing manager creates a contact object and returns the contact object to the ACD proxy.

The ACD proxy then assigns media skills to the contact in step 1370. For example, since the contact is a normal inbound call, the ACD proxy would assign a contact skill to the contact indicating that it could be handled by any agent capable of handling normal inbound calls. The processing then proceeds to step 1380, where it assigns the contact to a campaign of the contact center system 100 that has been configured as described in detail in the "Configuring Call Center System" section above.

In step 1390, the ACD proxy then populates the contact with customer data. For example, since the contact is a normal inbound call, the ACD proxy can populate the contact with the customer DNIS. The ACD proxy then routes the contact to the routing manager in step 1395. The routing manager then begins the process of adding the contact to the common queue as described in detail below.

Figure 53:
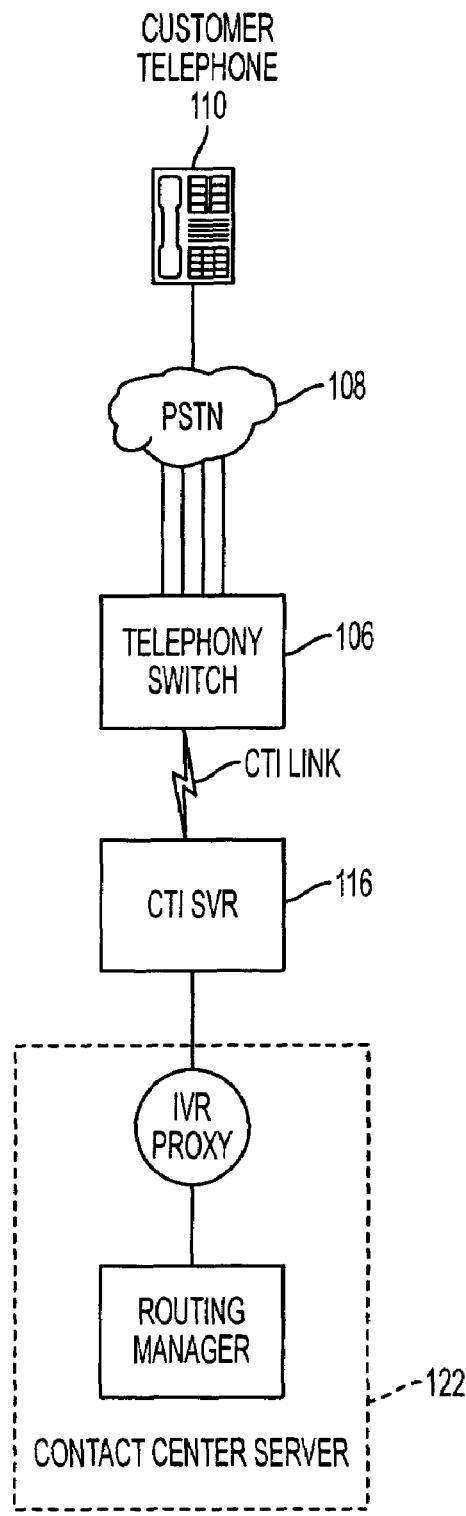
FIG. 53 is a conceptual diagram of components of the contact center system shown in FIG. 1 involved in receiving an IVR contact.
Figure 54:
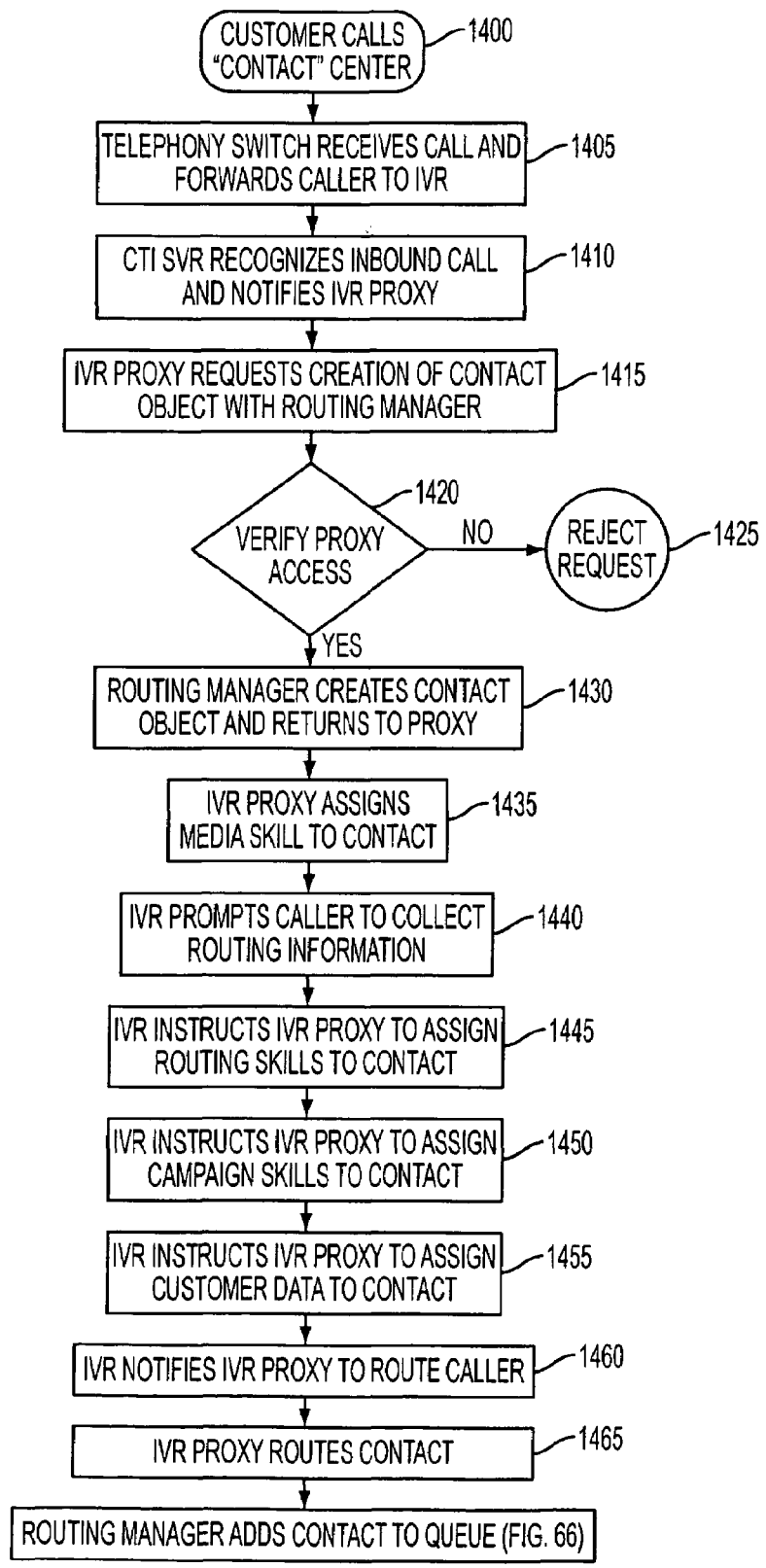
FIG. 54 is a flowchart illustrating an example of steps performed by the components shown in FIG. 53 to receive an IVR contact.

The contact center is also capable of handling IVR telephone calls. The components associated with the receipt, queuing and routing of IVR telephone calls are shown in the diagram of FIG. 53, while FIG. 54 illustrates the steps performed by these components for receiving and placing the calls in the common queue.

As indicated in step 1400, a customer can place a call to the contact center over the PSTN 108 via his or her customer telephone 110. The telephony switch 106 receives the call and forwards the caller to the IVR in step 1405. In step 1410, the CTI server 106 recognizes the receipt of the incoming call, and notifies the IVR proxy of the contact system server 122. In step 1415, the IVR proxy then requests creation of a contact object with the routing manager which is also resident in the contact system 122.

The processing proceeds to step 1420, where the routing manager verifies the request from the IVR proxy. If the request cannot be verified, the processing proceeds to step 1425, where the IVR proxy is informed by the routing manager that the contact object request has been rejected. However, if the request is verified, the processing proceeds to step 1430 where the routing manager creates a contact object and returns the contact object to the IVR proxy.

The IVR proxy then assigns media skills to the contact in step 1435. For example, since the contact is an inbound IVR call, the ACD proxy would assign a contact skill to the contact indicating that it could be handled by any agent capable of handling inbound IVR calls. The processing then proceeds to step 1440, where the IVR is controlled to prompt the caller to collect the routing information. For example, the caller could be requested to enter numbers in response to questions so that the call could be identified as a request for service, an order, a billing question, and so on.

In step 1445, the IVR instructs the IVR proxy to assign routing skills to the contact. The IVR then instructs the IVR proxy in step 1450 to assign campaign skills to the contact, and in step 1455, instructs the IVR proxy to assign customer data to the contact, such as that entered in response to the prompts.

The IVR then notifies the IVR proxy in step 1460 to proceed with routing the caller. Accordingly, in step 1465, the IVR proxy instructs the routing manager to being the process of adding the contact to the queue, as described in detail below.

Figure 55:
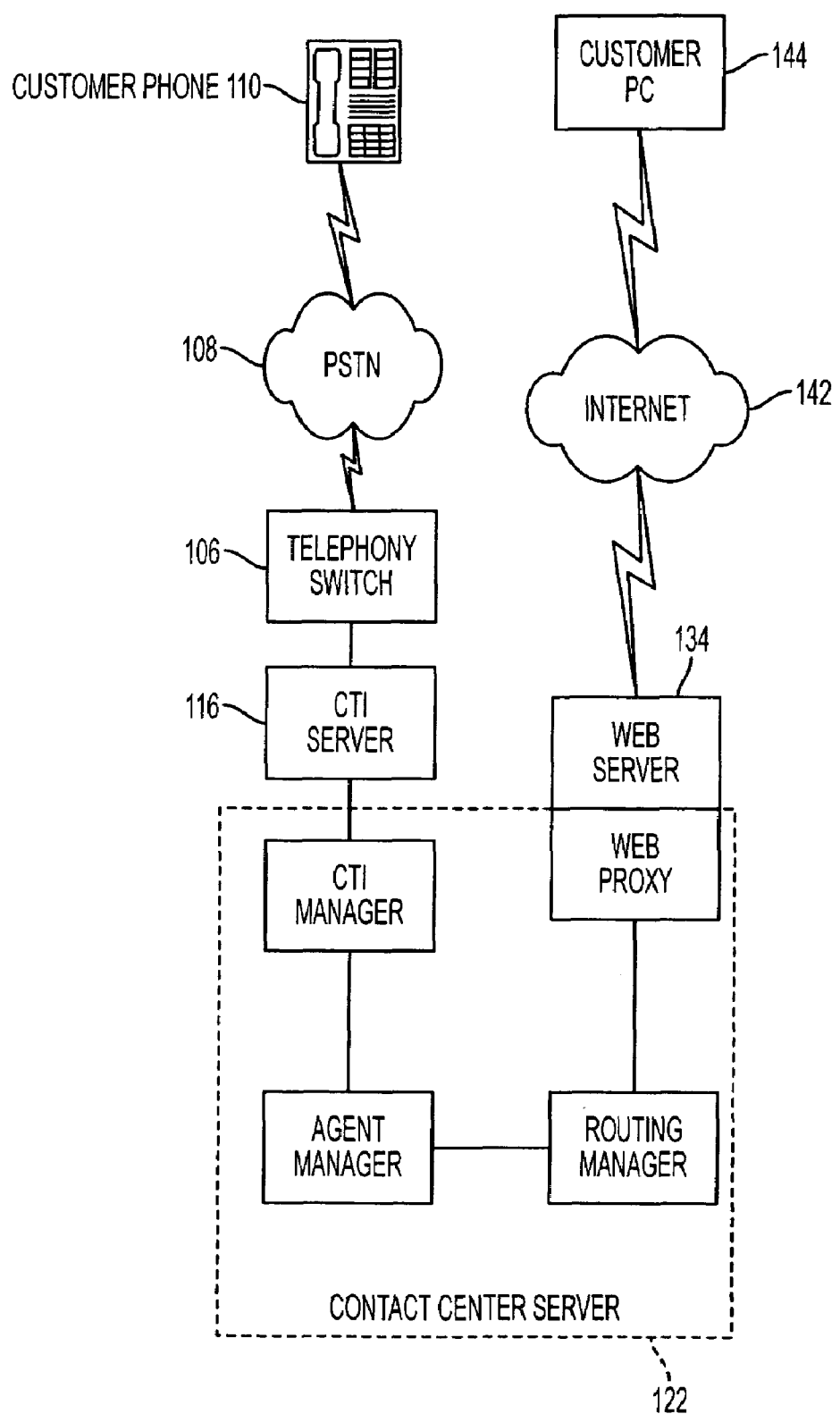
FIG. 55 is a conceptual block diagram illustrating components of the system shown in FIG. 1 involved in receiving web callback contact.
Figure 56:
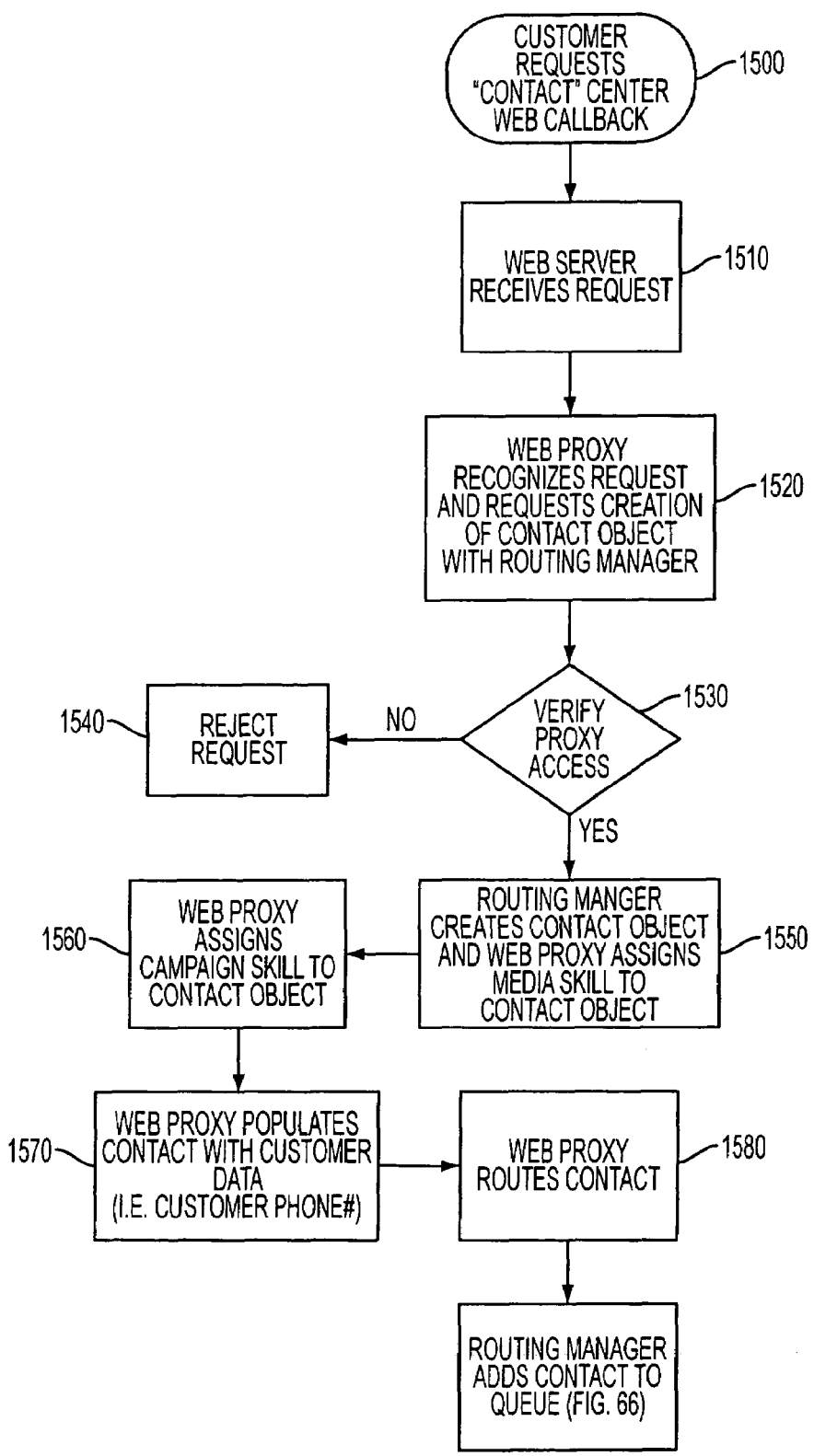
FIG. 56 is a flowchart illustrating an example of steps performed by the components shown in FIG. 55 for receiving a web callback contact.

As described above, unlike a traditional call center, the contact center system 100 is capable of receiving, queuing and routing a callback request that a customer can place via, for example, a web page of the company using the call center system 100. The components associated with the receipt, queuing and routing of a web callback request are shown in the diagram of FIG. 55, while FIG. 56 illustrates the steps performed by these components for receiving and placing the calls in the common queue.

As indicated in step 1500, a customer can place a callback request to the contact center via his or her workstation 144. The callback request is received by the web server 134 in step 1510. In step 1520, the web proxy the recognizes the receipt of the request, and then requests creation of a contact object with the routing manager which is also resident in the contact system 122.

The processing proceeds to step 1530, where the routing manager verifies the request from the proxy. If the request cannot be verified, the processing proceeds to step 1540, where the web proxy is informed by the routing manager that the contact object request has been rejected. However, if the request is verified, the processing proceeds to step 1550 where the routing manager creates the contact object, and the web proxy then assigns media skills to the contact object. For example, since the contact is a callback request, the web proxy would assign a contact skill to the contact indicating that it could be handled by any agent capable of handling web callback. The processing then proceeds to step 1560, where it assigns the contact to a campaign of the contact center system 100 that has been configured as described in detail in the "Configuring Call Center System" section above.

In step 1570, the web proxy then populates the contact with customer data, such as the customer telephone number. The web proxy then routes the contact to the routing manager in step 1580. The routing manager then begins the process of adding the contact to the common queue as described in detail below.

Figure 57:
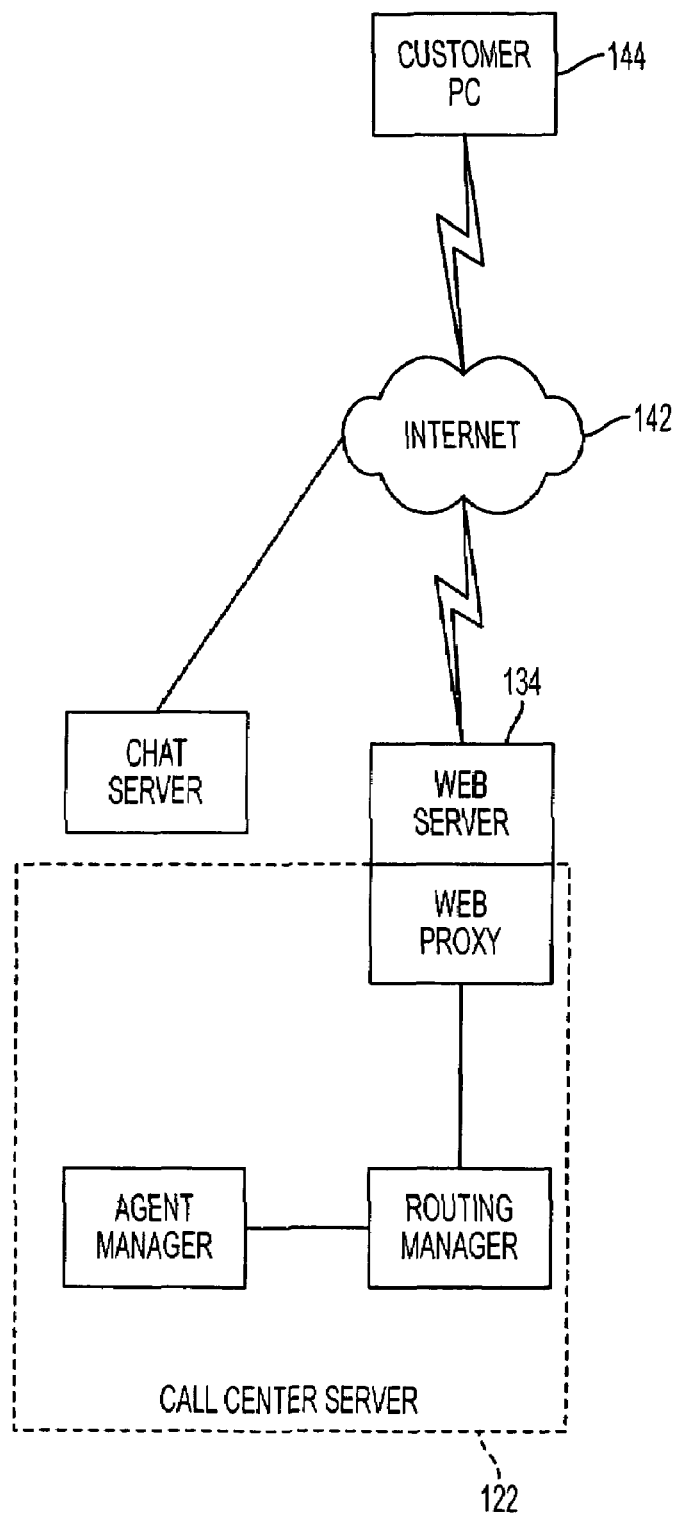
FIG. 57 is a conceptual block diagram illustrating components of the system shown in FIG. 1 involved in receiving a web chat contact.
Figure 58:
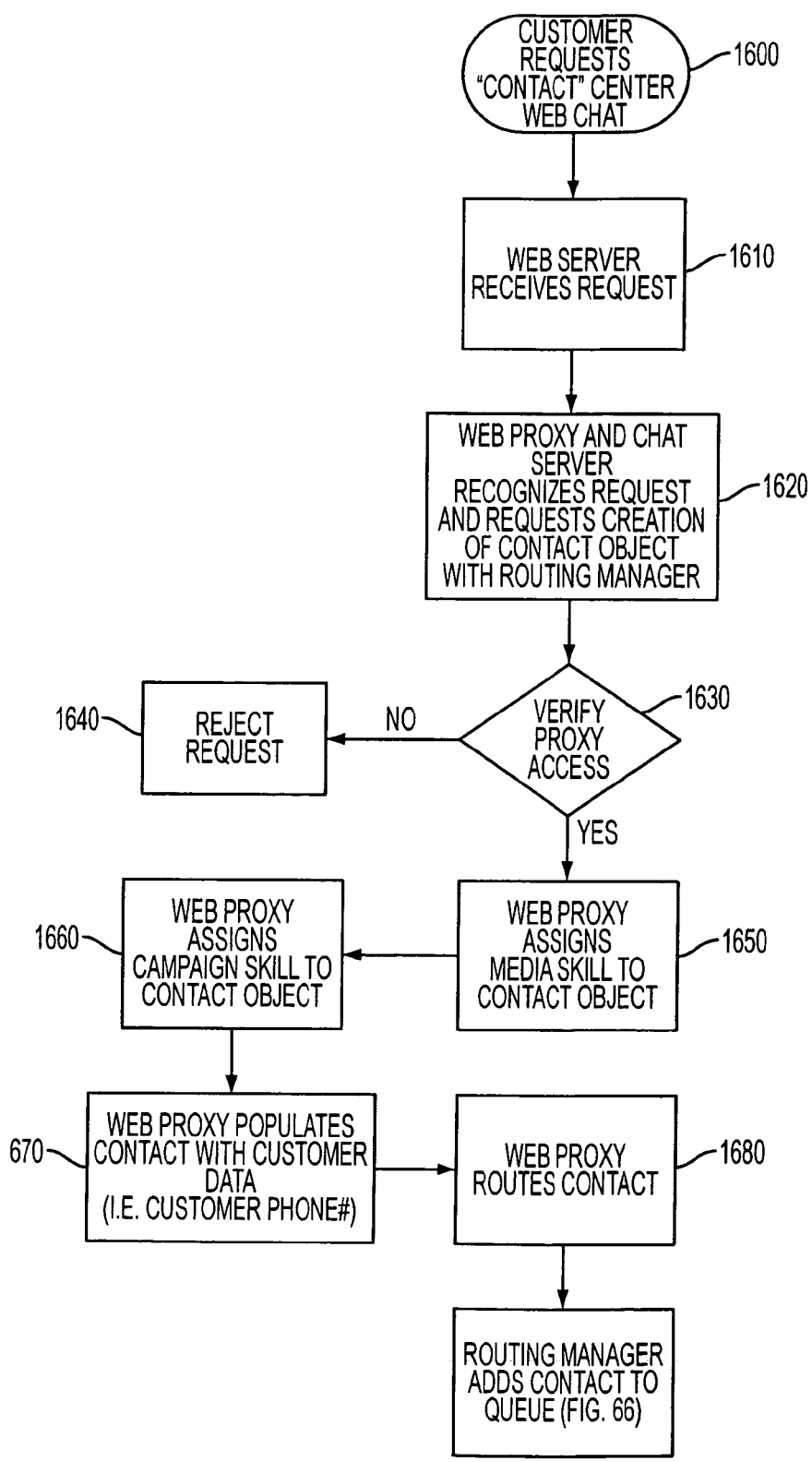
FIG. 58 is a flowchart illustrating steps performed by the components shown in FIG. 57 for receiving a web chat contact.

As discussed above, the contact center system 100 is also capable of receiving, queuing and routing a web chat request that a customer can place via, for example, a web page of the company using the call center system 100. The components associated with the receipt, queuing and routing of a web callback request are shown in the diagram of FIG. 57, while FIG. 58 illustrates the steps performed by these components for receiving and placing the calls in the common queue.

As indicated in step 1600, a customer can place a callback request to the contact center via his or her workstation 144. The callback request is received by the web server 134 in step 1610. In step 1620, the web proxy the recognizes the receipt of the request, and then requests creation of a contact object with the routing manager which is also resident in the contact system 122.

The processing proceeds to step 1630, where the routing manager verifies the request from the proxy. If the request cannot be verified, the processing proceeds to step 1640, where the web proxy is informed by the routing manager that the contact object request has been rejected. However, if the request is verified, the processing proceeds to step 1650 where the web proxy then creates the contact object and assigns media skills to the contact object. For example, since the contact is a web chat request, the web proxy would assign a contact skill to the contact indicating that it could be handled by any agent who is well versed in using the Internet. The processing then proceeds to step 1660, where it assigns the contact to a campaign of the contact center system 100 that has been configured as described in detail in the "Configuring Call Center System" section above.

In step 1670, the web proxy then populates the contact with customer data, such as the customer telephone number. The web proxy then routes the contact to the routing manager in step 1680. The routing manager then begins the process of adding the contact to the common queue as described in detail below.

Figure 59:
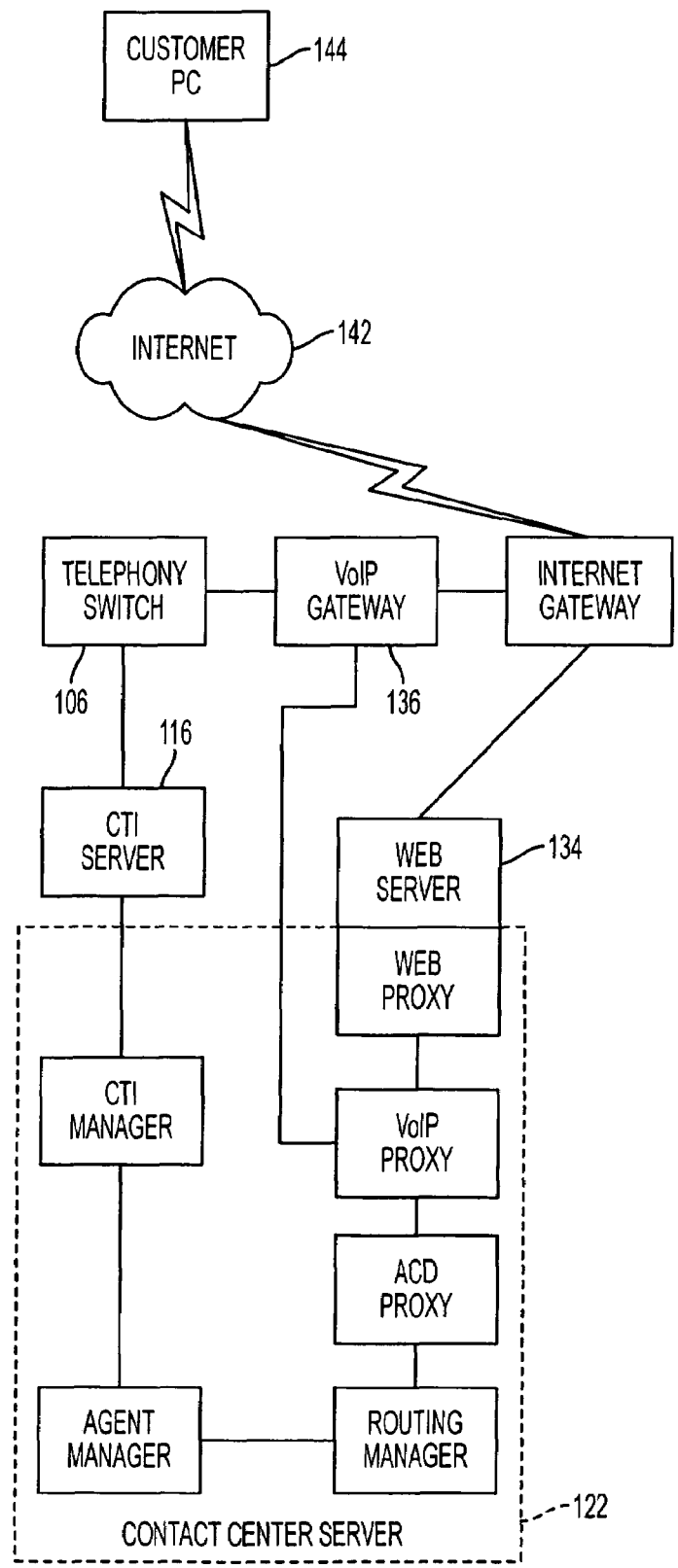
FIG. 59 is a conceptual block diagram of components of the system shown in FIG. 1 involved in receiving a VoIP contact.
Figure 60:
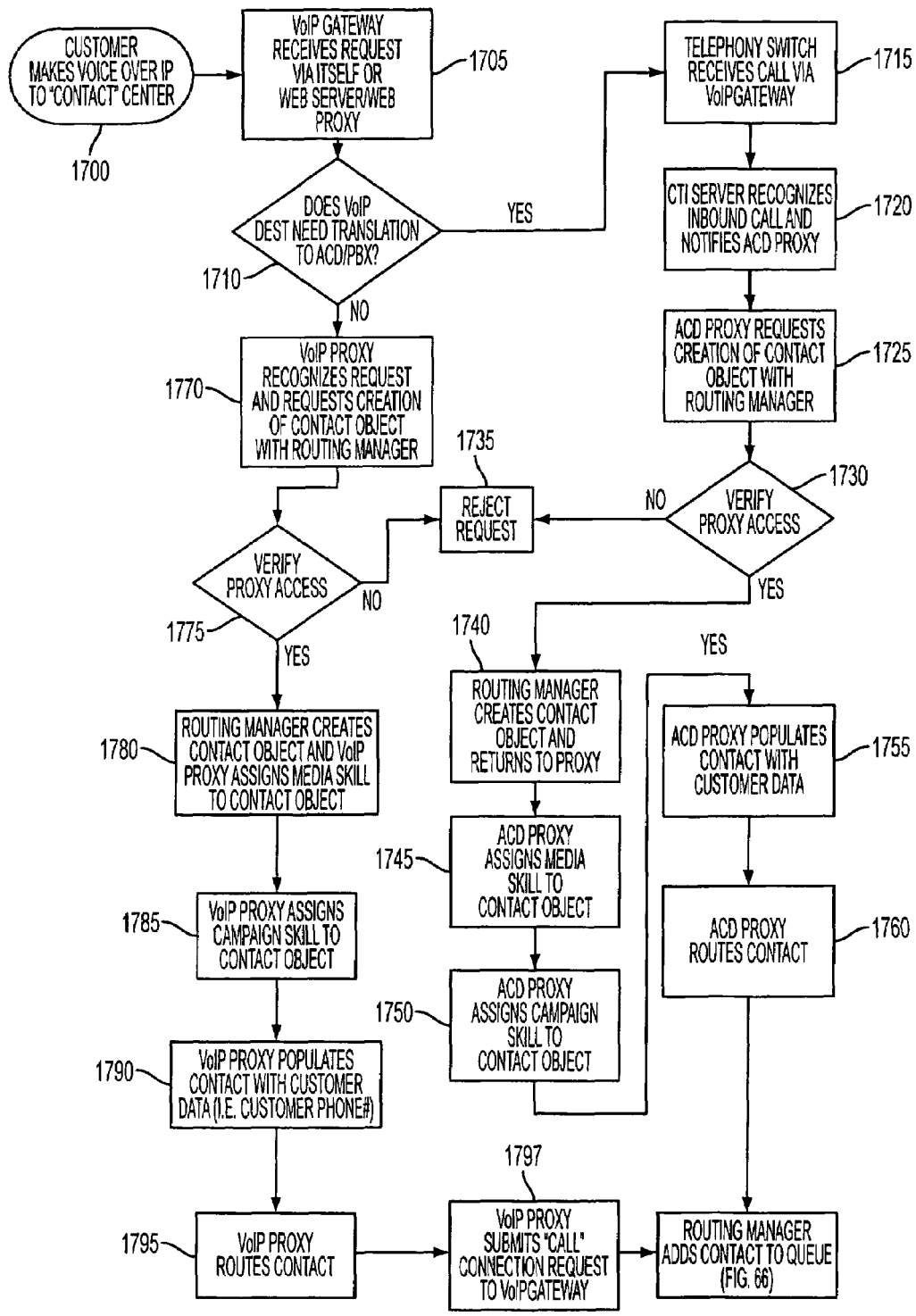
FIG. 60 is a flowchart illustrating steps performed by the components shown in FIG. 59 for receiving a VoIP contact.

The contact center system 100 is further capable of receiving, queuing and routing a voice over IP that a customer can place via his or her workstation 144. The components associated with the receipt, queuing and routing of a VoIP request are shown in the diagram of FIG. 59, while FIG. 60 illustrates the steps performed by these components for receiving and placing the calls in the common queue.

As indicated in step 1700, a customer can initiate a VoIP with the contact center via his or her workstation 144. The VoIP request is received via the VoIP gateway (server) 136 in step 1705 or the web server/web proxy as can be appreciated by one skilled in the art. In step 1710, the processing determines whether the VoIP destination needs translation to ACD/PBX. If so, the processing proceeds to step 1715 where the telephony switch 106 receives the call via the VoIP gateway 136.

The processing then proceeds to step 1720 where the CTI server 116 recognizes the inbound call and notifies the ACD proxy. In step 1725, the ACD proxy requests creation of a contact object with the routing manager which is also resident in the contact system 122. The processing proceeds to step 1730, where the routing manager verifies the request from the proxy. If the request cannot be verified, the processing proceeds to step 1735, where the web proxy is informed by the routing manager that the contact object request has been rejected.

However, if the request is verified, the processing proceeds to step 1740 where the routing manager creates a contact object, and then to step 1745 where the ACD proxy then assigns media skills to the contact object. For example, since the contact is a VoIP, the ACD proxy would assign a contact skill to the contact indicating that it could be handled by any agent who is well versed in using the Internet. The processing then proceeds to step 1750, where the ACD proxy assigns the contact to a campaign of the contact center system 100 that has been configured as described in detail in the "Configuring Call Center System" section above.

In step 1755, the ACD proxy then populates the contact with customer data, such as the customer telephone number. The ACD proxy then routes the contact to the routing manager in step 1760. The routing manager then begins the process of adding the contact to the common queue as described in detail below.

Alternatively, if it is determined in step 1710 that the VoIP does not need translation to ACD/PBX, the processing then proceeds to step 1770 where the VoIP proxy requests creation of a contact object with the routing manager which is also resident in the contact system 122. The processing proceeds to step 1775, where the routing manager verifies the request from the proxy. If the request cannot be verified, the processing proceeds to step 1735, where the web proxy is informed by the routing manager that the contact object request has been rejected.

However, if the request is verified, the processing proceeds to step 1780 where the routing manager creates a contact object, and then the VoIP proxy then assigns media skills to the contact object. For example, since the contact is a VoIP, the VoIP proxy would assign a contact skill to the contact indicating that it could be handled by any agent who is well versed in using the Internet. The processing then proceeds to step 1785, where the VoIP proxy assigns the contact to a campaign of the contact center system 100 that has been configured as described in detail in the "Configuring Call Center System" section above.

In step 1790, the VoIP proxy then populates the contact with customer data, such as the customer telephone number. The VoIP proxy then routes the contact to the routing manager in step 1795. Also, in step 1797, the VoIP proxy submits a call connection request to the VoIP gateway 136. The routing manager then begins the process of adding the contact to the common queue as described in detail below.

Figure 61:
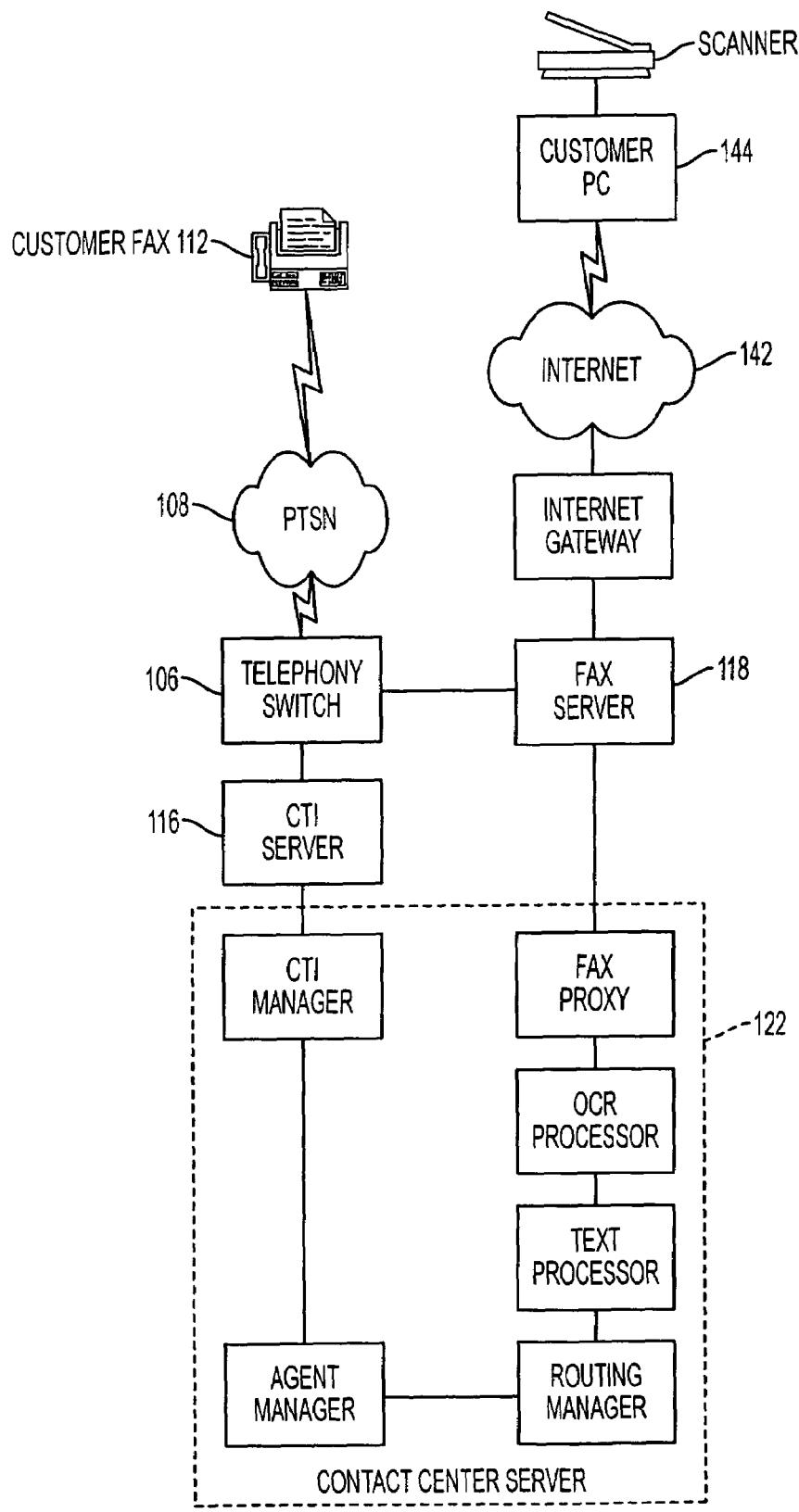
FIG. 61 is a conceptual block diagram illustrating components of the system shown in FIG. 1 involved in receiving a facsimile contact.
Figure 62:
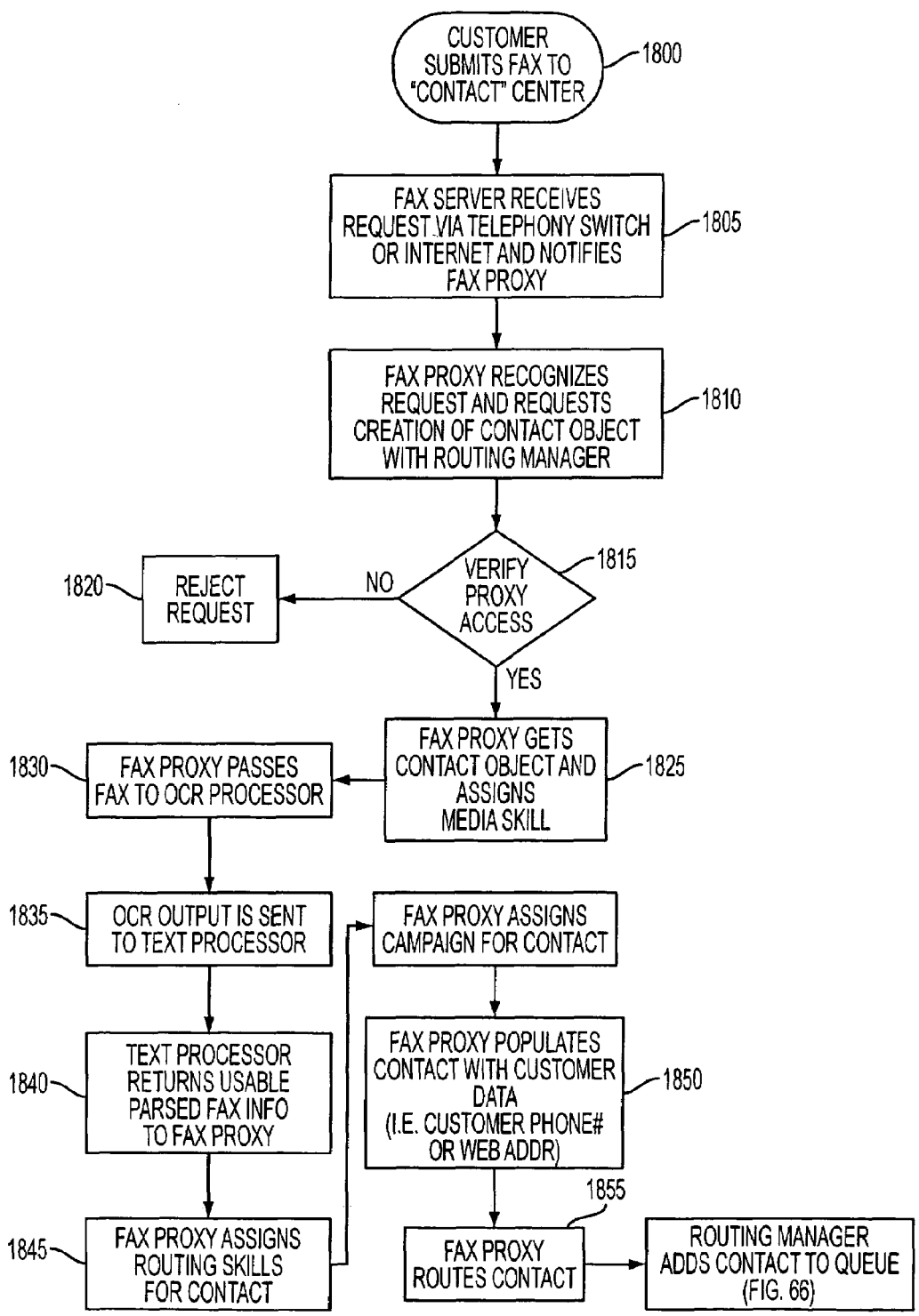
FIG. 62 is a flowchart illustrating an example of steps performed by the components in FIG. 61 for receiving a facsimile contact.

The contact center system 100 is further capable of handling facsimiles. The components associated with the receipt, queuing and routing of facsimiles are shown in the conceptual diagram of FIG. 61, while FIG. 62 illustrates the steps performed by these components for receiving and placing the calls in the common queue.

As indicated in step 1800, a customer can send a facsimile to the contact center over the PSTN 108 via his or her customer facsimile 112, or over the Internet 142 via his or her workstation 144. In step 1805, the FAX server 118 receives the facsimile via the telephony switch 106 or via the Internet gateway, depending on how the facsimile was sent, recognizes the receipt of the incoming facsimile, and notifies the FAX proxy of the contact system server 122. In step 1810, the FAX proxy then requests creation of a contact object with the routing manager which is also resident in the contact system 122.

The processing proceeds to step 1815, where the routing manager verifies the request from the FAX proxy. If the request cannot be verified, the processing proceeds to step 1820, where the FAX proxy is informed by the routing manager that the contact object request has been rejected. However, if the request is verified, the processing proceeds to step 1825 where the routing manager creates a contact object and returns the contact object to the FAX proxy, which then assigns media skills to the contact object. For example, since the contact is an inbound facsimile, the FAX proxy would assign a contact skill to the contact indicating that it could be handled by any agent capable of responding to the facsimile.

The processing then proceeds to step 1830, where the FAX proxy passes the received facsimile to the OCR processor, which is an optical character recognition processor that is set to recognize words or strings of words in text. In step 1835, the OCR sends the output of the processing to the text processor, which returns usable parsed facsimile info to the FAX proxy in step 1840. In step 1845, the FAX proxy assigns routing skills to the contact. In step 1850, the FAX proxy assigns campaign skills to the contact, and in step 1855, proceeds with routing the contact by instructing the routing manager to begin the process of adding the contact to the queue, as described in detail below.

Figure 63:
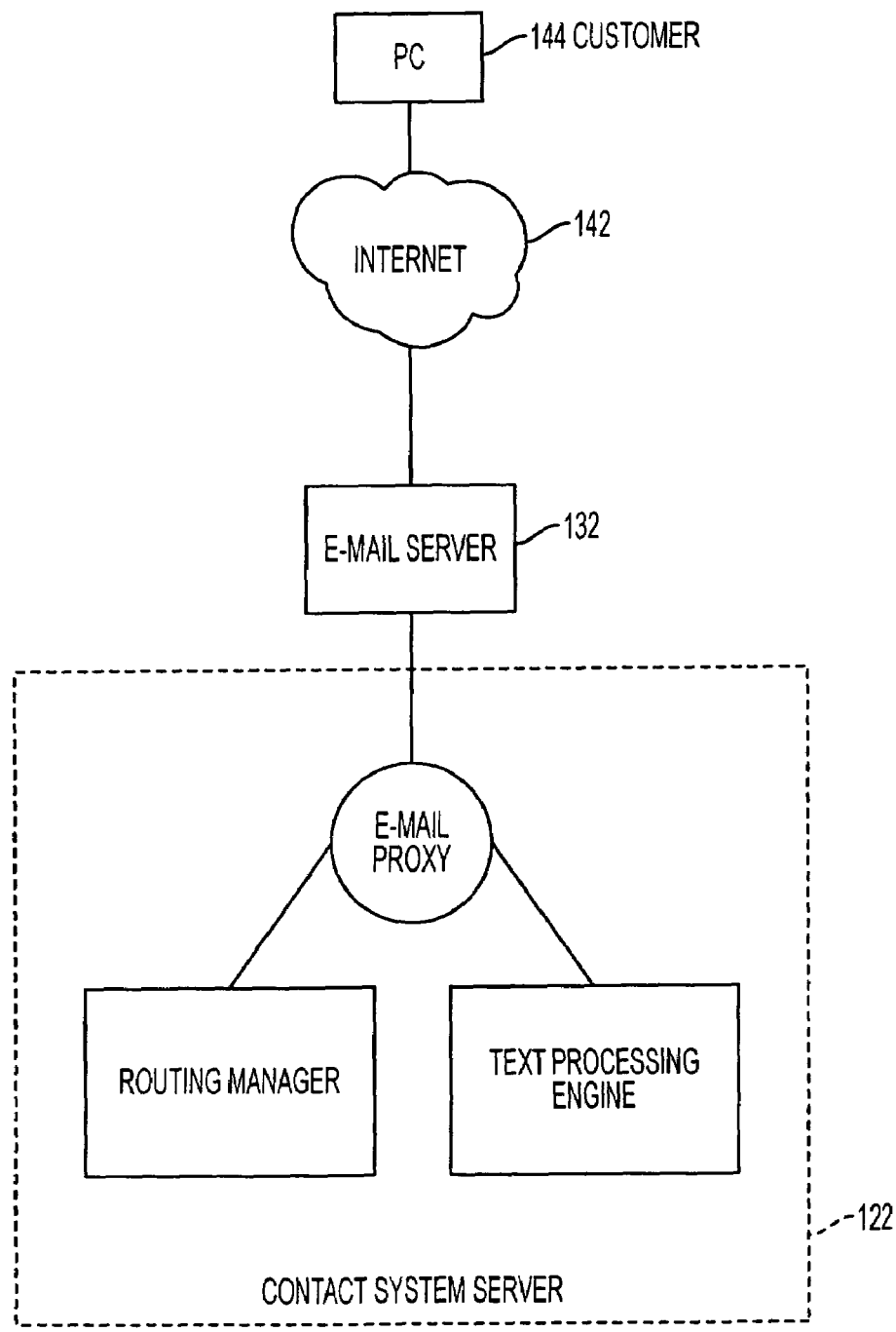
FIG. 63 is a conceptual diagram showing components of the system shown in FIG. 1 involved in receiving an e-mail contact.
Figure 64:
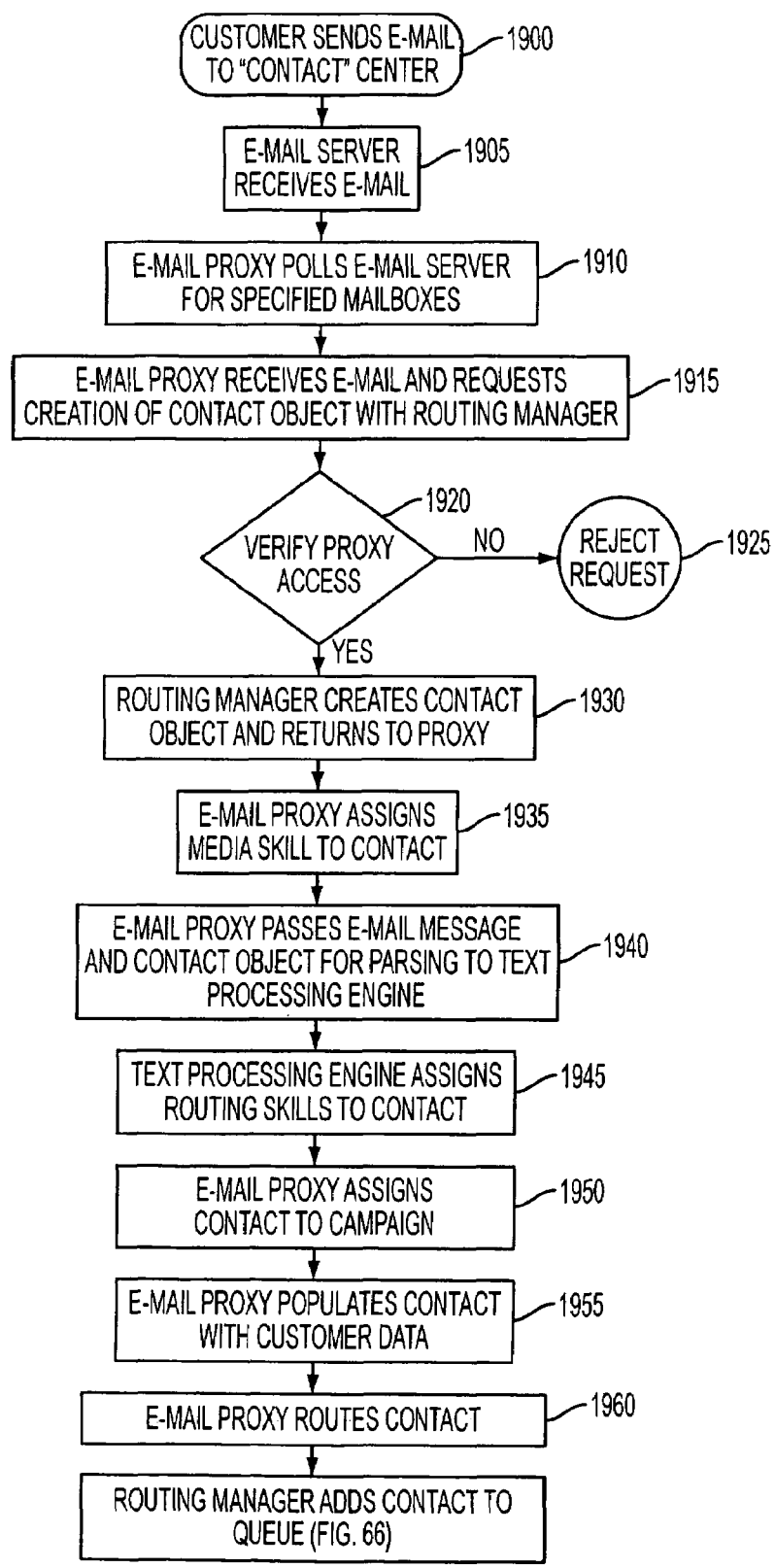
FIG. 64 is a flowchart showing steps performed by the components in FIG. 63 for receiving an e-mail contact.

As discussed above, the contact center system 100 is also capable of handling e-mails. The components associated with the receipt, queuing and routing of e-mails are shown in the conceptual diagram of FIG. 63, while FIG. 64 illustrates the steps performed by these components for receiving and placing the calls in the common queue.

As indicated in step 1900, a customer can send an e-mail to the contact center over the Internet 142 via his or her workstation 144. In step 1905, the e-mail server 132 receives the e-mail via the Internet gateway, recognizes the receipt of the incoming e-mail, and notifies the e-mail proxy of the contact center server 122. As can be appreciated by one skilled in the art, in step 1910, the e-mail proxy polls the e-mail server for specified mailboxes, and in step 1915, the e-mail proxy then requests creation of a contact object with the routing manager which is also resident in the contact center server 122.

The processing proceeds to step 1920, where the routing manager verifies the request from the e-mail proxy. If the request cannot be verified, the processing proceeds to step 1925, where the e-mail proxy is informed by the routing manager that the contact object request has been rejected. However, if the request is verified, the processing proceeds to step 1930 where the routing manager creates a contact object and returns the contact object to the e-mail proxy. In step 1935, the e-mail proxy then assigns media skills to the contact object. For example, since the contact is an inbound e-mail, the e-mail proxy would assign a contact skill to the contact indicating that it could be handled by any agent capable of responding to the e-mail.

The processing then proceeds to step 1940, when the e-mail proxy passes the e-mail message and contact object for parsing to the text processing engine, which assigns routing skills to the contact in step 1945. In step 1950, the e-mail proxy assigns the contact to a campaign, and in step 1955, populates the contact with customer data. In step 1960, the e-mail proxy proceeds with routing the contact by instructing the routing manager to begin the process of adding the contact to the queue, as described in detail below.

Figure 65:
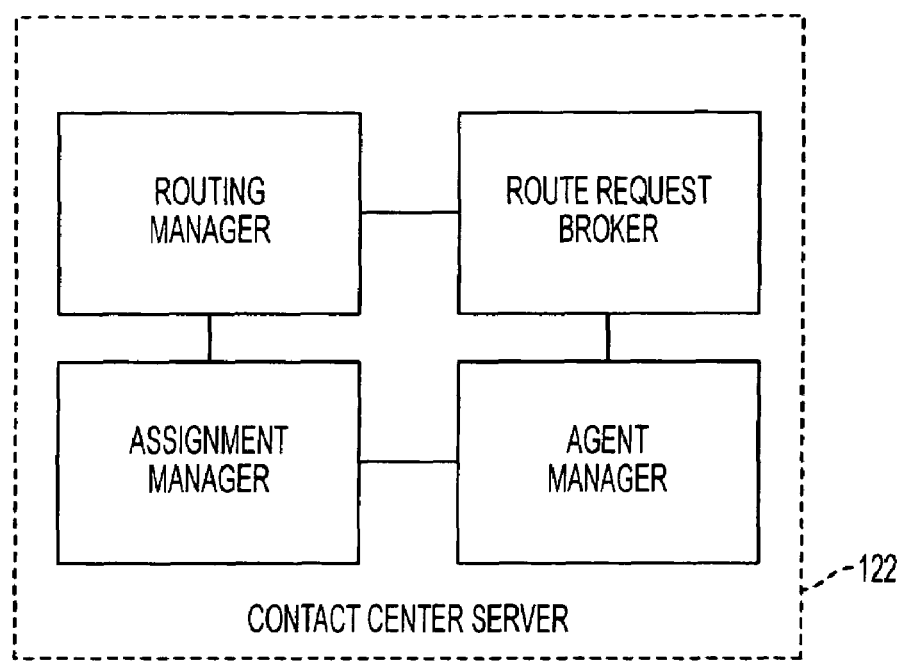
FIG. 65 is a conceptual block diagram showing components of the system shown in FIG. 1 for routing received contacts to a common queue.
Figure 66:
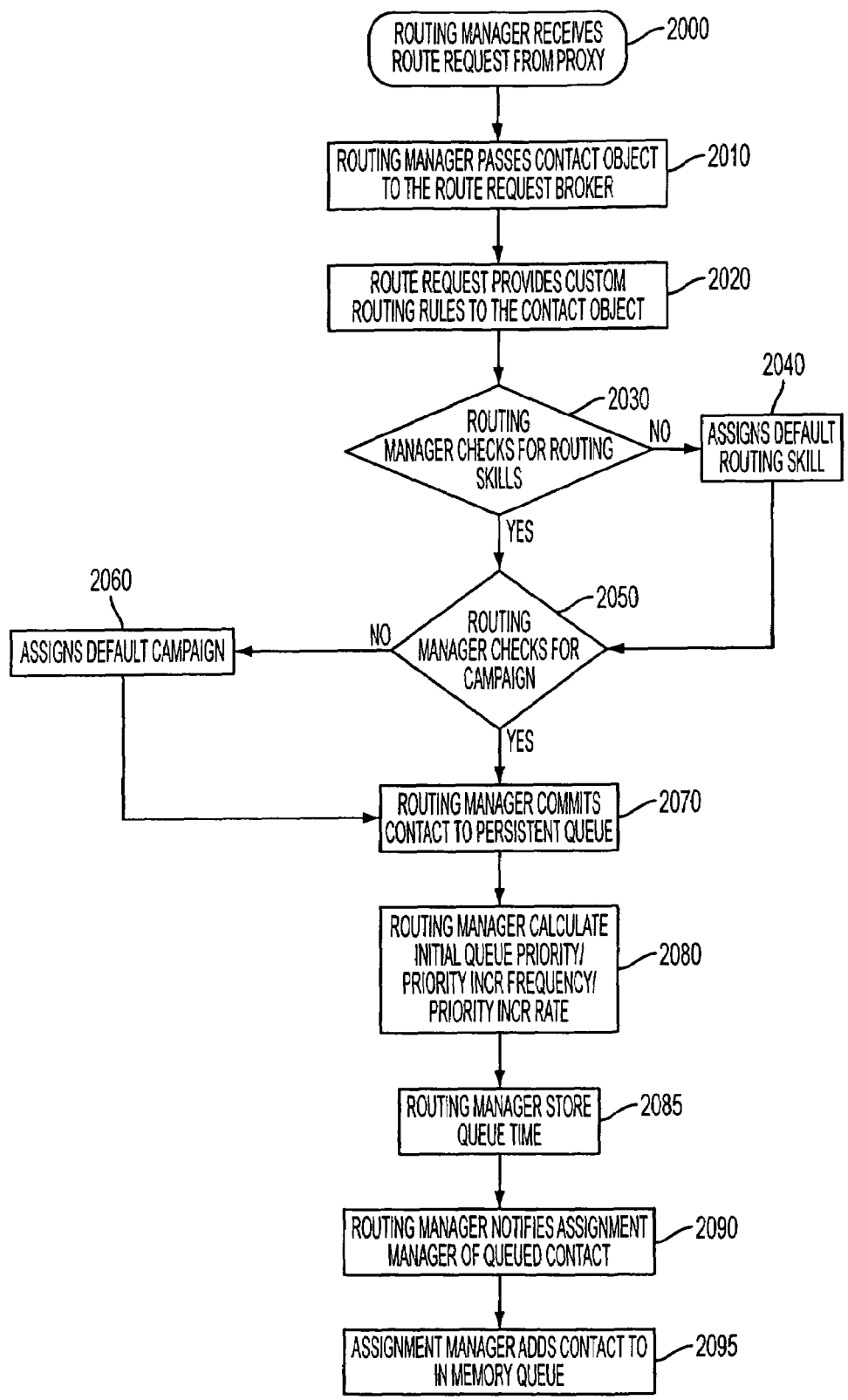
FIG. 66 is a flowchart illustrating steps performed by the components shown in FIG. 65 for routing the receipt contacts to a queue.

FIG. 65 shows components of the contact center server 122, namely, the routing manager, route request broker, assignment manager, and agent manager, that are involved in placing a contact in the queue as will now be described, and FIG. 66 is a flowchart illustrating the process. It is noted that this process it identical for all media types of contacts that were created in the manner described above.

As shown in step 2000, the routing manager receives a route request from any of the proxies discussed above, and passes the contact object to the route request broker in step 2010. In step 2020, the route request broker provides custom routing rules to the contact object, and in step 2030, the routing manager checks the contact object for routing skills.

If the routing manager determines that the contact object does not include routing skills, the processing proceeds to step 2040 where the routing manager assigns default routing skills. The processing then proceeds to step 2050 where the routing manager checks the contact object for the campaign to which it was assigned. However, if the routing manager determines in step 2040 that the contact object has routing skills, the processing proceeds directly to step 2050 as shown.

If the routing manager determines in step 2050 that the contact object has not been assigned to a campaign, the processing proceeds to step 2060 where the routing manager assigns the contact object to a default campaign. The processing then proceeds to step 2070, where the routing manager commits the contact to a persistent queue. However, if the routing manager determines in step 2050 that the contact object has been assigned to a campaign, the processing proceeds directly to step 2070 as shown.

The processing then proceeds to step 2080 where the routing manager calculates the initial queue priority, priority incremental frequency and priority incremental rates for the contact. In step 2085, the routing manager stores the queue time at which the contact was committed to the queue, and in step 2090, notifies the assignment manager of the queued contact. In step 2095, the assignment manager adds the contact to the "in memory" queue.

Figure 67:
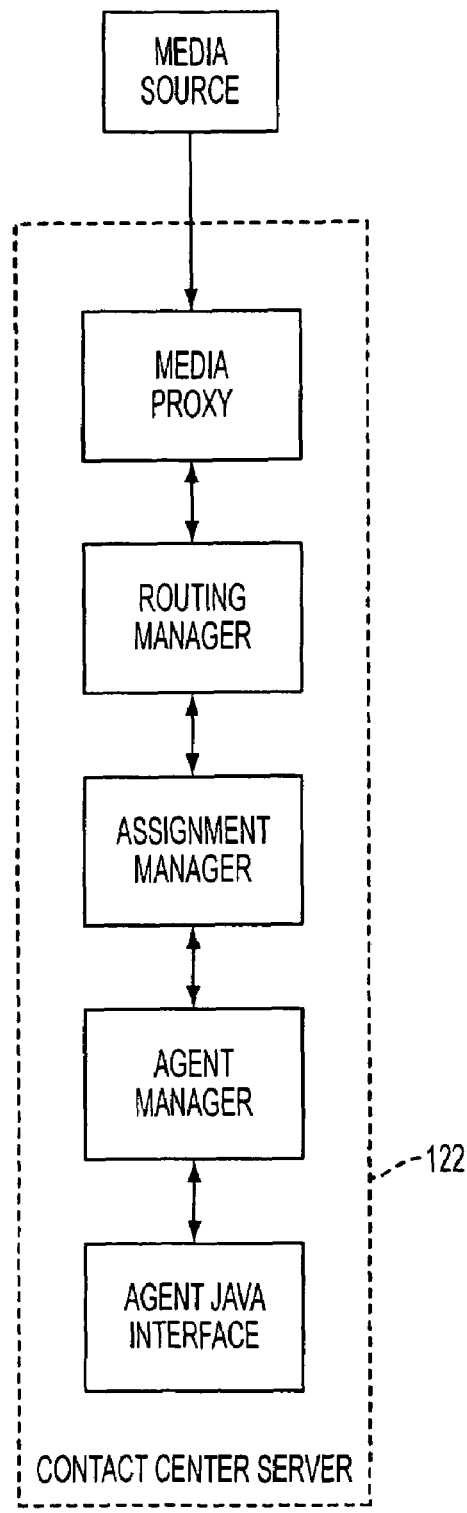
FIG. 67 is a conceptual block diagram illustrating components of the system shown in FIG. 1 involved in routing contacts from the queue to appropriate agents.
Figure 68:
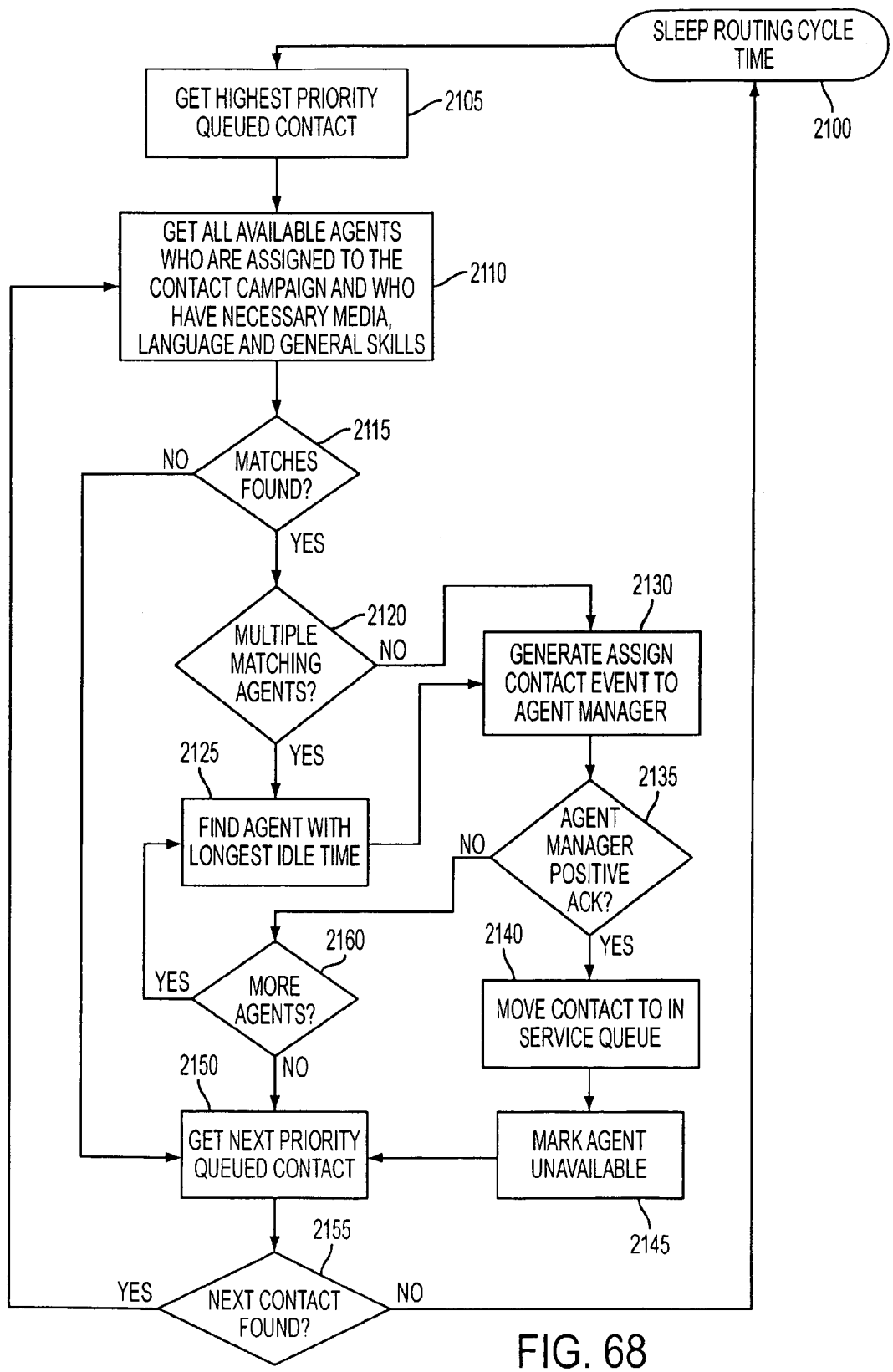
FIG. 68 is a flowchart illustrating an example to steps performed by the components shown in FIG. 67 for routing contacts to the appropriate agents.
Figure 69:
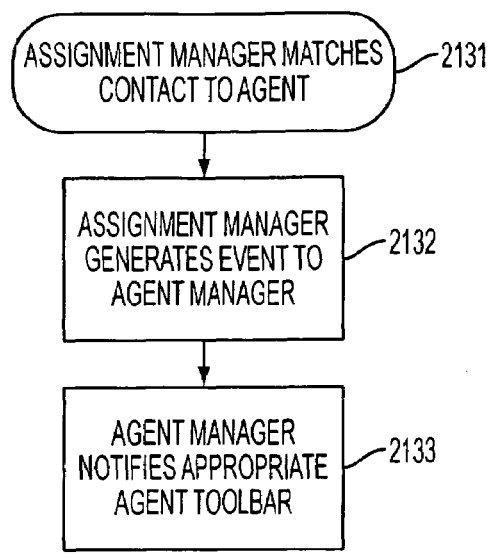
FIG. 69 is a flowchart illustrating further steps performed by the components shown in FIG. 67 for routing contacts to appropriate agents.
Figure 70:
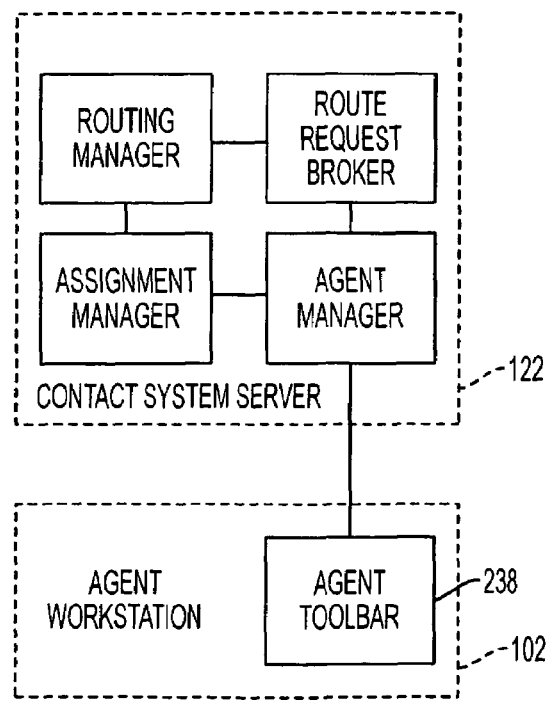
FIG. 70 is a conceptual block diagram illustrating an example of the manner in which components of the system shown in FIG. 67 route contacts to an agent workstation.

The manner in which queued contacts are handled in the queue will now be described with reference to FIGS. 67 through 71. FIG. 67 is a conceptual block diagram illustrating components of the contact center server 122, namely, the media proxy, routing manager, assignment manager, agent manager, and agent Java interface involved in routing a queued contact to an agent. FIG. 68 is a flowchart illustrating exemplary steps performed by these components in routing the queued contacts.

Step 2100 indicates that the routing manager will periodically discontinue the routing process to, for example, reprioritize the contacts in the queue as described in detail below. However, except for the periodic time-out that occurs in step 2100, the routing manager continuously performs the routing cycle to continuously route the queue contacts out of the queue and to the appropriate agents.

As shown in step 2105, the assignment manager identifies the highest priority queued contact. For example, a normal or IVR call that has been queued will generally have a higher priority than, for example, an e-mail or fax contact, because it is preferable not to keep a live caller on hold for an extended period of time. Also, a particular type of call, such as a customer order, may receive priority over a call relating to a general service question, and so on.

The assignment manager interacts with the agent manager in step 2110 to identify the logged on agents who are capable of handling the highest priority contact. The processing proceeds to step 2115, where it is determined whether any agents capable of handling the contact are available. If a suitable agent is available, the processing proceeds to step 2120. If it is determined in step 2120 that multiple suitable agents are available, the processing proceeds to step 2125, where the suitable agent with the longest idle time is identified, and the processing proceeds to step 2130. However, if only one suitable agent is identified, the processing proceeds directly to step 2130.

In step 2130, the contact is assigned to the agent manager which generates an "assign contact" event to the agent manager, to match the contact to a suitable agent. This process is shown in more detail with regard to FIGS. 69 and 70. Specifically, in step 2131, the assignment manager matches a contact to an agent, and in step 2132 generates the assign contact event to the agent manager. If the agent manager finds a match, the agent manager notifies the toolbar of the appropriate agent as shown conceptually in FIG. 70 and discussed in more detail below. In step 2135 (FIG. 68), the contact is then moved into the service queue in step 2140 to await actual routing to the agent, and the status of that agent is updated in step 2145 as unavailable.

The processing then proceeds to step 2150 where the next priority contact is identified. If such a contact is present in the queue as determined in step 2155, the processing returns to step 2110 and repeats. However, if no contact is located, the processing process to step 2100 and repeats.

Alternatively, if in step 2155 discussed above, no agents having the required skills are found to match the highest priority contact, the processing proceeds directly to step 2150 where the next priority contact is identified. If such a contact is present in the queue as determined in step 2155, the processing returns to step 2110 and repeats. However, if no contact is located, the processing process to step 2100 and repeats.

Also, if in step 2135 discussed above the agent manager cannot match the contact for routing to a suitable agent, the processing proceeds to step 2160 to determine whether another available suitable agent exists. If so, the processing returns to step 2125 and continues as described above. However, if no other suitable agent exists, the processing proceeds to step 2150 and continues in the manner described above.

As discussed above, at any time that the routing processing is at the "sleep routing cycle time" step 2100, the assignment manager can recalculate the priorities of the contacts in the queues. For example, if a certain contact has been in the queue for a long period, its priority could be increased.

Figure 71:
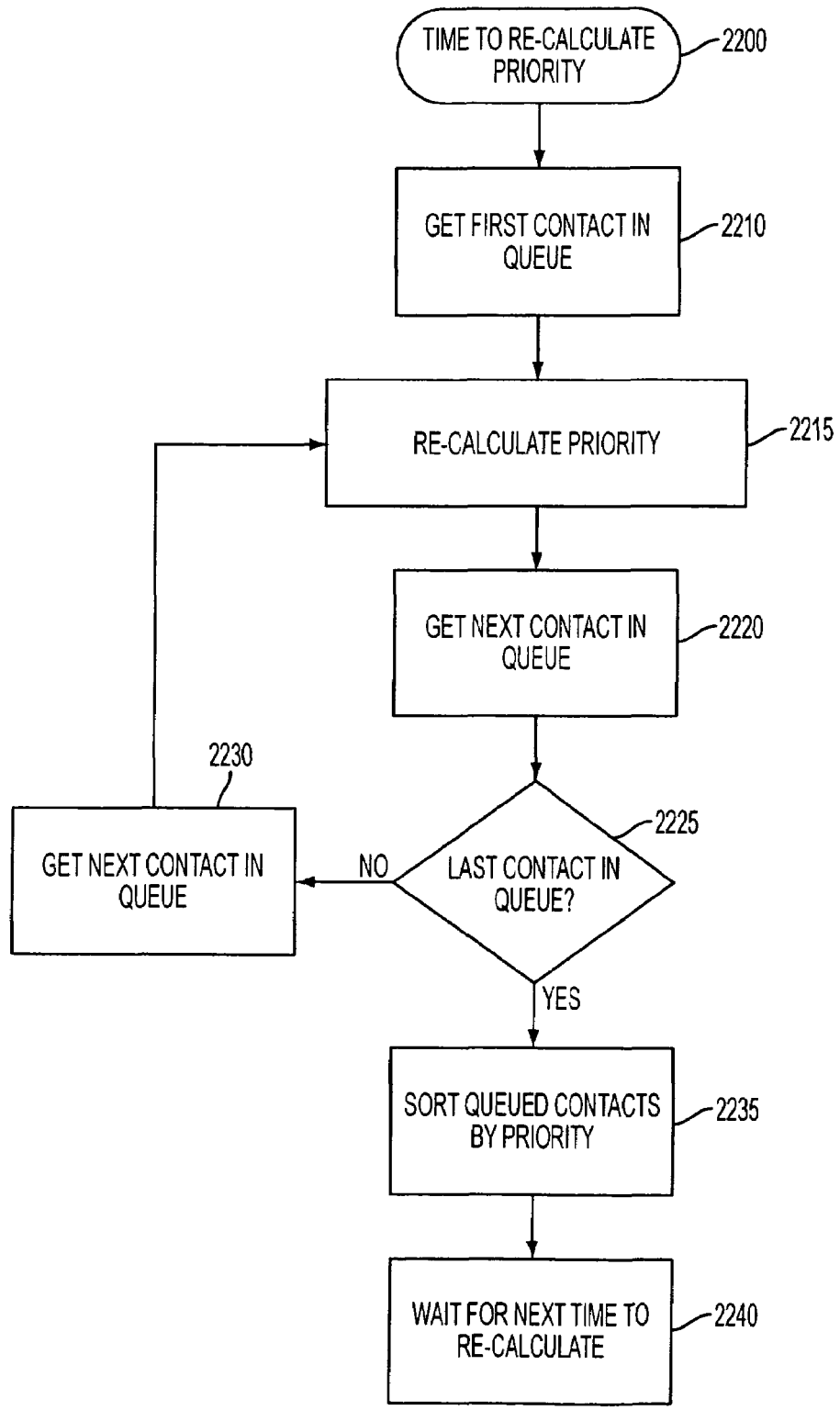
FIG. 71 is a flowchart illustrating steps performed by the components shown in FIG. 67 for reprioritizing the contacts maintained in the common queue.

Accordingly, as shown in step 2200 of the flowchart in FIG. 71, if the priority of the contacts in the queue is to be recalculated, the first contact in the queue is located in step 2210, and its priority is recalculated in step 2215. The next contact in the queue is then located in step 2220. If it is determined in step 2225 that the last contact in the queue has not been reached, then the processing proceeds to step 2230 where that next contact is obtained. The processing returns to step 2215 where the priority of that next contact is recalculated, and the processing continues as discussed above until the last contact has be reprioritized.

However, once the last contact has been reprioritized, the processing proceeds to step 2235 where the contacts are resorted in the queue according to their new priority. The processing then waits for the next time to recalculate priority, which could be when the routing processing again returns to step 2100.

The processes that occur when the respective different types of media contacts are handled by the agents to which they have been routed will now be described. As can be appreciated by one skilled in the art, the contact receiving, queuing and routing processes discussed above, along with the following contact handling processes, can be performed simultaneously by the contact center system 100.

Handling of Routed Contacts By Agents

An example of the manner in which an agent can receive and handle a normal non-IVR voice contact will now be described with reference to FIGS. 72–78. Although this description will primarily make reference to the local agent workstation 102 and telephone 104, the operations performed by a remote agent at his or her workstation 146 and telephone 150 are essentially identical.

Figure 72:
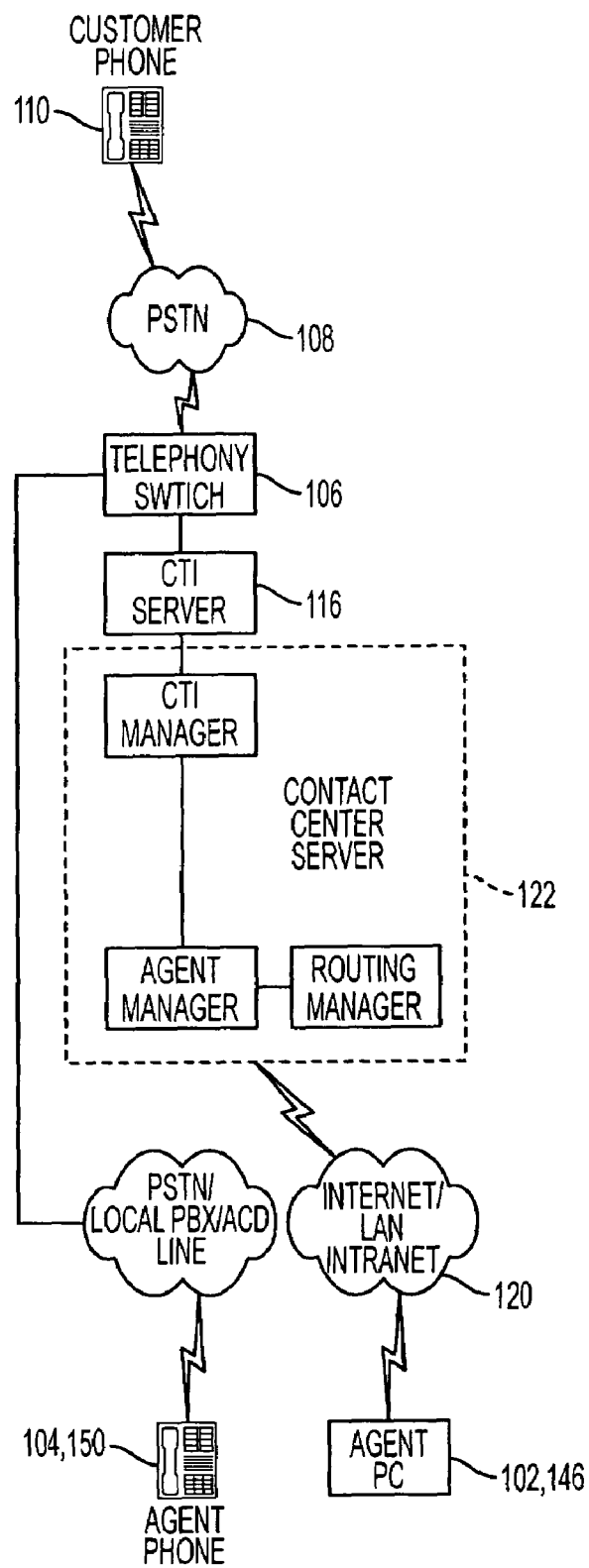
FIG. 72 is a conceptual block diagram illustrating components of the system shown in FIG. 1 involved when agent handles a non-IVR contact.
Figure 73:
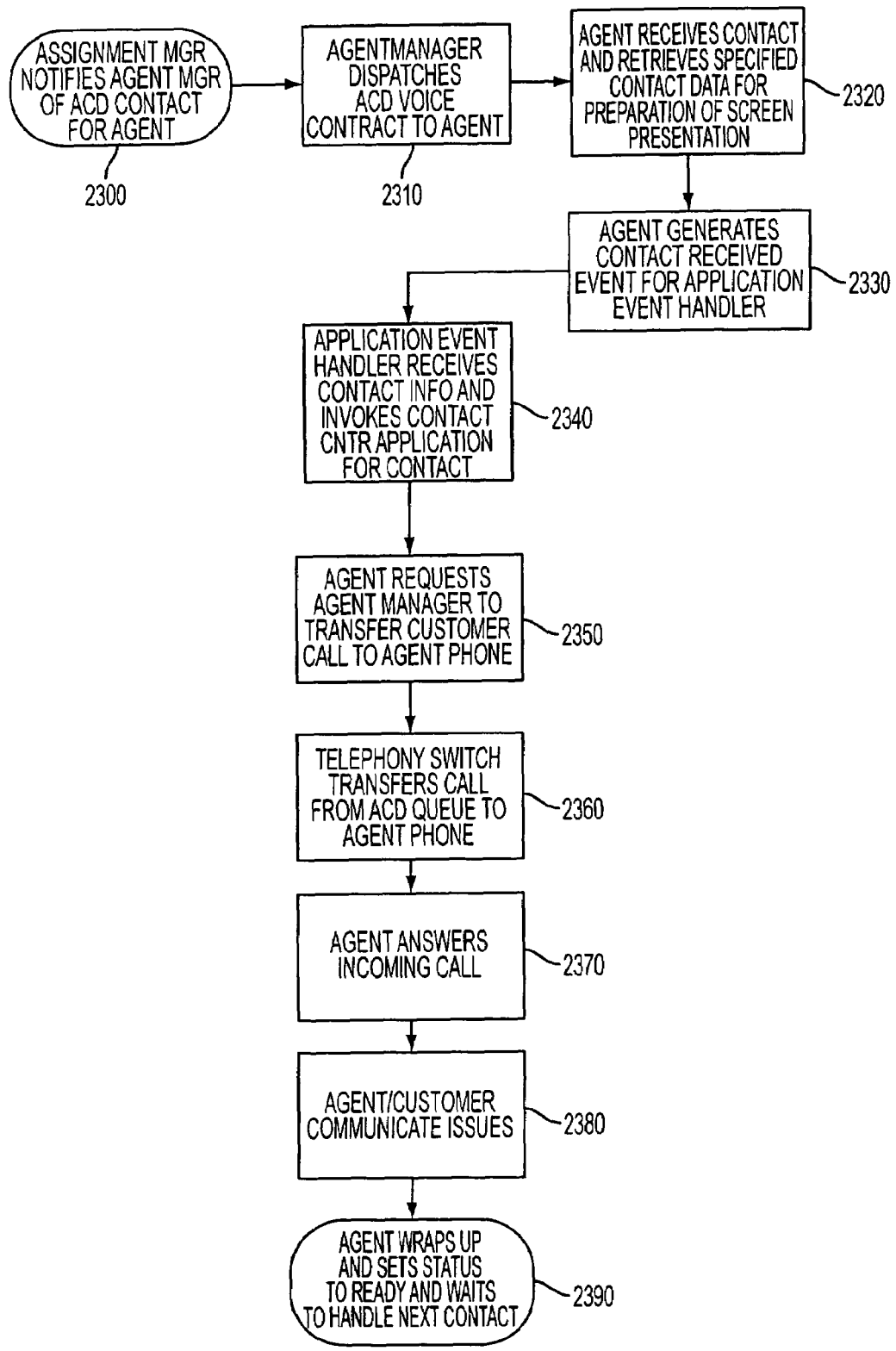
FIG. 73 is flowchart illustrating an example of steps performed by the components shown in FIG. 72 when an agent handles a non-IVR contact.

FIG. 72 is a conceptual block diagram illustrating components of the call center system 100 involved in an agent's handling of a non-IVR voice contact, and FIG. 73 is a flowchart showing exemplary steps performed in handling the contact. When the assignment manager notifies the agent manager of a non-IVR voice contact for the agent in step 2300, the agent manager dispatches the contact to the agent in step 2310. In step 2320, the agent receives the contact and retrieves specified contact data for preparation of a screen presentation on his or her workstation. This data can be retrieved, for example, from the customer database 128 and/or the customer legacy system 130. Further details of the types of customer information that can be retrieved are described in U.S. patent application Ser. No. 09/260,549, referenced above.

The agent workstation 102 then generates a "contact received" event for the application event handler in step 2330, and the application event handler receives contact information and invokes the contact center application for the contact in step 2340. The agent workstation then requests the agent manager to transfer the non-IVR voice contact (hereinafter a "call") to the agent telephone 104 in step 2350. Accordingly, the telephony switch 106 transfers the call from the ACD queue to the agent's telephone in step 2360 as can be appreciated by one skilled in the art.

The agent can then answer the call in step 2370 in several ways. For example, the agent can simply lift the receiver of his or her telephone 104 and answer the call in a traditional manner. Alternatively, the agent can use the virtual phone capabilities of his or her workstation 102 as will now be described.

Figure 74:
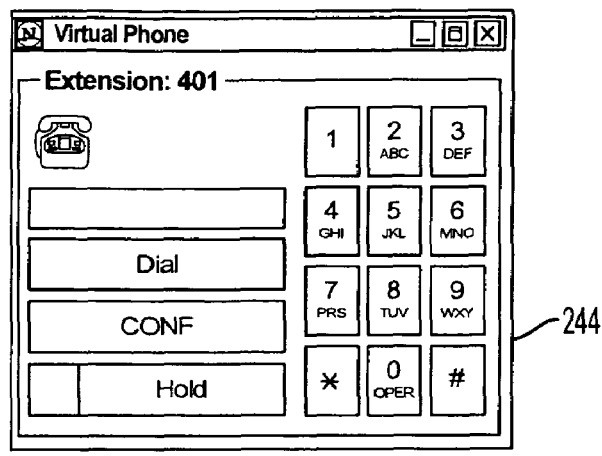
FIG. 74 illustrates an example of a virtual phone window that can be displayed on a display screen of an agent's workstation.

As shown in FIGS. 46 and 48, the agent toolbar 238 includes a virtual phone icon 238-2 which enables an agent to open the virtual phone display 244 on the agent's workstation 102 as shown in FIG. 74. The virtual phone makes it easier for an agent to handle telephone calls by allowing the agent to perform telephone functions from the computer. This tool includes all the functions normally associated with a telephone, and the agent can use the virtual phone to do any of the following: answer a call, dial a call, hang up when a call is complete, hold and retrieve a call, and make a conference call. Further details of the functionality of the virtual phone are described in U.S. patent Ser. No. 09/260,549, referenced above.

Figure 75:
FIG. 75 is an example of an icon indicating that the agent's phone is ringing.

When a telephone call is routed to the agent, the handset on the virtual phone icon 238-2 will begin to bounce back and forth as shown in FIG. 75, to indicate that the phone is "ringing". This action occurs both on the toolbar icon and on the icon inside the open Virtual Phone and corresponds to what is taking place on the agent's real telephone. When the agent hears his or her real telephone 104 ringing, the icon on the virtual phone will also be "ringing."

Figure 76:
FIG. 76 is an example of an icon indicating that the agent's phone is off hook.

When the agent physically pick ups the handset on his or her real phone 104 or hangs it up, the icon on the virtual phone will mimic these same actions. For contact center purposes, however, it is easier and more practical to use the virtual phone than it is to use the real phone. If the virtual phone is open when the call arrives, the agent can answer the call by clicking on the ringing virtual phone button. The icon 238-1 will then lift as shown in FIG. 76 to indicate that the agent has answered the call, and the traffic light of the agent interface icon 238-5 of the agent toolbar 238 shown in FIGS. 46 and 48 will show a red light indicating that the agent is busy.

As shown in step 2380 of FIG. 73, the agent and caller can then communicate via their respective telephones 104 and 110, so the agent can assist the caller as necessary. The agent can also view the caller-related information on the display screen of the agent's workstation 102 to better assist the caller with, for example, placing an order, a billing or service question, and so on.

Figure 77:
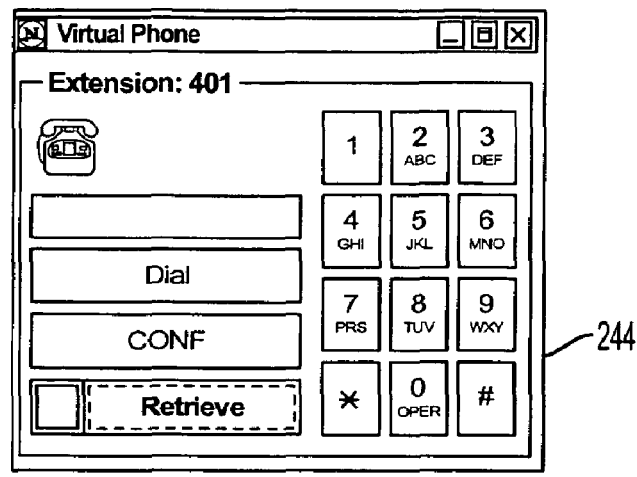
FIG. 77 illustrates an example of a virtual phone window when an agent has placed a call on hold.

The agent can also use the virtual phone display 244 to perform other caller-related operations. For example, the agent can place the caller on hold by clicking the hold button on the virtual phone display 244. In the lower left corner of the virtual phone window there is a hold status indicator light which changes to red when the call is on hold, and the hold button also changes to a retrieve button as shown in FIG. 77. The agent can then use the keypad of the virtual phone display 244, or the keypad on the normal phone 104, to dial another number while the caller is on hold. The agent can also use the conference button of the virtual phone display 244 to conference the caller with another party. To take the caller off hold, the agent can click on the retrieve button, which also causes the hold status indictor light to become amber.

It is also noted that when the agent is handling a call, or at any other time, the agent status interface 238-5 of the agent toolbar 238 shown in FIGS. 46 and 48 will change to indicate the agent's status. The "traffic light" of the agent status interface can indicate any of the following conditions shown in Table 35.

TABLE 35

Agent Status Interface Conditions

| Description | Status | The light changes to . . . |
|---|---|---|
| No lights | Agent not logged into the system. | All Colors, upon log in using System Interface |
| All lights | Agent logged into the system, but has not yet | Green, after clicking the Traffic Light to indicate that you are ready to receive a contact. |
| Green light | Agent ready to receive a contact. | Red, automatically upon initiation of a contact. |
| Red light | Agent engaged in the communication stage of a contact. | Yellow, after clicking the Traffic Light to indicate that you have completed the communication stage of the contact and has entered the Wrap-Up stage. |
| Yellow light | Agent in the Wrap-Up stage of a contact. | Green, after clicking the Traffic Light to indicate that you have completed the Wrap-Up stage, has concluded the contact, and is ready to receive another contact. |

Once the communication stage of the contact is over, the must complete the wrap-up stage as indicated in step 2390 of the flowchart in FIG. 73. The wrap-up stage of a contact is a period of time for the agent to finish up any administrative issues associated with the current contact and to begin preparation for the next contact. To enter the wrap-up stage of a contact, the agent click the (red) traffic light of the agent interface icon 238-5. The traffic light then turns to yellow and notifies the system that the agent is in wrap-up. During wrap-up, the agent remains unavailable to receive another contact.

It is important to note that a contact is not considered by the contact center system 100 to be closed at the moment when all communications media being used in the contact are closed. That is, when the agent has hung up from a voice contact and is no longer in active communication with the contact, the contact center system 100 continues to treat the contact as open. Only after the agent has performed the wrap-up stage and has reset the agent status to receive a new contact does the system 100 consider the contact closed. Also, once a contact is established, the system 100 tracks the time of the contact session, counting down from a time allotment set by the system administrator. Until the agent exits the wrap-up phase, the system 100 considers the contact to be open, and the clock 238-6, 238-7 and 238-8 of the agent toolbar 238 will continue to run. If the agent runs out of time, the wrap up clock 238-8 will flash 00:00 until the agent finishes wrapping up.

Figure 78:
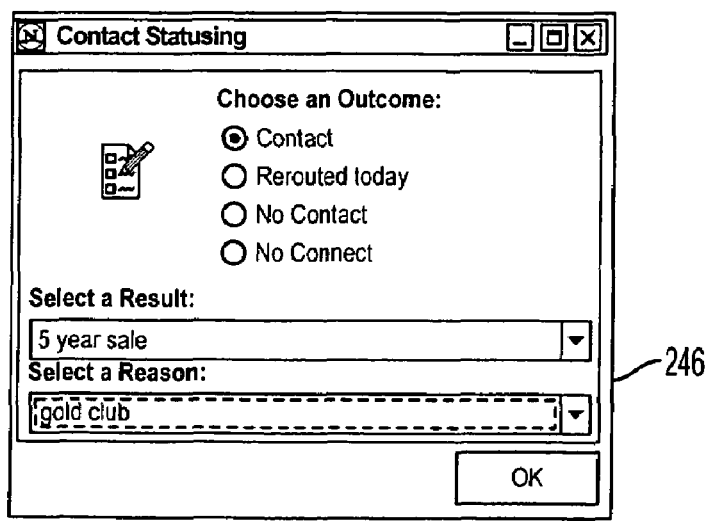
FIG. 78 illustrates an example of a contact statusing window that can be displayed on the display screen of an agent's workstation when the agent is performing a wrap-up procedure.

The agent can perform various wrap up tasks during the wrap up period. For example, the agent can update the contact's information from the agent's workstation 102 using the contact statusing window 246 as shown in FIG. 78. Due to the diversity in the needs of individual contact centers, this feature can be configured to open from a menu, open automatically, or be disabled. This functionality is neither controlled by the agent nor the system administrator, but rather by the application integrator.

To open the contact statusing box from a menu (if so configured), the agent right-clicks the traffic light of the agent interface status icon 238-5 to display a menu, and selects "open contact statusing" from the displayed menu. If the system is configured for contact statusing to open automatically, at the appropriate time (such as upon entering the wrap-up stage), the contact statusing box will open on the agent's workstation 102 display screen. The following Table 36 describes the elements of the Contact Statusing box.

TABLE 36

Contact Statusing Box Description

| Item | Description |
| --- | --- |
| Choose an Outcome: | Agent able to select one of four outcomes to describe the current contact (or attempted contact): |
| Contact | Agent successfully completed the contact. For incoming contacts, the outcome is always Contact. |
| Rerouted today | Agent transferred the contact to another Agent, supervisor, or back to your own queue for a later call back. |
| No Contact | Agent was unsuccessful in completing an outbound contact due to availability issues (line busy, no answer, etc.) Agent can only make a No Contact determination during a real-time contact (voice, video, etc.). |
| No Contact | Agent was unsuccessful in completing an outbound contact due to accessibility issues (wrong number, out of order, etc.) Agent can only make a No Connect determination during a real-time contact (voice, video, etc.). |
| Select a Result: | Outcome of the contact from pull-down list of choices. |
| Select a Reason: | Explanation of the result from pull-down list of choices. |
| OK | Submits the information |

At some point during the contact, the agent will complete the wrap up process. The agent can then exit the wrap-up stage of a contact by clicking the (yellow) traffic light of the agent status interface icon. The traffic light then turns green, and the agent's workstation notifies the agent manager that the completed contact is closed and the agent is ready to receive another contact. The agent can then view the times on the time displays 238-6, 238-7 and 238-8 of the agent toolbar 238 to ascertain the length of time to complete the operations associated with the contact These displays assist the agent n managing time throughout the work day. Each of the displays tracks time in H:MM:SS format.

Specifically, the session display 238-6 keeps a running count of how long the agent has been logged into the system. If the agent logs out for any reason, such as a break, the contact center system 100 considers the session to be over and resets the time display to zero. Logging in again starts a new session. The contact display 238-7 keeps a running count of the time being devoted to the current contact. When the communications portion of a contact is over (e-mail sent, hang-up, etc.), and when the agent has entered the wrap-up stage of the contact, this timer continues running. Until the agent has reset status to ready by exiting wrap-up, signified by the green traffic light of the agent status interface 238-5, the contact is still active. The wrap-up display 238-8 is a countdown reminder of the time it is taking the agent to complete the wrap-up stage of the contact. The amount of time that is on the counter at the beginning of wrap-up is set by the system administrator and represents the time you are expected to devote to wrap-up under normal circumstances.

When the timer has counted down to zero, the wrap-up display flashes and continues flashing until the has completed the wrap-up stage by clicking the yellow traffic light of the agent status interface icon 238-5, thus resetting the agent status to ready as signified by the green traffic light indicator. The functions of these of the time displays are summarized in the following Table 37.

TABLE 37

Summary of Timers on Agent Toolbar

| Item | Description |
| --- | --- |
| Session | The amount of time agent has been logged in during the current session. Logging out resets the display to zero. |
| Contact | The amount of time agent has been working with the current contact. Once agent has completed all stages of the contact and has returned to ready mode, the timer is rest to zero. |
| Wrap-Up | The amount of time agent has remaining to complete the wrap-up stage within the timeframe set by the system administrator. Upon expiration, the display flashes zero until the agent has exited wrap-up. |

Figure 79:
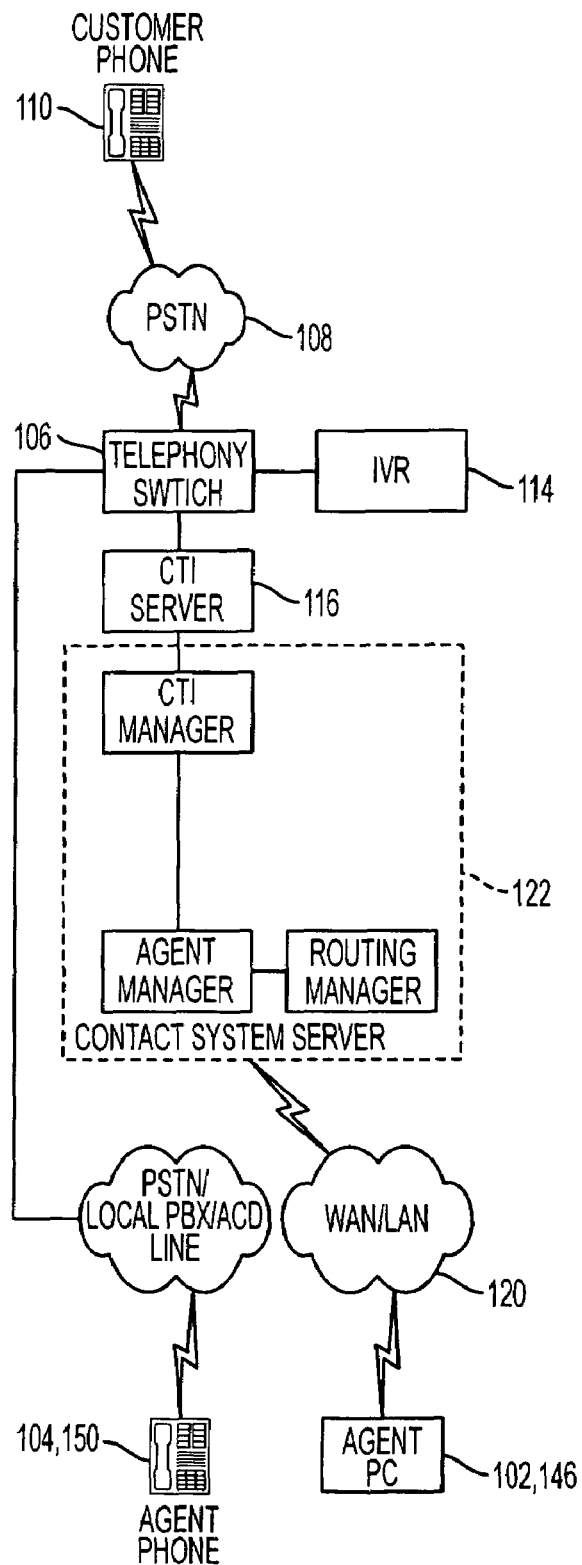
FIG. 79 is a conceptual block diagram of components of the system shown in FIG. 1 involved when an agent handles an IVR contact.
Figure 80:
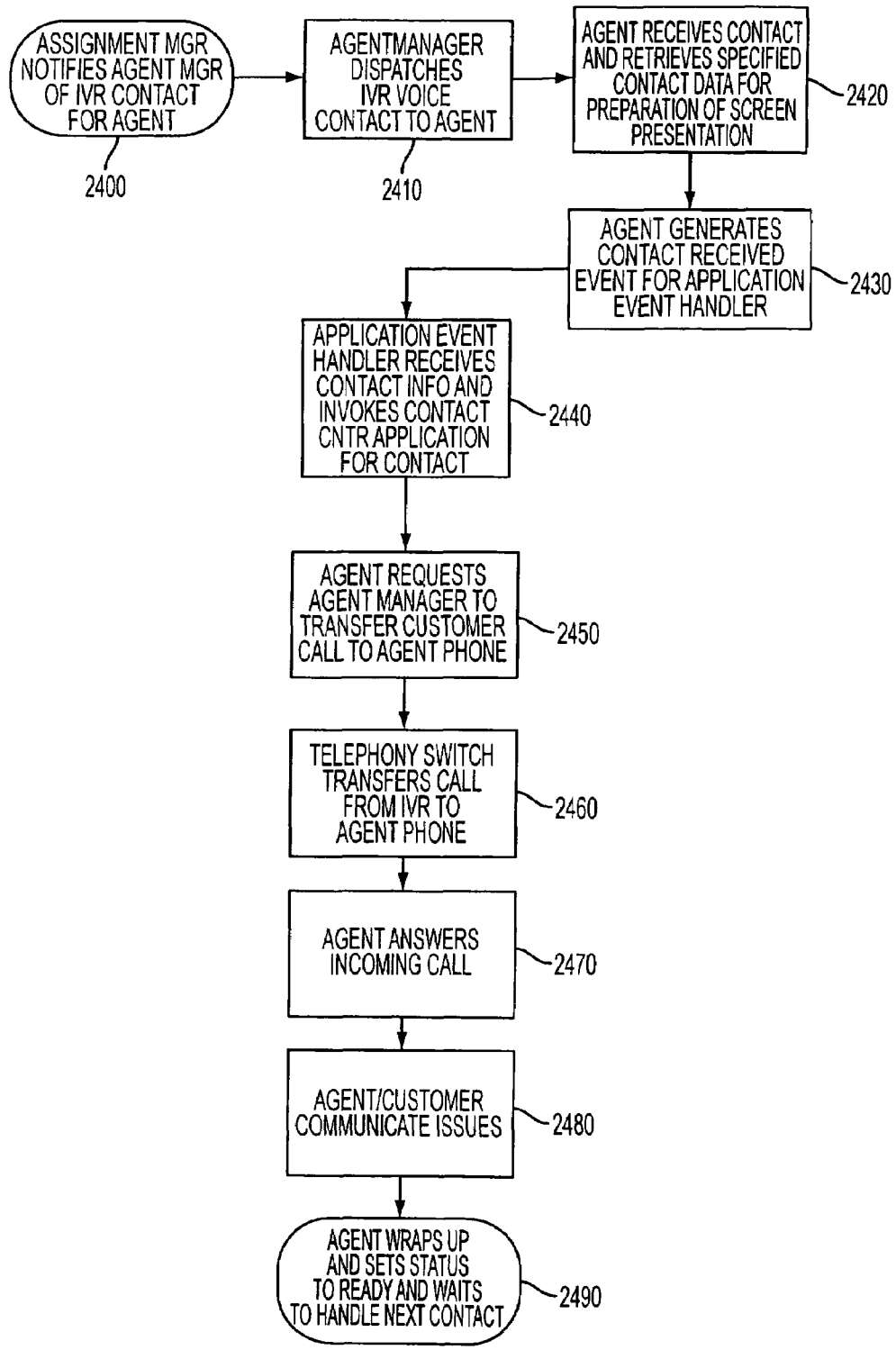
FIG. 80 is a flowchart illustrating an example of steps performed by the components shown in FIG. 79 when agent handles an IVR contact.

The following describes an example of the manner in which an agent handles an IVR voice contact with reference to FIGS. 79 and 80. Although this description will primarily make reference to the local agent workstation 102 and telephone 104, the operations performed by a remote agent at his or her workstation 146 and telephone 150 are essentially identical.

FIG. 79 is a conceptual block diagram illustrating components of the call center system 100 involved in an agent's handling of an IVR voice contact, and FIG. 80 is a flowchart showing exemplary steps performed in handling the contact. When the assignment manager notifies the agent manager of an IVR voice contact for the agent in step 2400, the agent manager dispatches the contact to the agent in step 2410. In step 2420, the agent receives the contact and retrieves specified contact data for preparation of a screen presentation on his or her workstation, in a manner similar to that described above in step 2320 for non-IVR contacts.

The agent workstation 102 then generates a "contact received" event for the application event handler in step 2430, and the application event handler receives contact information and invokes the contact center application for the contact in step 2440. The agent workstation then requests the agent manager to transfer the IVR voice contact (hereinafter a "call") to the agent telephone 104 in step 2450. Accordingly, the telephony switch 106 transfers the call from the IVR to the agent's telephone in step 2460 as can be appreciated by one skilled in the art.

The agent can then answer the call in step 2470 either with his or her normal telephone 104 or via the virtual telephone shown in FIG. 74 as described above. In step 2480, the agent can communicate with each other so that the agent can assist the caller as necessary in a manner similar to that described above for non-IVR calls. The agent can then perform the wrap up operations in step 2490, which are similar to those associated with a non-IVR call described above.

An example of the manner in which an agent handles a web callback request contact will now be described with reference to FIGS. 81–84. Although this description will primarily make reference to the local agent workstation 102 and telephone 104, the operations performed by a remote agent at his or her workstation 146 and telephone 150 are essentially identical.

Figure 81:
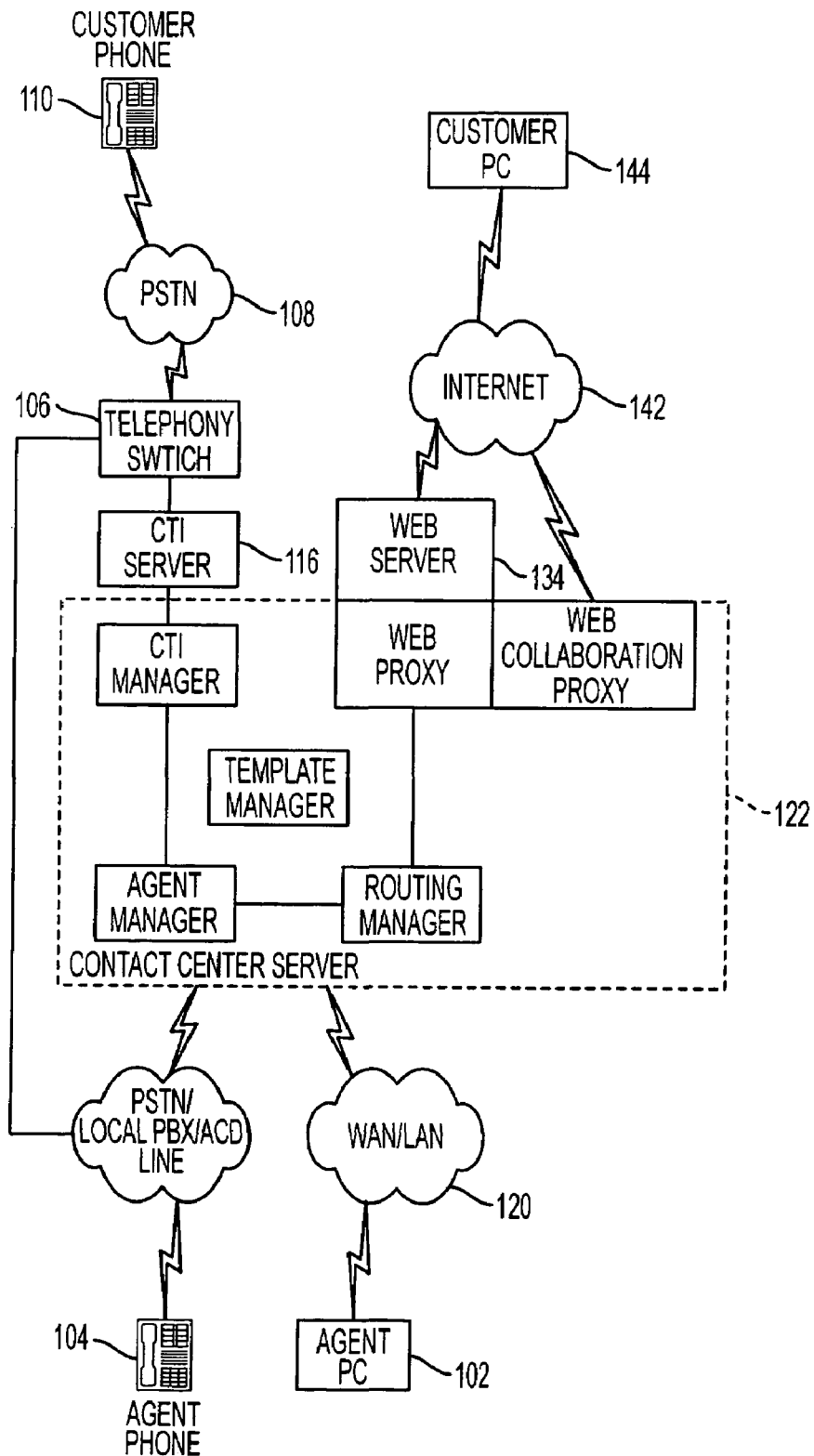
FIG. 81 is a conceptual block diagram illustrating components of a system shown in FIG. 1 involved when an agent handles a web callback contact.
Figure 82:
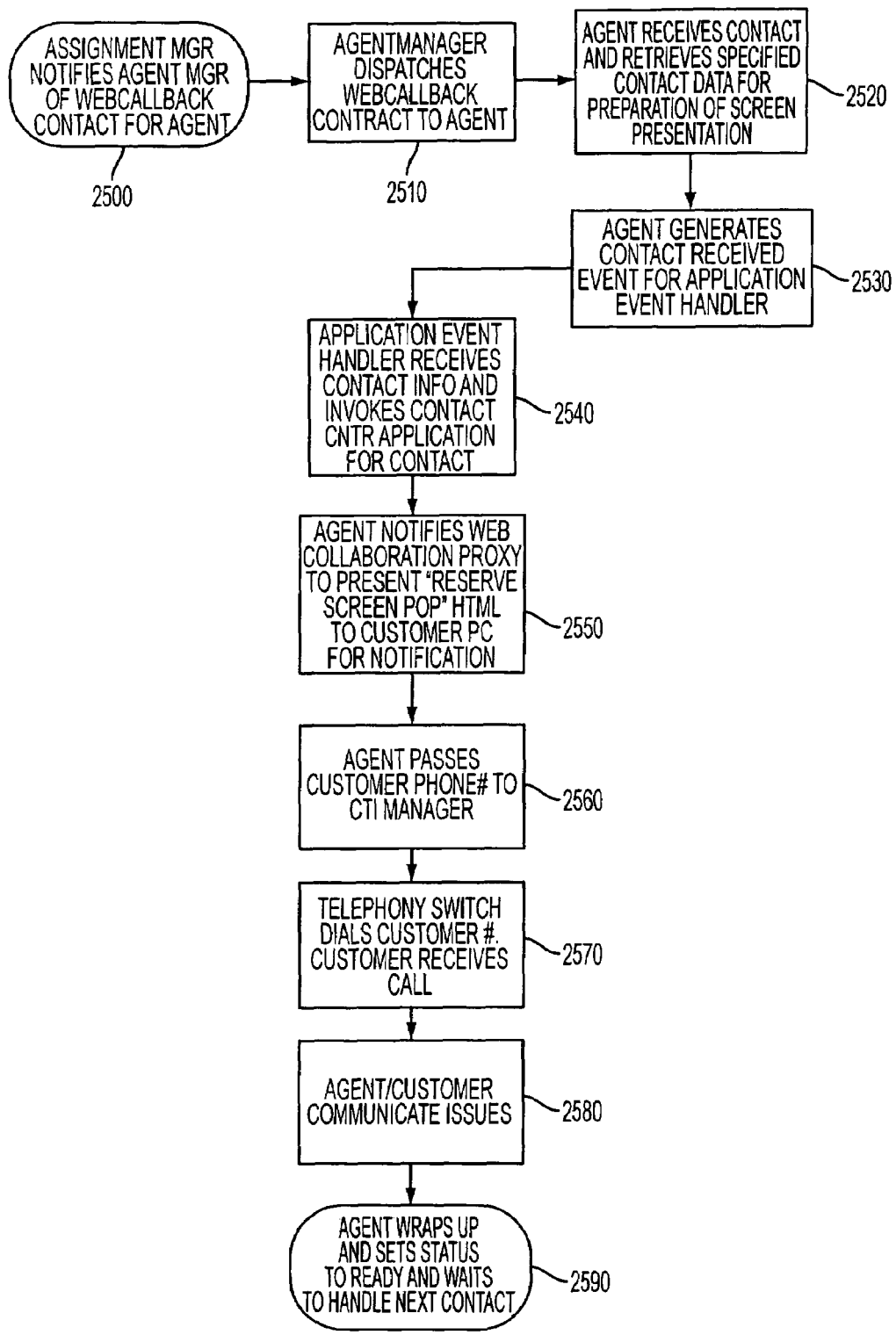
FIG. 82 is a flowchart illustrating an example of steps performed by the components shown in FIG. 81 when an agent handles a web callback contact.

FIG. 81 is a conceptual block diagram illustrating components of the call center system 100 involved in an agent's handling of a web callback contact, and FIG. 82 is a flowchart showing exemplary steps performed in handling the contact. When the assignment manager notifies the agent manager of a web callback contact for the agent in step 2500, the agent manager dispatches the contact to the agent in step 2510. In step 2520, the agent receives the contact and retrieves specified contact data for preparation of a screen presentation on his or her workstation, in a manner similar to that described above in step 2320 for non-IVR contacts.

The agent workstation 102 then generates a "contact received" event for the application event handler in step 2530, and the application event handler receives contact information and invokes the contact center application for the contact in step 2540. The agent workstation then notifies the web collaboration proxy to present a "reverse screen pop" HTML to the customer PC 144 to notify the customer of the pending callback in step 2550.

Figure 83:
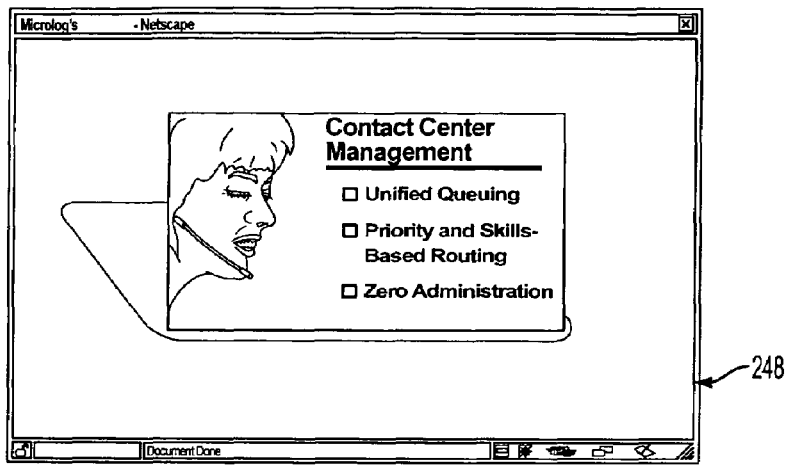
FIG. 83 is an example of a reverse screen pop window that can be displayed on the display screen of a contact's PC in response to a web callback request.
Figure 84:
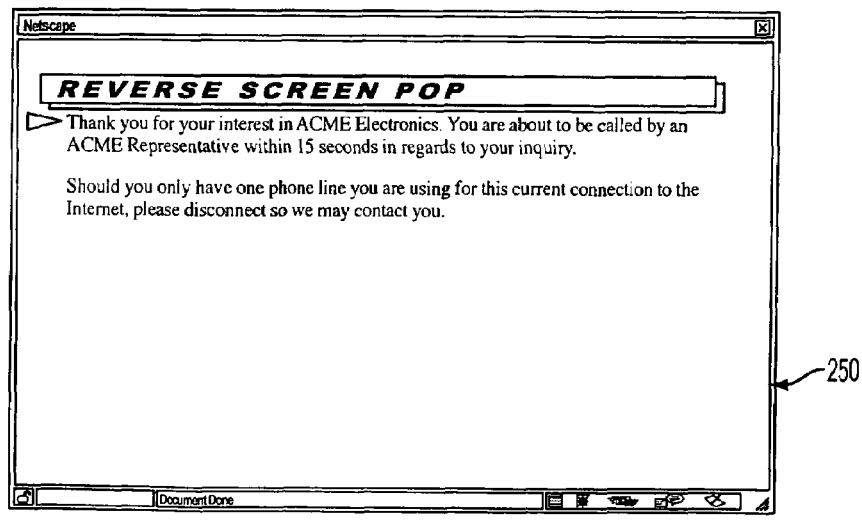
FIG. 84 illustrates an example of another reverse screen pop window that can be displayed on the display screen of the contact's PC in response to a web call-back request.

That is, a splash page 248 as shown in FIG. 83 is first sent to draw the customer's attention to the fact that the connection is imminent. A few moments later, the splash page 248 disappears from the customer's PC display screen, and is replaced by a notice display page 250 as shown in FIG. 84, stating that the call back attempt will be made, for example, in 15 seconds, thereby allowing the customer to disconnect from the Internet, if necessary, to receive the requested phone call from the agent. In actual practice, these pages 248 and 250 can be customized to conform to the company image being represented by the contact center system 100.

In step 2560, the agent manager then passes the customer phone number to the CTI manager, and in step 2570, the telephony switch 106 dials the customer number. Also, the virtual phone display 244 (see FIG. 74) on the agent's workstation 102 display screen is activated, and the virtual phone icon 238-2 lifts its handset as shown in FIG. 76, and the traffic light of the agent status indicator 238-5 changes from green to red. If the customer answers, the web call back is considered successful, and is treated like any other call in step 2580. After completing the communications aspects of the contact, the agent can proceed with the wrap up in step 2590 in a manner similar to the wrap up procedures described above.

However, if the customer does not answer, the agent can click the virtual phone icon 238-2 to hang up the call attempt. When the agent ends the call attempt, the virtual phone icon 238-2 hangs up and the traffic light turns yellow as the contact sequence enters wrap-up mode in step 2590. At this point, the agent can reroute the customer contact to try back at a more appropriate time, or reroute the customer contact in another manner.

To reroute a customer, the agent can perform the following operations. The following Table 38 outlines the most typical reasons for rerouting a contact along with the recommended action.

TABLE 38

Contact Rerouting Reasons and Actions

| Reason | Action |
| --- | --- |
| Wrong campaign | Modify the contact information, then reroute to queue |
| Contact was working with another Agent and requests to be reconnected to that Agent | Select requested Agent and reroute |
| Agent needs to research for an answer | Reroute to Self |

TABLE 38-continued

Contact Rerouting Reasons and Actions

| Reason | Action |
| --- | --- |
| Request is too technical | Reroute to Supervisor/Specialist Agent |
| Contact requests a later call back | Reroute to Self, to queue, or to a specific Agent depending on the request |

Figure 85:
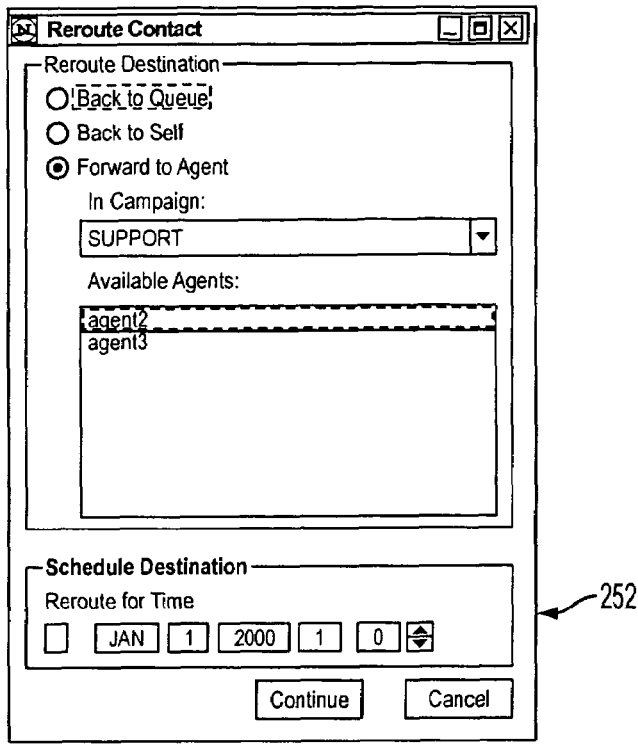
FIG. 85 is an example of a reroute window that can be displayed on a display screen of an agent's workstation to reroute a contact.

To reroute a contact, the agent can click on the reroute contact icon 238-4 on the agent toolbar 238 as shown in FIGS. 46 and 48 to cause the window 252 shown in FIG. 85 to appear on the agent's workstation 102 display terminal.

The following Table 39 describes the elements of the reroute contact window.

TABLE 39

Element of the Reroute Contact Window

| Item | Description |
| --- | --- |
| Back to Queue | Reroute destination back to the general routing queue. |
| Back to Self | Reroute destination back to Agent's personal queue. |
| Forward to Agent | Reroute destination to another specific Agent. |
| In Campaign: | Dropdown list of all currently defined campaigns. |
| Available Agents: | Scroll list of all Agents who are currently assigned to the campaign you have chosen |
| Reroute for Time | Date and time system will initiate the rerouted contact. |
| Continue | Accepts data entered and opens a Contact Infonnation box. |
| Cancel | Ignores any data entered and closes the box. |

If the agent wishes to route the contact to any qualified available agent, the agent can reroute the contact using the back to queue feature of the window 252 by performing the following operations:

1. Select Back to Queue.
2. To specify a particular time the contact should be placed in the queue:
   Under Schedule Destination in the Reroute for Time field, select a date and time using the down scroll arrow, select the date and time for the reroute, or type the information in directly into the appropriate Month, Day, Hour, and Minute boxes.
3. Click Continue.
4. A Contact Information window will open. Make any desired changes to the information about your contact. See Section 1.5.1, "Contact Information."
5. Click Reroute to complete the process, or Cancel to ignore any changes made to the contact information and exit Reroute Contact.

If the agent wishes to continue to personally handle a contact that needs to be rerouted, the agent can reroute the contact using the "back to self" feature of the window 252 by performing the following operations:

1. Select Back to Self.
2. Agent must specify a particular time the contact should be placed in his or her queue.
   Under Schedule Destination in the Reroute for Time field, select a date and time using the down scroll arrow, select the date and time for the reroute, or type the information in directly into the appropriate Month, Day, Hour, and Minute boxes.
3. Click Continue.

4. A Contact Information window will open. Make any desired changes to the information about your contact. See Section 1.5.1, "Contact Information."
5. Click Reroute to complete the process, or Cancel to ignore any changes made to the contact information and exit Reroute Contact.

If the agent wishes to reroute the contact to another specific agent, the agent can reroute the contact using the forward to agent feature of the window 252 and perform the following steps:
1. Select Forward to Agent.
2. From the In Campaign drop down list, select the destination campaign for this contact.
3. Select an Agent from the Available Agents scroll list to which the contact is to be routed.
4. Under Schedule Destination in the Reroute for Time field, select a date and time using the down scroll arrow, select the date and time for the reroute, or type the information in directly into the appropriate Month, Day, Hour, and Minute boxes.
5. Click Continue.
6. A Contact Information window will open. Make any desired changes to the information about your contact. See Section 1.5.1, "Contact Information."
7. Click Reroute to complete the process, or Cancel to ignore any changes made to the contact information and exit Reroute Contact.

Additionally, as an agent works with contacts, the agent learns more about their respective needs, including such things as the types of skills that agents should possess in order to best serve them. Before an agent consults with a supporting agent, or puts this contact back into the queue, the agent may need to record anything that might have been learned during a contact that might be of value to other agents or the contact center regarding that particular contact.

Figure 86:
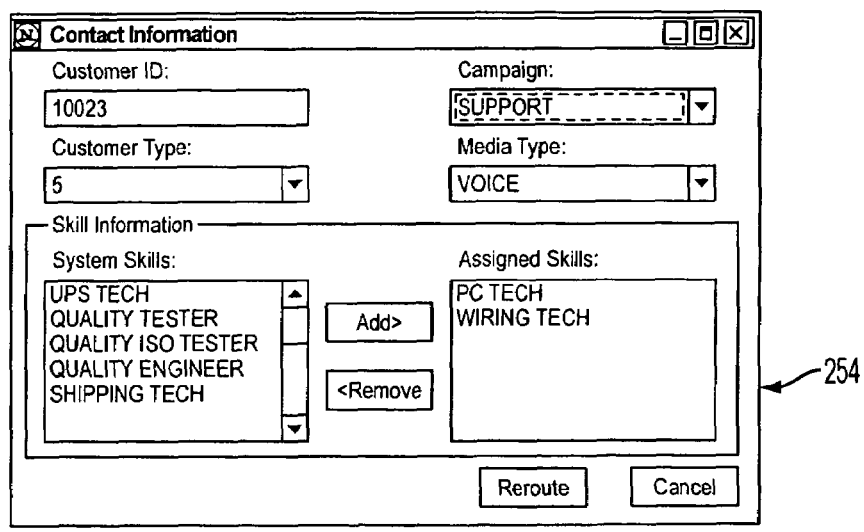
FIG. 86 is an example of a window that can be displayed on a display screen of an agent's workstation to allow an agent to enter information about a contact.

Therefore, from the reroute contact window, the agent can click the continue button to open a contact information window 254 as shown in FIG. 86 and described in Table 40 as follows:

TABLE 40

Contact Information Window Features

| Item | Description |
|---|---|
| Customer ID: | Identification information for the contact |
| Customer Type: | Prioritization level for the contact |
| Campaign | Current campaign for the contact |
| Media Type | Current media type for the contact |
| System Skills | All available skills |
| Assigned Skills | Skills needed to handle the contact |
| Add> | Adds selected System Skills to the Assigned Skills |
| <Remove | Removes selected skills from the listed Assigned Skills |
| Reroute | Commits any modified information to the contact record and execute the reroute. |
| Cancel | Ignores any data entered and closes the box. |

To complete the contact information as desired, the agent can perform the following operations:
1. Using the mouse, select the field(s) to be modified
2. Using the down arrow, scroll to the information to be included.

The special skills that are needed in a particular campaign are listed in the Assigned Skills field. In order to make the Contact Center System more efficient in its treatment of a particular contact, it may be useful to modify the list of skills that are to be associated with that contact. Removing unnecessary skills might mean increasing the number of available qualified Agents, thereby reducing the time that the contact must wait to be connected with another Agent. If the contact needs assistance beyond the skill set of the campaign, the agent might need to add certain skills so that the next Agent would have the proper qualifications. System skills are added and removed as follows:

Adding a Skill
1. Select the desired skill(s) from the System Skills: list. To select more than one skill, hold down the Shift key to select a range, or the Ctrl key to select multiple individual skills.
2. Click Add>, then click OK.

Removing a Skill
1. Select the desired skill(s) from the Assigned Skills: list. To select more than one skill, hold down the Shift key to select a range, or the Ctrl key to select multiple individual skills.
2. Click<Remove then click OK.

Once the skill modifications are complete, click Reroute. The Contact Information window then closes and the contact is rerouted.

It is noted that the above rerouting operations and contact information updating operations can be performed by any agent at essentially any time, and for any type of media contact. The handling of further types of media contacts will now be described.

An example of the manner in which an agent handles a web chat contact will now be described with reference to FIGS. 87–92. Although this description will primarily make reference to the local agent workstation 102 and telephone 104, the operations performed by a remote agent at his or her workstation 146 and telephone 150 are essentially identical.

Figure 87:
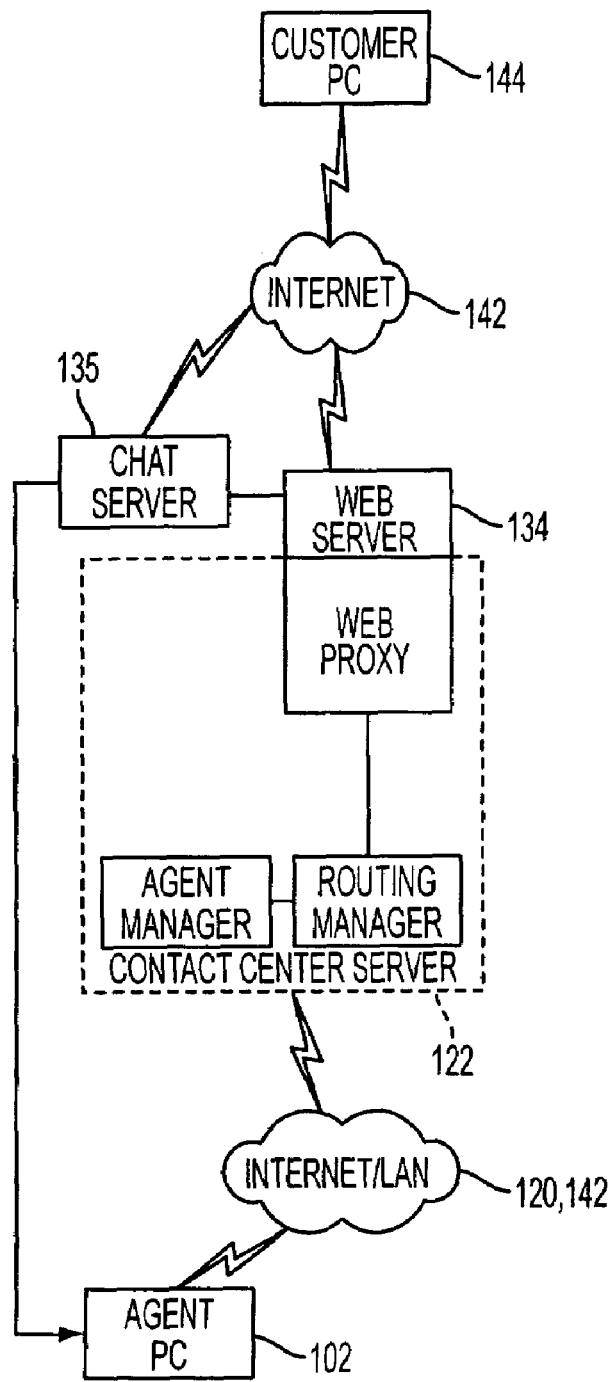
FIG. 87 is a conceptual block diagram illustrating components of the system shown in FIG. 1 involved when an agent handles a web chat contact.
Figure 88:
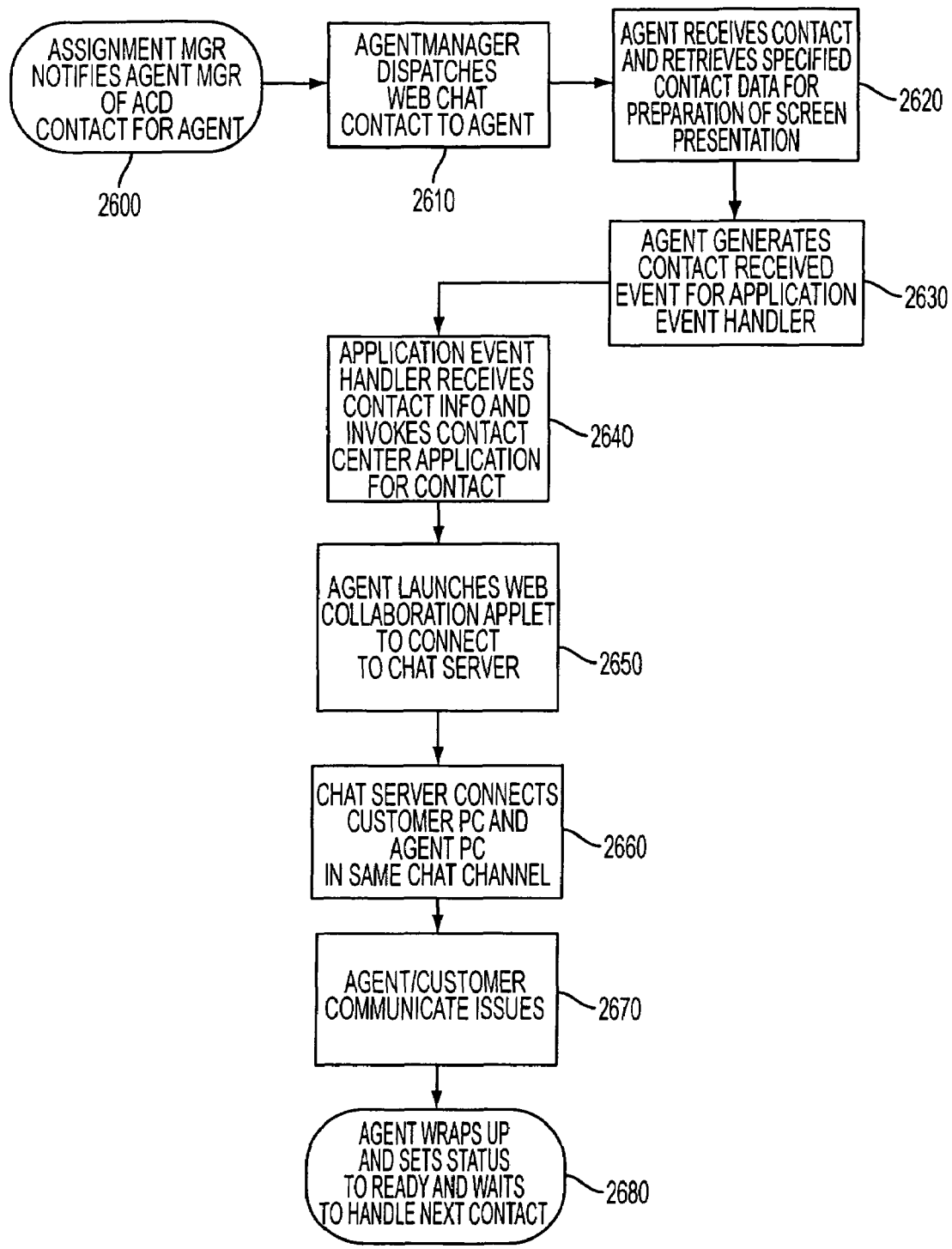
FIG. 88 is a flowchart illustrating an example of steps performed by the components shown in FIG. 87 when an agent handles a web chat contact.

FIG. 87 is a conceptual block diagram illustrating components of the call center system 100 involved in an agent's handling of a web callback contact, and FIG. 88 is a flowchart showing exemplary steps performed in handling the contact. When the assignment manager notifies the agent manager of a web chat contact for the agent in step 2600, the agent manager dispatches the contact to the agent in step 2610. In step 2520, the agent receives the contact and retrieves specified contact data for preparation of a screen presentation on his or her workstation, in a manner similar to that described above in step 2320 for non-IVR contacts.

The agent workstation 102 then generates a "contact received" event for the application event handler in step 2630. In step 2640, the application event handler receives contact information and invokes the contact center application for the contact. Then, in step 2650, the agent launches a web collaboration applet to connect to the chat server 135.

In step 2660, the chat server connects the customer PC and the agent workstation 102 in the same chat channel. The agent and customer then communicate with each other over the chat channel in step 2670.

Figure 89:
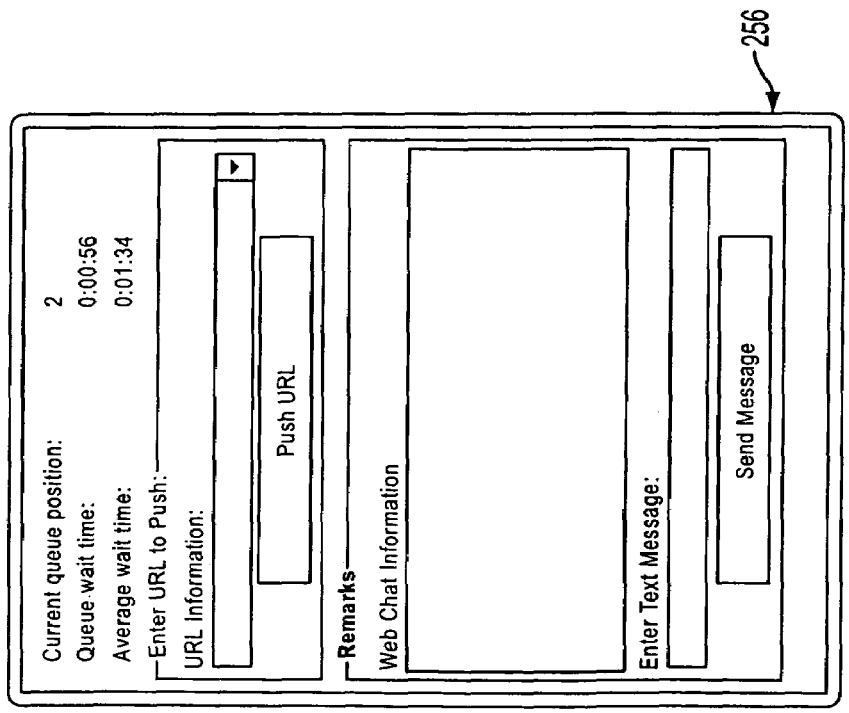
FIG. 89 illustrates an example of a window that can be displayed on the display screen of a contact's PC during a web chat.

Examples of the types of windows that can be displayed on the display screens of the agent's workstation 102 and customer's PC 144 will now be described. For instance, when a collaboration is being attempted by an agent, a web connection window 256 as shown in FIG. 89 will be displayed on the display screen of the customer's PC. Initially, the box will be disabled, but displayed at the top will be information regarding the customer's position in the queue, actual waiting time lapsed, and the average time people have been waiting in the queue before connecting to an agent. Once the connection is made between an agent and customer as indicated in step 2670 above, the queue status information is replaced by whatever the contact center 100 has chosen to display (such as company name and agent name) and the interactive features of the box become enabled.

Figure 90:
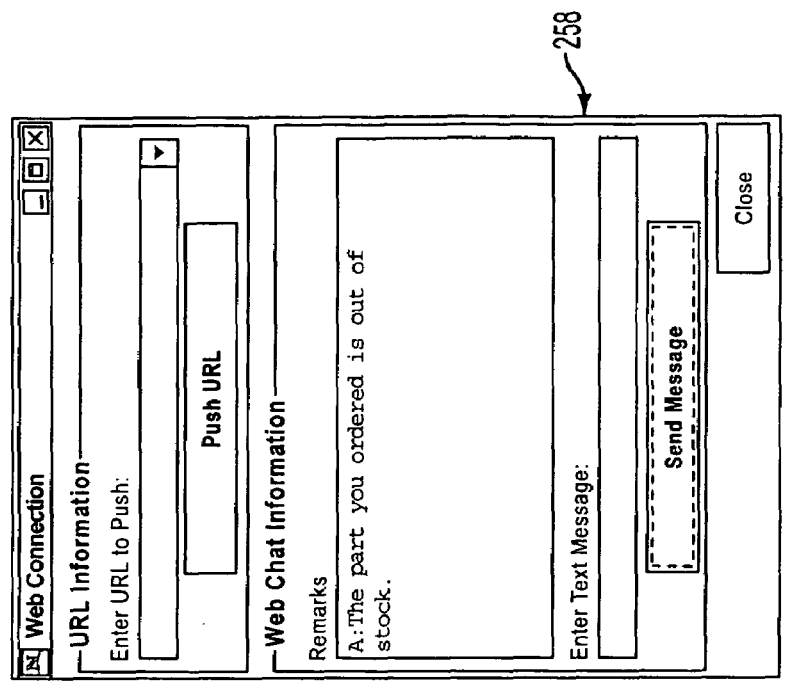
FIG. 90 illustrates an example of a window that can be displayed on the display screen of an agent's workstation when the agent is performing a web chat.

It is noted that unless the contact has requested a web chat, an agent can open his or her own web connection window 258 to be displayed by his or her workstation 102 as shown in FIG. 90. To open the web connection window, the agent can click the web collaboration icon 238-3 on the agent toolbar 238 as shown in FIGS. 46 and 48. Regardless of whether the agent or the customer initiated the web chat, the web connection windows 256 and 258 enable the agent and customer to push web pages to each other.

The following Table 41 describes the elements of an agent's web collaboration window.

TABLE 41

Details of Agent Web Collaboration Window

| Item | Description |
| --- | --- |
| Enter URL to Push: | Field where Agent enters the URL of the image that the Agent wants to send to the contact. The down arrow on the right shows a list of the previous URLs the Agent entered. |
| Push URL | Button to send the URL to the contact. |
| Remarks | Field where the text messages of both Agent and contact appear. Agent's and contact's remarks appear in different colors from one another. In addition, each of the Agent's remarks is preceded by A:. Each of the contact's is preceded by C:. |
| Enter Text Message: | Text box where Agent and your contact type the remarks they wish to send to each other. |
| Send | Button for sending the text message into the Remarks field where it is visible by both Agent and contact. |
| Close | Button to end the Web Collaboration (available only to Agent). |

Figures 91, 92:
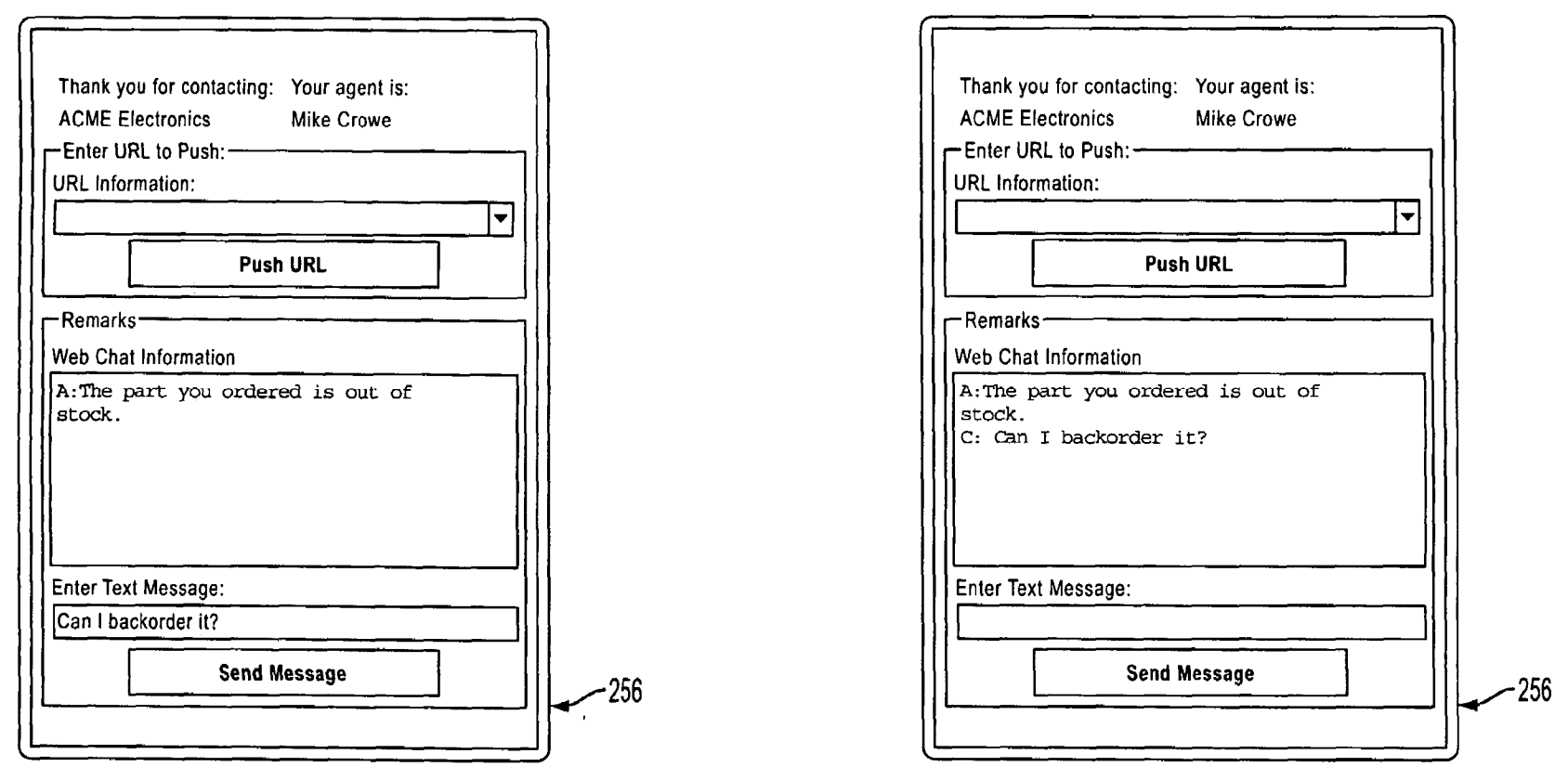

During step 2670 of the web chat operation flowchart shown in FIG. 88, the customer receives the agent's comments in his or her web collaboration window 256 as shown in FIG. 91. The customer is also able to send remarks to the agent as accomplished through his or her web collaboration window 256 as shown in FIG. 92. In this example, the contact sees the name of the company and the agent's name at the top of the window 256. However, depending on how the contact center system has designed this interface, the customer might see completely different information, if any at all. In any event, the customer will be able to enter URLs to push to the agent, and will be able to conduct a chat. However, unlike the agent web connection window 258, the customer's web connection window typically will not have a close button.

To push URL pages to the customer's PC 144 during a web chat, the agent can perform the following steps"
1. Click in the Enter URL to Push: field.
2. Type the complete URL (http:// . . . /pagename.html).or click the drop-down list arrow and select a previously visited URL. The system holds all URLs accessed during the current work session. Once a session is ended, the list of visited URLs is automatically cleared.
3. Click Push URL.

The page Agent selected then opens in a window on contact's screen.

To send a text message to the customer, the agent performs the following operations:
1. Click in the Enter Text Message field and type a message.
2. When the message is ready to be transmitted, click Send.

The message then appears in red in the Remarks field on both contact's and Agent's respective message interface windows. Text that submitted is preceded by A:, while text submitted by the customer contact is preceded by the letter C:. Both the agent and the customer contact will view their own posted remarks in blue and the other's remarks in red, for example.

Although the Web Connection box is a relatively intuitive communications tool, it is advisable for the agent to be prepared to send a few basic instructions to the customer contact regarding its use, such as the following:

Click in the Enter Text Message: field and type your message.

Click the Send button to transmit your message.

Our remarks will appear together in the Remarks field.

Yours will be preceded by "C:" and appear in blue.

Mine will have a preceding "A:" and appear in red.

When the contact is complete, the agent can click the close button on his or her web connection window 258, and commence the wrap up operation in step 2680, which are similar to the wrap up operations for the other media types of contacts described above. When the close button is clicked, the web connection window 258 closes and, if this is the only medium being used with the customer contact, the contact is ended. However if the web collaboration is being performed in conjunction with other media, such as voice, that other connection with the customer contact remains active The following describes an example of the manner in which an agent handles a VoIP contact with reference to FIGS. 93 and 94. Although this description will primarily make reference to the local agent workstation 102 and telephone 104, the operations performed by a remote agent and his or her workstation 146 and telephone 150 are essentially identical.

Figure 93:
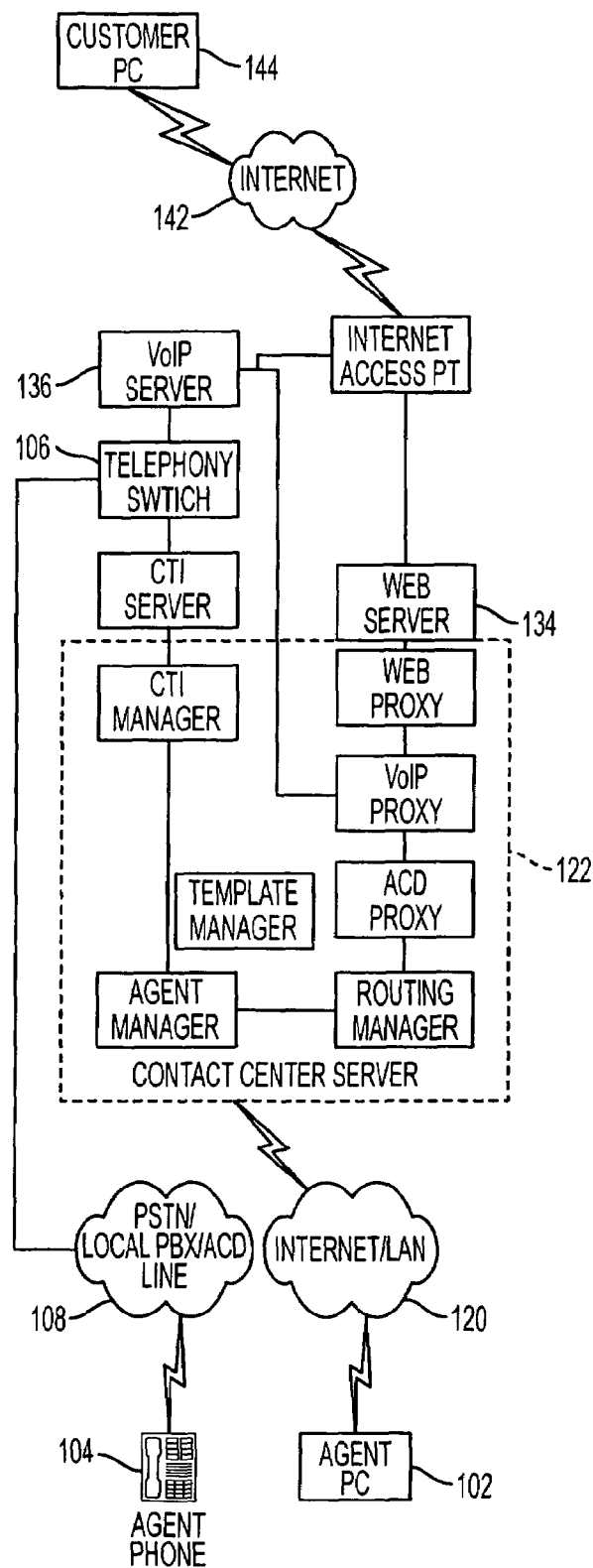
FIG. 93 is a conceptual block diagram illustrating components of the system shown in FIG. 1 involved when an agent handles a VoIP contact.
Figure 94:
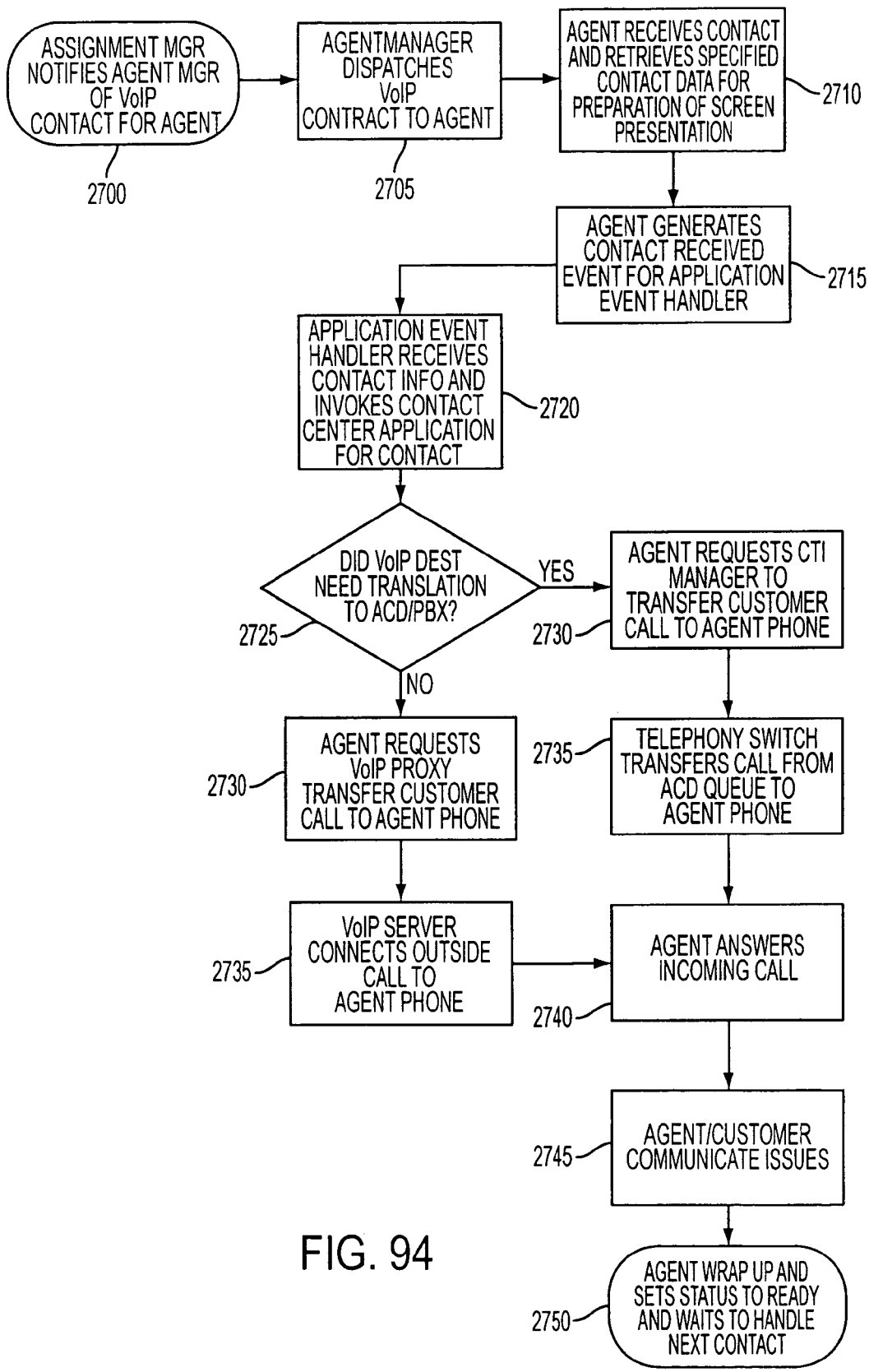
FIG. 94 is a flowchart illustrating an example of steps performed of by the components shown in FIG. 93 when an agent handles VoIP contact.

FIG. 93 is a conceptual block diagram illustrating components of the call center system 100 involved in an agent's handling of a VoIP contact, and FIG. 94 is a flowchart showing exemplary steps performed in handling the contact. When the assignment manager notifies the agent manager of a VoIP contact in step 2700, the agent manager dispatches the contact to the agent in step 2705. In step 2710, the agent receives the contact and retrieves specific contact data for preparation of a screen presentation on his or her workstation, in a manner similar to that described above in step 2320 for non-IVR contacts.

The agent workstation 102 then generates a contact received event for the application handler in step 2715. The application event handler then receives the contact information in step 2720 and invokes the contact center application for the contact. Then in step 2725, it is determined whether the VoIP destination needs translation to ACD/PBX. If so, the processing proceeds to step 2730 where the agent requests the CTI manager to transfer the customer call to the agent's telephone 104. In step 2735, the telephony switch 106 will then transfer the telephone call from the ACD queue to the agent's telephone, and in 2740, the agent can answer the incoming call in any of the manners described above.

Alternatively, if in step 2725 it is determined that the VoIP destination does not need translation to ACD/PBX, the processing proceeds to step 2730 where the agent requests the VoIP proxy to transfer the customer call to the agent's telephone. The VoIP server then connects the customer call the agent's telephone in step 2735, and the processing proceeds to step 2740 where the agent can answer the telephone call in any of the manners described above.

After answering the telephone call, the agent and customer can communicate with each other so that the agent can adequately service the customer in step 2745. Then, in step 2750, the agent can perform a wrap-up procedure similar to the wrap-up procedures described above.

Figure 95:
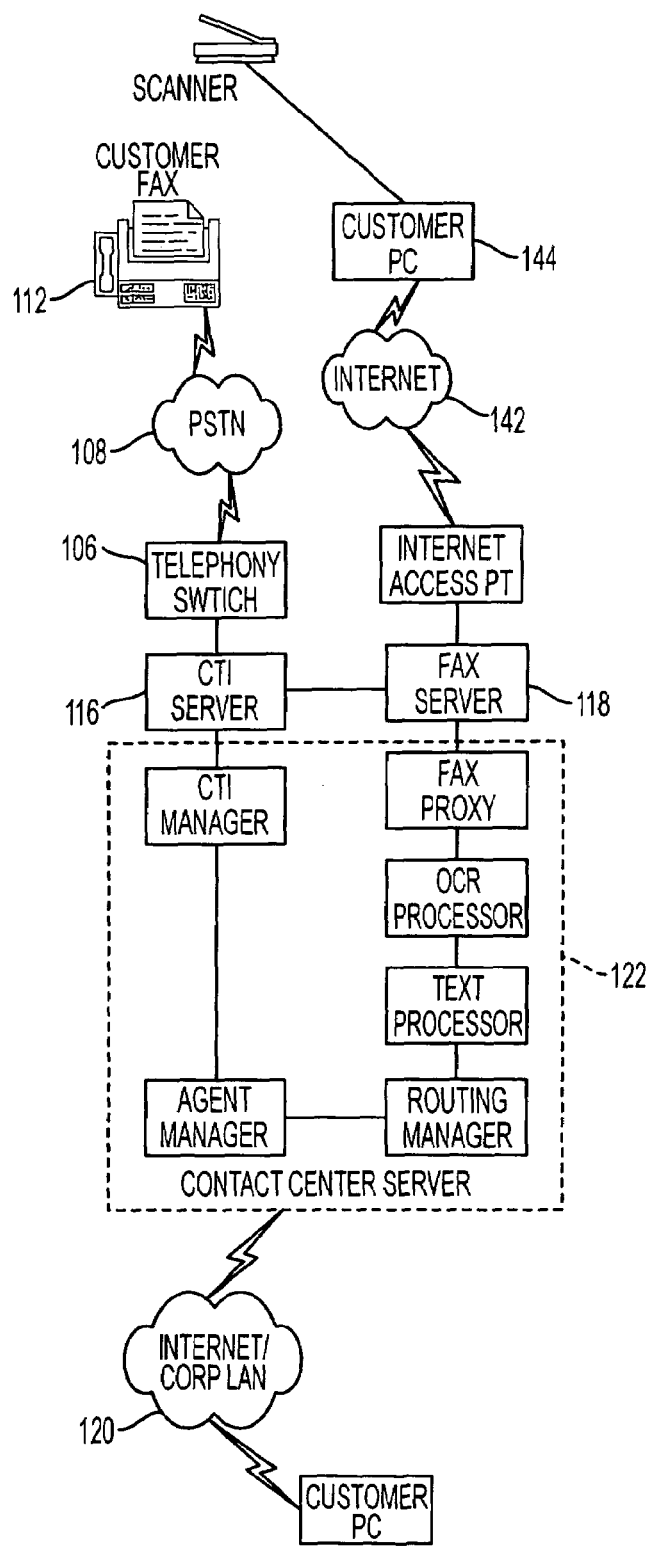
FIG. 95 is a conceptual block diagram illustrating components of the system shown in FIG. 1 involved when an agent handles a facsimile contact.
Figure 96:
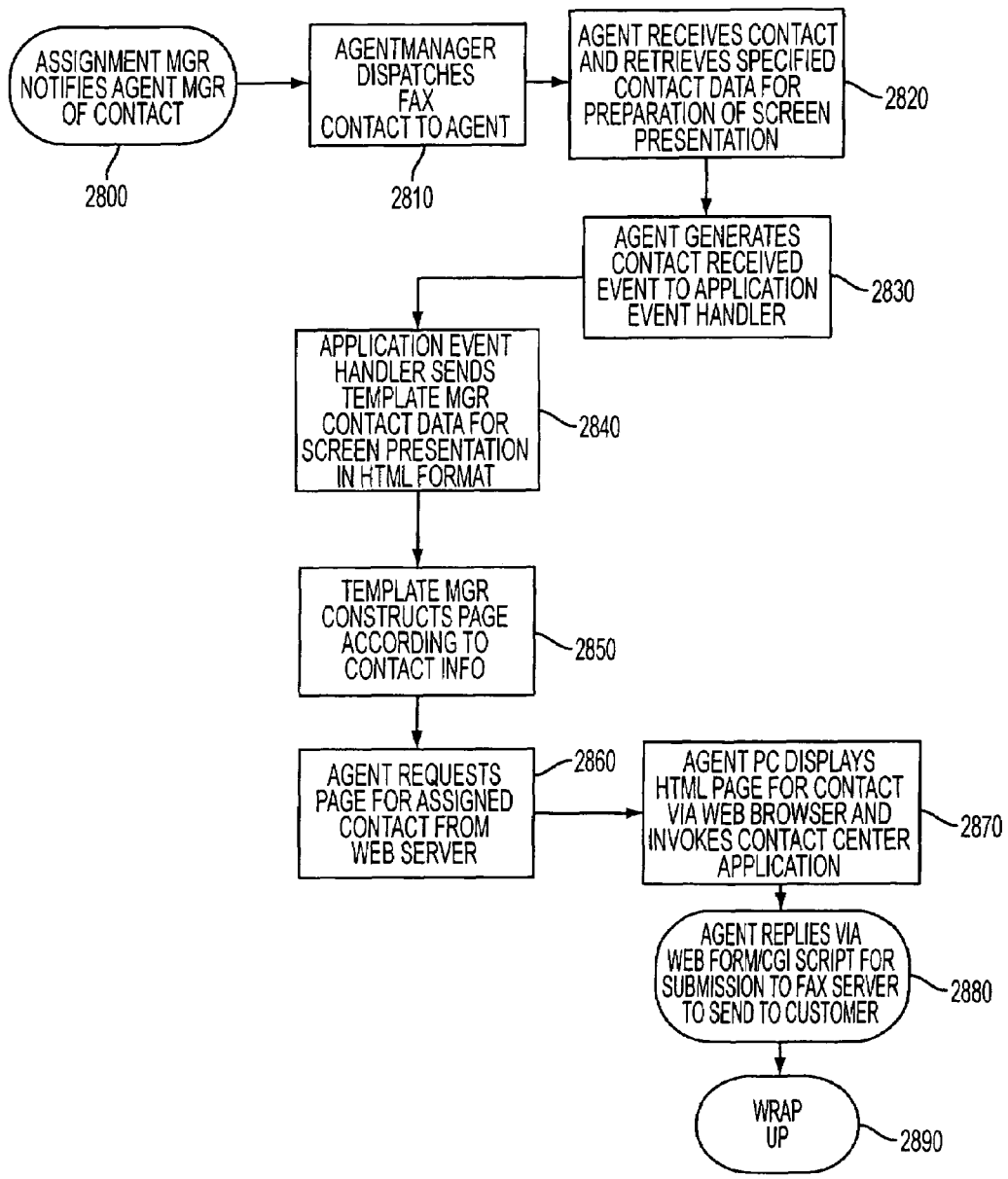
FIG. 96 is a flowchart illustrating an example of steps performed by the component shown in FIG. 95 when an agent handles a facsimile contact.

The following describes an example of the manner in which an agent handles a facsimile contact with references to FIGS. 95 and 96. Although this description will primarily make reference to the local agent workstation 102 and telephone 104, the operation performed by a remote agent and his or her workstation 146 and telephone 150 are essentially identical.

FIG. 95 is a conceptual block diagram illustrating components of the call center system 100 involved in an agent's handling of a facsimile contact, and FIG. 96 is a flowchart showing exemplary steps performed in handling the contact. When the assignment manager notifies the agent manager of a facsimile contact for the agent in step 2800, the agent manager dispatches the facsimile contact to the agent in step 2810. In step 2820, the agent receives the contact and retrieves the specified contact data for preparation for of a screen presentation in a manner similar to that described above. In step 2830, the agent then generates a contact received event to the application event handler.

In step 2840, the application event handler sends contact data for a screen presentation in HTML format to the template manager, and in step 2850, the template manager constructs the appropriate web page according to the contact information.

The agent then requests the page for the assigned contact from www server 124 in step 2860. In step 2870, the display screen of the agent's workstation 104 displays the appropriate HTML page for the contact via its web browser and invokes the contact center application. Then, in step 2880, the agent's workstation 102 can forward a web form/CGI script submission to the fax server to send a reply to the customer. The agent can then perform a wrap-up procedure in step 2890 similar to the wrap-up procedures described above.

Figure 97:
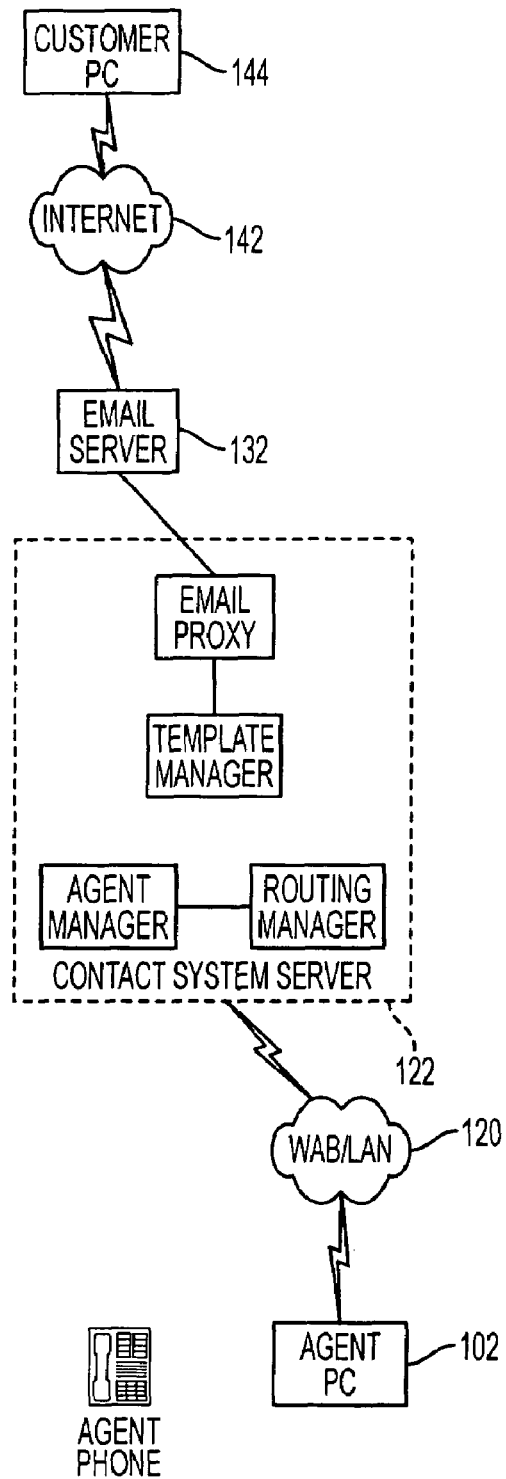
FIG. 97 is a conceptual block diagram illustrating components of the system in FIG. 1 involved when an agent handles an e-mail contact.
Figure 98:
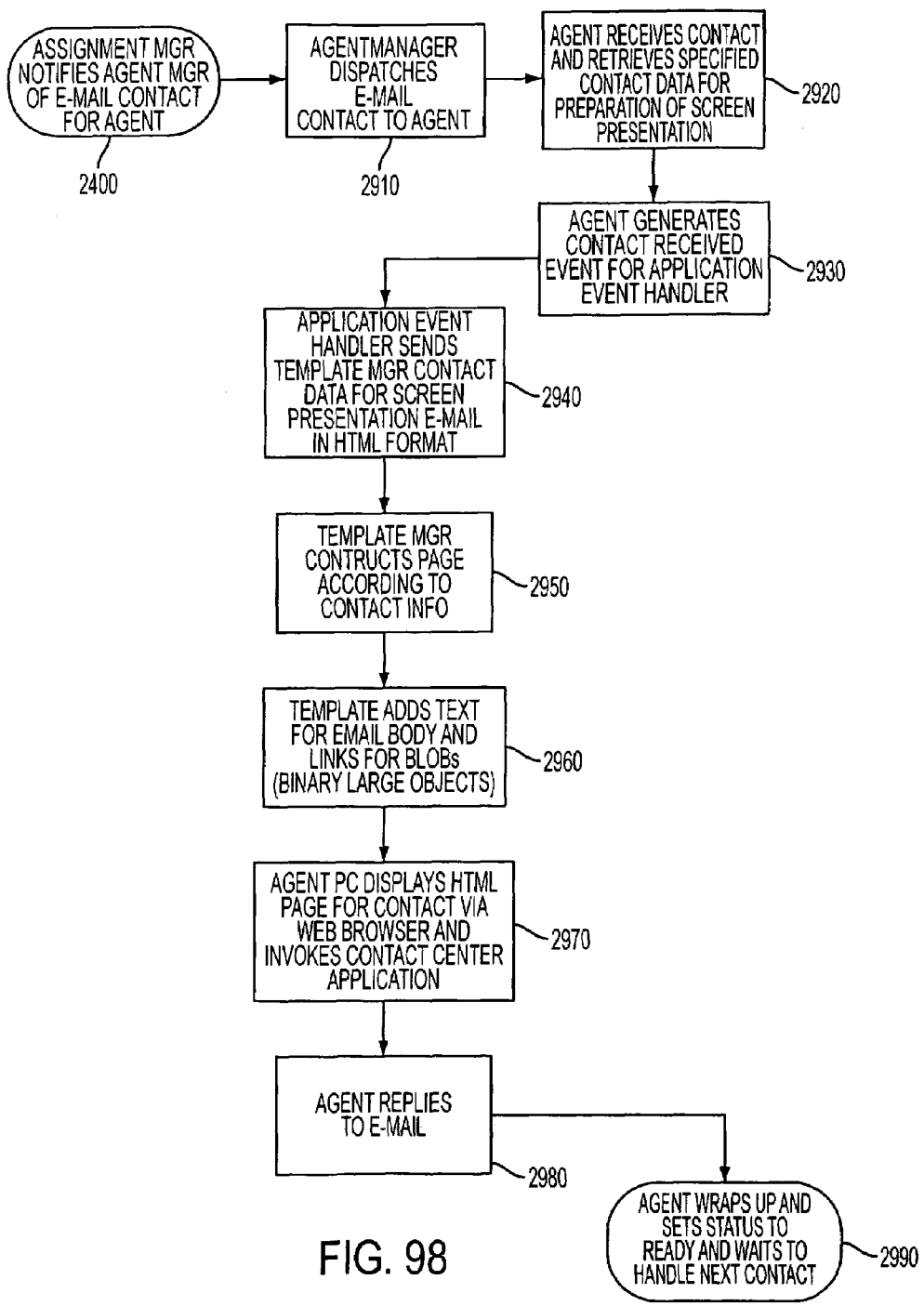
FIG. 98 is flowchart illustrating an example of steps performed by the component shown in FIG. 97 when an agent handles an e-mail contact.

The following describes an example of the manner in which an agent handles an e-mail contact with references to FIGS. 97 and 98. Although this description will primarily make reference to the local agent workstation 102 and telephone 104, the operations performed by a remote agent and his or her workstation 146 and telephone 150 are essentially identical.

FIG. 97 is a conceptual block diagram illustrating components of the call center system 100 involved in an agent's handling of an e-mail contact, and FIG. 98 is a flowchart showing exemplary steps performed in handling the contact. When the assignment manager notifies the agent manager of an e-mail contact in step 2900, the agent manager dispatches the e-mail contact to an agent in step 2910. In step 2920, the agent receives the contact and retrieves specified contact data for preparation of a screen presentation as can be appreciated by one skilled in the art. Then, in step 2930, the agent generates a contact received event for the application event handler.

In step 2940, the application event handler sends contact data for a screen presentation of the e-mail in HTML format to the template manager. In step 2950, the template manager constructs an appropriate web page according to the contact information, and in step 2960, the template manager adds text for the e-mail body and links for the binary large objects (BLOBs).

In step 2970, the display screen of the agent's workstation displays an HTML page for the e-mail contact via its web browser and invokes a contact center application. Then, in step 2980, the agent can reply to the e-mail as appropriate.

In step 2990, the agent then performs a wrap-up procedure similar to the wrap-up procedures described above.

In summary, it is noted that when a contact is an e-mail, the e-mail message will appear on the agent's screen and the system will offer some method for the agent to reply to it. The look and feel of the e-mail features will be largely dependent on the design of the specific e-mail application being used by the contact center system 100.

Typical scenarios would have an e-mail message pop in its own window on the agent's screen, or in a frame within a window designed to serve as a work area. Most likely, the agent will see From:, To:, Cc:, and Subject: (or Re:) information along with the message. The agent would most likely be able to reply to the message by clicking hypertext on the From: line of the e-mail (the Sender) to open a reply box equipped, at the very least, with a message entry area and send button. However, because the treatment of this media type depends on the design of the system integrator of the contact center, everything from the way an agent receives the message to they way a reply is made can be completely different from one system to the next.

Furthermore, because most e-mail applications are very easy to use, regardless of what e-mail application is running on the system 100, an agent should have no difficulty in understanding how to read and respond to e-mail messages that he or she receives.

In addition to handling contacts and performing the other tasks described above, an agent is capable of examining his or her own personal queue. An agent's personal queue typically contains contacts that have been rescheduled for a call back, or contacts routed to that agent from another Agent.

Figure 99:
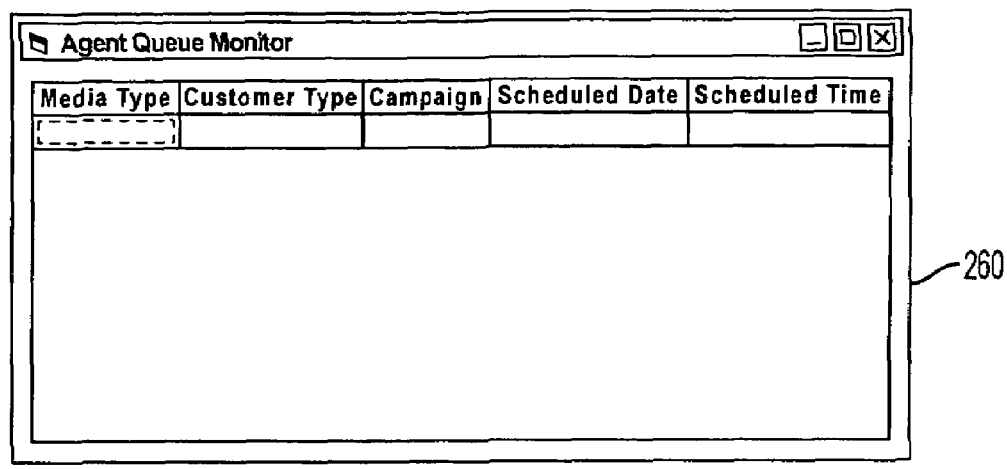
FIG. 99 is an example of a window to enable an agent to monitor the status of his or her personal queue.
Figure 100:
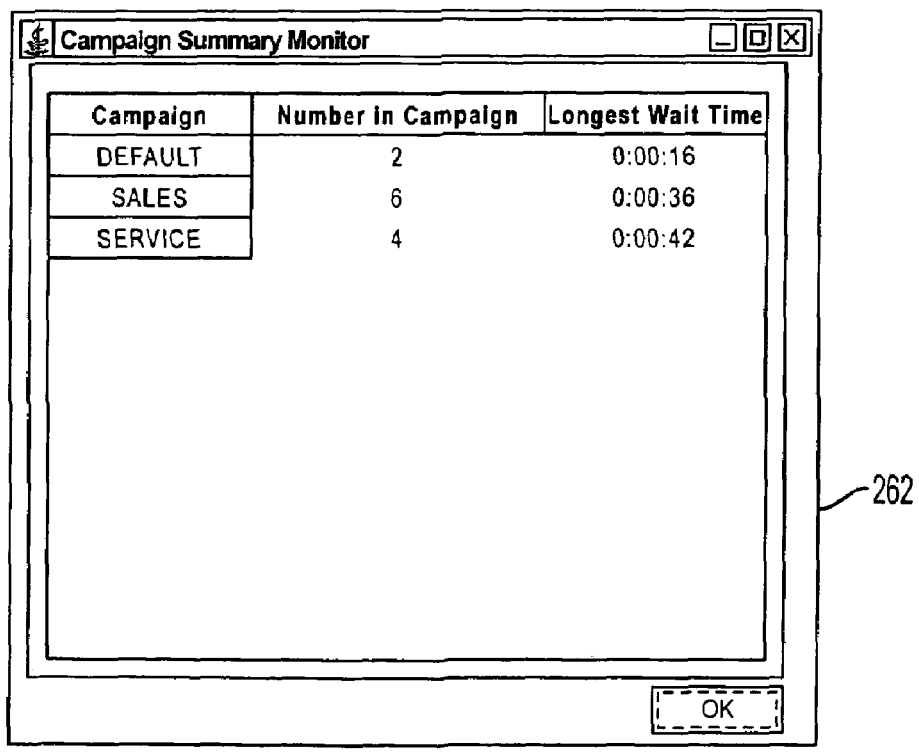
FIG. 100 is an example of a window to enable an agent to monitor the status of a campaign.

To access the personal queue, the agent can click on the agent queue monitor icon 238-9 of the agent toolbar 238 shown in FIGS. 46 and 48 to cause an agent queue monitor window 260 similar to that shown in FIG. 99 to be displayed by the agent's workstation 102. The following Table 42 describes the elements of window 260.

TABLE 42

Agent Queue Monitor Window

| Item | Description |
| --- | --- |
| Media Type | Media type to be used to reach the contact |
| Customer Type | Prioritization level for the contact |
| Campaign | Current campaign for the contact |
| Scheduled Date | Scheduled date for a callback to the contact |
| Scheduled Time | Exact time system will attempt to reach the contact on the Scheduled Date |

An agent can also monitor his or her campaign by clicking on the campaign monitor icon 238-10 of the agent toolbar 238 shown in FIGS. 46 and 48 to display a campaign summary monitor window 262 on the display screen of his or her workstation 102. The campaign monitor window shows a summary and, if desired, details of current queue information regarding a selected campaign. The following Table 43 describes the elements of the campaign summary monitor window 262:

TABLE 43

Campaign Summary Monitor Window

| Item | Description |
| --- | --- |
| Campaign | All active campaigns to which Agent is assigned |
| Number in Campaign | Number of contacts waiting at the present time |

TABLE 43-continued

Campaign Summary Monitor Window

| Item | Description |
| --- | --- |
| Longest Wait Time | Longest time a contact has currently been waiting in queue, in hours, minutes and seconds (H:MM:SS) |

Figure 101:
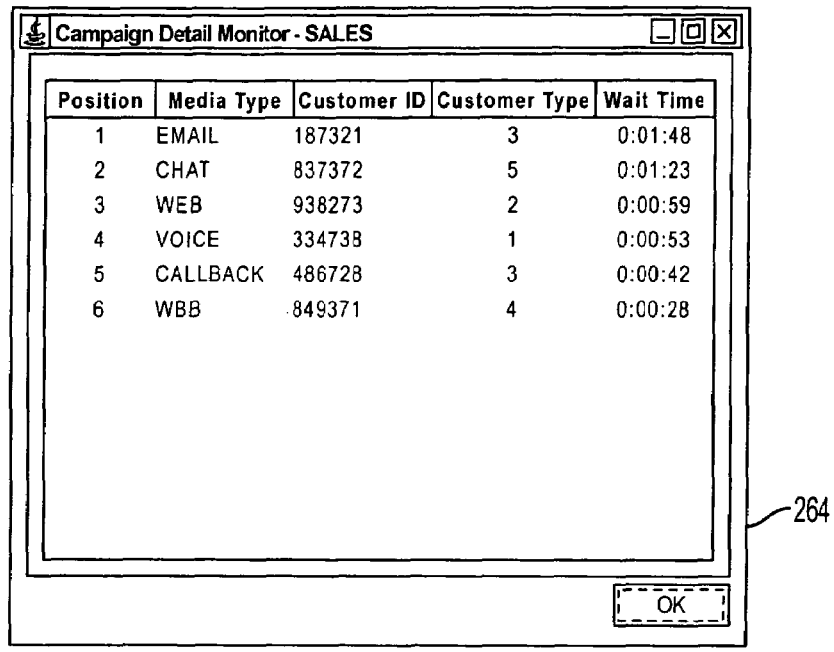
FIG. 101 is an example of another window to enable an agent to monitor the status of a campaign.

To view more information about waiting contacts, the agent can click on the button for the desired campaign to cause the campaign detail monitor window 264 as shown in FIG. 101 to be displayed by the agent's workstation 102. The following Table 44 describes the elements of the campaign detail monitor window 264:

TABLE 44

Campaign Detail Monitor Window

| Item | Description |
| --- | --- |
| Position | Position of contacts currently in the queue of a particular campaign |
| Media Type | Type of media being used by the contact |
| Customer ID | Data (such as an ID or account number) that identifies the contact |
| Customer Type | Prioritization level of the contact |
| Wait Time | Amount of time the contact has remained in the queue in Minutes/Seconds |

In addition, if an agent has questions about using the agent tools of the system 100, the on-line help displays helpful information, in a format divided into convenient chapters. If the system 100 has been customized, Help may also contain information specific to the call center, with links to useful information.

When an agent is logged out of the system, the only two buttons on the toolbar 238 that are not disabled are the system interface button 238-1 used to log in, and the help button 238-11.

Figure 102:
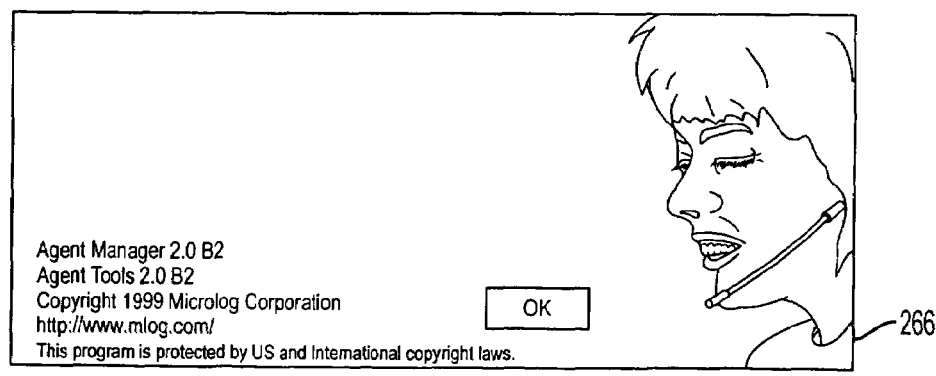
FIG. 102 is an example of a help window that can be accessed by an agent.

Information regarding the version of the system the agent is using is accessed through the help button 238-11. To see the current version of the software, the agent can right click the help button 238-11. A drop down menu with single item, About Agent, appears. The agent can then click on this drop down menu to open an information box 266 as shown in FIG. 102. The agent can then click on the "ok" button to close the box.

As can be appreciated from the above, the media types are categorized according to the way they are to be treated when placed in the queue for the next appropriate agent. If it is an inbound contact, the media type automatically corresponds to the medium used in establishing the contact. For example, if the contact places a phone call, the media type is Voice, if the contact sends an e-mail the media type is e-mail, and so on, as shown in Table 45.

TABLE 45

An Example of Some Media Types Handled by the System

| Media Type | Description |
| --- | --- |
| Voice | Telephone call from a contact received into the system. |
| Call Back | Telephone call from an Agent automatically placed by the system. |
| E-mail | E-mail message from a contact received into the system. |
| Web Call Back | Notice sent into the system by a contact currently viewing a contact center related Web page requesting an immediate call back from an Agent. |

TABLE 45-continued

An Example of Some Media Types Handled by the System

| Media Type | Description |
| --- | --- |
| Web Chat | Notice sent into system by a contact currently viewing a contact center related Web page requesting an immediate chat with an Agent over the Web. |
| Web Bulletin Board | Post from a Web bulletin board configured to enter system under specific conditions defined by the Application Integrator. |

It should also be noted that in addition to what occurs automatically during an inbound contact, an agent has the ability to change the media type of a contact for future placement into the queue. For example, if a call comes in as voice, an agent might find it appropriate to reroute to another agent or back to himself or herself at a later time. In that situation, the agent might change the media type for that contact to call back or to e-mail, depending on what the circumstances demanded.

In addition to the above, a web bulletin board feature of the system 100 allows anyone with access to the world wide web and a browser to post a message or a question to which anyone else visiting the board can post a response. This can be a valuable tool for businesses wanting to provide a dynamic product information forum for their customers.

It is possible, however, for such a service to show a company in a negative light if a customer poses a question that never receives an answer. The system web bulletin board function can prevent this from happening, because the system monitors the web bulletin board for posts that have not received any response for whatever period of delay the system is configured to intercept. When the system identifies a post that is due for a response, the post is then automatically routed to agents for handling.

Figure 103:
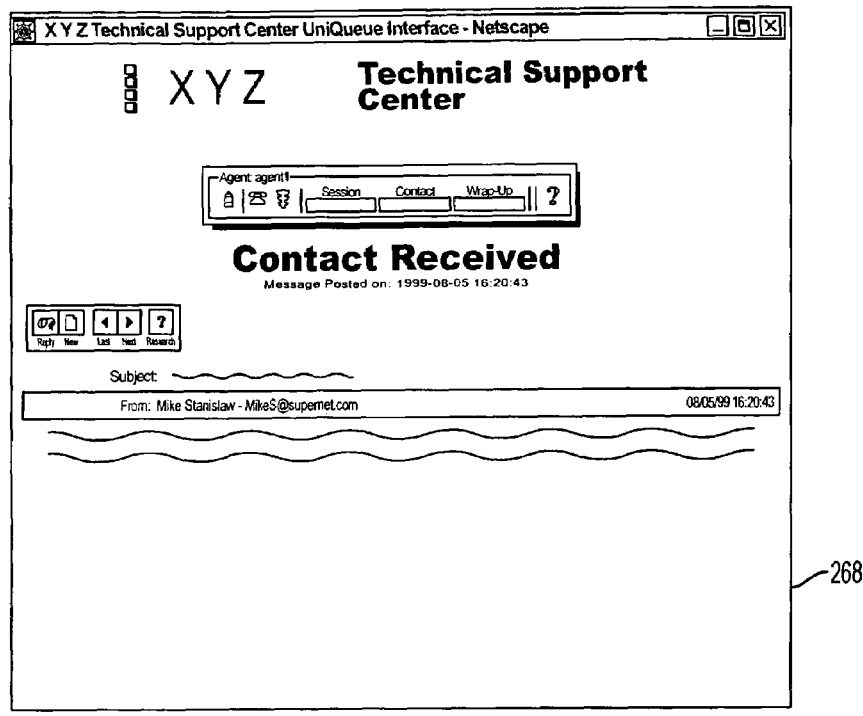
FIG. 103 is an example of web bulletin board contact window that can be accessed by an agent.

FIG. 103 shows an example of an agent interface window 268 displaying a web bulletin board contact. Web bulletin board pages routed to agents are displayed in the frame at the lower right of their interface windows, as shown in this example. An agent's screen displays the same web page that would be seen by selecting it during a visit to the actual web bulletin board. The following Table 46 describes the elements of a post routed to an agent from the web bulletin board in window 268:

TABLE 46

Web Bulletin Board Display

| Item | Description |
| --- | --- |
| Reply | Toolbar button opens a Reply Message form for responding to existing posts |
| New | Toolbar button that opens a blank New Message form for creating a new post |
| Last | Toolbar button that opens the previous message, if any, associated with the currently displayed post |
| Next | Toolbar button that opens the next message, if any, associated with the currently displayed post |
| Search | Toolbar button that opens a Search Message dialog box |
| Subject: | Topic of the post |
| From: | Name and e-mail address entered, if any, on the New Message or Reply Message form associated with the displayed post |
| Message (unlabeled) | Any message text submitted through the New Message or Reply Message form associated with the displayed post. |

In this example, the web bulletin board (Discussion Web), displays a toolbar in the message frame for creating, accessing, and replying to posts. Although it is possible for an agent to use all of these tools as any visitor to the Discussion Web, the purpose of the Web Bulletin Board function of system 100 is to ensure that unanswered posts receive a reply.

Figure 104:
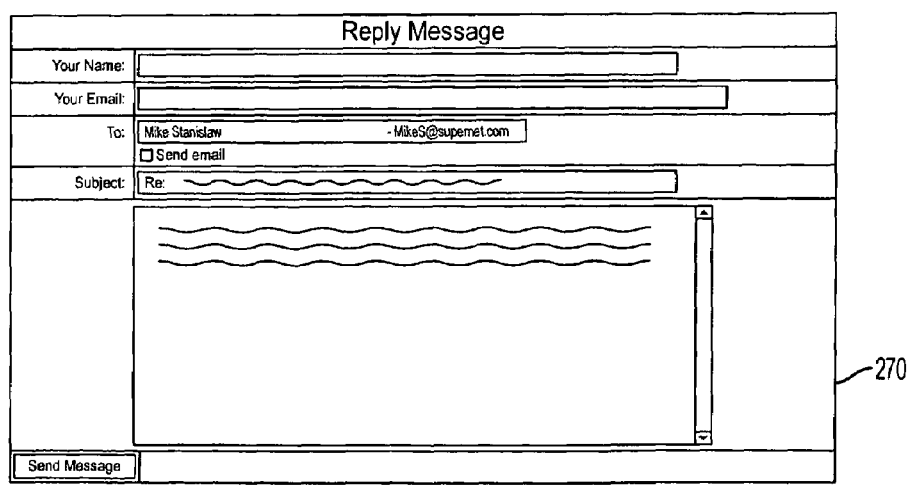
FIG. 104 is an example of a reply message window that an agent can use to send a reply to a message posted on a bulletin board associated with the system.

An agent can use the reply button to display a reply window 270 as shown in FIG. 104 which the agent can use to reply to a web bulletin board message by performing the following steps:

1. Click the Reply button. The following Reply Message window will appear:
2. Type agent's name and your e-mail address in the appropriate boxes.

Click Send Message to send the reply.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

Appendix—Setting Up a Campaign

The Campaign

One of the basic structures used in a contact center is a concept called a "Campaign". The term originally comes from the contact center where the basic measure of work was the telephone contact and "campaigns" were created to organize the workers within a contact center around the various types of telephone calls that were received or made. Campaigns are often thought of as outbound telemarketing campaigns where a plan is organized, a list of contacts are identified, a time frame for running the campaign is decided, a script is developed, and a desired response is sought. Once initiated, specific results are recorded to measure the success of the campaign.

First, you need to identify the campaign and the normal results expected.

|  | Restrictions/Characteristics |
| --- | --- |
| Campaign Name | System No more than 50 characters |
| Campaign Results | No more than 31 characters |
| Result Reasons | No more than 31 characters |

Agents will have the option of selecting one of four outcomes:

Contact
No Contact
No Connect
Rerouted

The Results and Reasons will vary with each campaign, but the following will give you some ideas. As you can tell, some of the result and reason values apply to either a sales or a service type of campaign.

Sales Campaign

| Contact Outcome | Result Values | Reason Values |
| --- | --- | --- |
| Contact | Sale | Good Price |
|  |  | Features |
|  |  | Availability |
|  | No Sale | Too Expensive |
|  |  | Wrong color/size |
|  |  | Lacks Features |
|  | Call Me Back | No Time |
|  |  | Need to Research Information |
|  |  | Requested Call Back Later |
| No Contact | Busy | None |
|  | No Answer |  |
|  | Wrong Party |  |
|  | Answering Machine |  |
| No Connect | SIT | None |
|  | Wrong Number |  |
|  | Disconnected |  |
| Rerouted | Returned to queue | Lack Skill |
|  | Placed in Personal Queue | Requested Call Back Later |
|  | Routed to Specific Agent | Requested Specific Agent |
|  | Routed to Supervisor | Requested Supervisor |

Support Campaign

| Call outcome | Result Values | Reason Values |
| --- | --- | --- |
| Contact | Fixed and Closed | User Error |
|  |  | Configuration Error |
|  |  | Documentation Error |
|  |  | Documented Bug |
|  | Unfixed and Closed | Documented Bug |
|  |  | Configuration Incompatibility |
|  | Answered, filing error report | Unreported Bug |
|  |  | Unreported Documentation Error |
|  | Unanswered, filing error report | Unreported Bug |
|  |  | Unreported Documentation Error |
|  | Call Back | Need to Research Information |
|  |  | Requested Call Back Later |
| No Contact | Busy | None |
|  | No Answer |  |
|  | Wrong Party |  |
|  | Answering Machine |  |
| No Connect | SIT | None |
|  | Wrong Number |  |
|  | Disconnected |  |
| Rerouted | Returned to queue | Lack Skill |
|  | Placed in Personal Queue | Requested Call Back Later |
|  | Routed to Specific Agent | Requested Specific Agent |
|  |  | Lack Skill |
|  | Routed to Supervisor | Requested Supervisor |
|  |  | Lack Skill |

Switches, Servers and Extensions

You need switch names, switch ids, and server addresses for both your primary server and your back-up server that will be used on each campaign. This information may already be loaded into your system, or you will have to check with your telephony administrator for this information.

Agent Extensions

These are the actual extensions assigned to Agent desk positions.

| Item | Restrictions/Characteristics |
| --- | --- |
| From Extension | Initial (and inclusive) telephony extension of the range<br>Format: Up to 31 digits |
| To Extension | Last (and inclusive) telephony, extension of the range<br>Format: Up to 31 digits |
| Switch Type | Name of the telephony switch<br>Format: 31 characters |
| Primary Switch ID | The identification number associated with a CTI link defined in the Dialogic CT-Connect configuration.<br>Format: 31 characters |
| Secondary (Redundant) Switch ID | The identification number associated with the secondary CTI link defined in the Dialogic CT-Connect configuration.<br>Format: 31 characters |
| CT-Connect Server | The IP address of the Dialogic CT-Connect server<br>Format: 255.255.255.255 |
| Secondary (Redundant) CTI Server | The IP address of the secondary Dialogic CT-Connect server<br>Format: 255.255.255.255 |

ACD/Routing Point

This is where system will pick up a contact and place it in the queue.

| Item | Restrictions/Characteristics |
| --- | --- |
| ACD | Is this device the ACD Queue in the switch? |
| Routing Point | Is this device a route point in the switch? |
| Initial Call Treatment | If a contact comes through a routing point, what will they hear while on hold?<br>Format: 31 characters |
| Switch Type | Name of the telephony switch<br>Format: 31 characters |
| Primary Switch ID | The identification number associated with a CTI link defined in the Dialogic CT-Connect configuration.<br>Format: 31 characters |
| Secondary (Redundant) Switch ID | The identification number associated with the secondary CTI link defined in the Dialogic CT-Connect configuration.<br>Format: 31 characters |
| CT-Connect Server | The IP address of the Dialogic CT-Connect server<br>Format: 255.255.255.255 |
| Secondary (Redundant CTI Server | The IP address of the secondary Dialogic CT-Connect server<br>Format: 255.255.255.255 |

IVR

These are the physical ports that route the extensions.

| | Restrictions/Characteristics |
| --- | --- |
| IVR Master | This is the IVR master controller ID controlling the range of ports configured below.<br>Format: 0–9999 |
| From IVR Channel (F.C.) | Initial (and inclusive) IVR port of the range<br>Format: 0–9999 |
| To IVR Channel (T.C.)e | Final (and inclusive) IVR port of the range<br>Format: 0–9999 |

| | Restrictions/Characteristics |
| --- | --- |
| From Extension (F.E.) | Initial (and inclusive) extension of the range |
| To Extension (T.E.)r | Final (and inclusive) extension of the range |

E-mail Mailboxes, Passwords, Addresses and Response URLs

If this campaign is on the Internet, you will need to configure the mailbox and the proxy.

| | Restrictions/Characteristics |
| --- | --- |
| Mailbox Name | Mailbox name in the POP3 Server. Some campaigns may have more than one mailbox.<br>Format: Alpha Characters<br>No spaces between words<br>Maximum length of 31 characters |
| Domain Name | Internet domain of the mailbox |
| Mailbox Password | Format: 6–12 Alpha Characters |
| POP3 Server IP Address | Post Office Protocol 3<br>Format: 255.255.255.255 |
| SMTP Server IP Address | Simple Mail Transfer Protocol<br>Format: 255.255.255.255 |
| Campaign | Name of the campaign to which a message received will be routed to |
| Response Template URL | URL address of the automated response message template file<br>Maximum of 254 characters |
| Attachment Data Store Path | File path where the incoming e-mail message attachment files are stored<br>Format: 254 characters |
| Attachment Data Base URL | Base Web address to the incoming e-mail attachment files<br>Format: 254 characters |
| Attachment Icon File Path | Directory where the individual icon .gif files for mime encoded attachments are stored.<br>Format: 254 characters |
| Attachment Icon Base URL | Web address to the icon .gif files<br>Format: 254 characters |
| Default Attachment Icon Name | If an incoming message has an unknown mime extension, this is the icon that will be displayed for this attachment.<br>Format: 254 characters |
| Poll Frequency (in seconds) | How frequently the Proxy checks for incoming mail<br>Format: Numeric 01 to 9,999,999,999 |

Contact Types and Priorities

Individual contacts can be assigned a high, medium, or low priority and bump rates which determines how quickly a contact will move up the queue.

| | Restrictions/Characteristics |
| --- | --- |
| Contact Type | A word; or abbreviation to signify a contact type, (i.e. Gold, Platinum,, Silver, etc.)<br>Format: 50 characters |
| Priority (P) | Initial starting point in the queue<br>Range 01 to 100 (with 01 as the highest) |
| Bump Rate (BR) | Every N seconds the contact is bumped higher in the queue<br>Range Up to 15 digits |
| Bump Interval (BI) | Every Bump Rate seconds moves the contact this many steps higher up the queue.<br>Range Up to 15 digits |

What is claimed is:

1. A system for receiving and distributing contacts of different media types to a plurality of workstations, comprising:
   a queuing component, adapted to receive said different media-type contacts and maintain said contacts in a common queue while said contacts are awaiting routing to said workstations; and
   a routing component, adapted to route the queued contacts to said workstations based on designated criteria.

2. A system as claimed in claim 1, wherein:
   said designated criteria includes at least one of criteria of said queued contacts and criteria assigned to agents operating said workstations.

3. A system as claimed in claim 2, wherein:
   said designated criteria includes said criteria of said queued contacts and said criteria assigned to said agents.

4. A system as claimed in claim 1, further comprising:
   a contact handling component, adapted to initiate an event at any of said workstations in response to said contact being routed thereto.

5. A system as claimed in claim 4, wherein:
   said event includes at least one of ringing a telephone assigned to said any workstation and causing said any workstation to generate a display on its display screen.

6. A system as claimed in claim 1, wherein said contacts include at least one of the following:
   a voice communication;
   a facsimile communication;
   an e-mail communication; and
   data transmittable over the Internet.

7. A system for receiving and distributing contacts of different media types to a plurality of workstations, comprising:
   a queuing component, adapted to receive said different media-type contacts and maintain said contacts in a common queue while said contacts are awaiting routing to said workstations;
   a routing component, adapted to route the queued contacts to said workstations based on designated criteria; and
   a media changing component, adapted to change a media-type of any of said media-type contacts to generate a changed media-type contact;
   wherein said queuing component is adapted to enter said changed media-type contact in said common queue; and
   wherein said routing component is adapted to route said queued changed media-type contact to at least one of said workstations.

8. A method for receiving and distributing contacts of different media types to a plurality of workstations, comprising the steps of:
   maintaining said different media-type contacts in a common queue while said contacts are awaiting routing to said workstations; and
   routing the queued contacts to the workstations based on designated criteria.

9. A method as claimed in claim 8, wherein:
   said designated criteria includes at least one of criteria of said queued contacts and criteria assigned to agents operating said workstations.

10. A method as claimed in claim 9, wherein:
   said designated criteria includes criteria of said queued contacts and criteria assigned to agents operating said workstations.

11. A method as claimed in claim 8, further comprising the step of:
   initiating an event at any of said workstations in response to said contact being routed thereto.

12. A method as claimed in claim 11, wherein said event initiating step includes at least one of the following steps:
   ringing a telephone assigned to said any workstation; and
   causing said any workstation to generate a display on its display screen.

13. A method as claimed in claim 8, further comprising the step of:
   receiving said contacts as at least one of the following:
      voice communication; facsimile communication; e-mail communication; and data transmittable over the Internet.

14. A method for receiving and distributing contacts of different media types to a plurality of workstations, comprising the steps of:
   maintaining said different media-type contacts in a common queue while said contacts are awaiting routing to said workstations;
   routing the queued contacts to the workstations based on designated criteria;
   changing a media-type of any of said media-type contacts to generate a changed media-type contact;
   entering said changed media-type contact in said common queue; and
   routing said queued changed media-type contact to at least one of said workstations.

15. A computer readable medium of instructions for controlling a contact center to receive and distribute contacts of different media types to a plurality of workstations, comprising:
   a first set of data, adapted to control said contact center to receive said different media-type contacts and maintain said contacts in a common queue while said contacts are awaiting routing to said workstations; and
   a second set of data, adapted to control said contact center to route the queued contacts to said workstations based on designated criteria.

16. A computer readable medium of instructions as claimed in claim 15, wherein:
   said second set of data is adapted to control routing of said queued contacts based on said designated criteria which includes at least one of criteria of said queued contacts and criteria assigned to agents operating said workstations.

17. A computer readable medium of instructions as claimed in claim 16, wherein:
   said second set of data is adapted to control routing of said queued contacts based on said designated criteria which includes criteria of said queued contacts and criteria assigned to agents operating said workstations.

18. A computer readable medium of instructions as claimed in claim 16, further comprising:
   a sixth set of instructions, adapted to control said contact center to initiate an event at any of said workstations in response to said contact being routed thereto.

19. A computer readable medium of instructions as claimed in claim 18, wherein:
   said sixth said of instructions is adapted to control said contact center to initiate said event which includes at least one of ringing a telephone assigned to said any workstation and causing said any workstation to generate a display on its display screen.

20. A computer readable medium of instructions as claimed in claim 19, further comprising:

a seventh set of instructions, adapted to control said contact center to receive said contacts which include at least one of the following:
a voice communication;
a facsimile communication;
an e-mail communication; and
data transmittable over the Internet.

21. A computer readable medium of instructions for controlling a contact center to receive and distribute contacts of different media types to a plurality of workstations, comprising:

a first set of data, adapted to control said contact center to receive said different media-type contacts and maintain said contacts in a common queue while said contacts are awaiting routine to said workstations;

a second set of data, adapted to control said contact center to route the queued contacts to said workstations based on designated criteria;

a third set of instructions, adapted to control said call center to change a media-type of any of said media-type contacts to generate a changed media-type contact;

a fourth set of instructions, adapted to control said contact center to enter said changed media-type contact in said common queue; and a fifth set of instruction, adapted to control said contact center to route said queued changed media-type contact to at least one of said workstations.

* * * * *